United States Patent
de Broqueville

(10) Patent No.: US 8,071,034 B2
(45) Date of Patent: Dec. 6, 2011

(54) ROTARY FLUIDIZED BED DEVICE AND METHOD FOR USING SAID DEVICE

(76) Inventor: Axel de Broqueville, Grez-Doiceau (BE)

( * ) Notice: Subject to any disclaimer, the term of this patent is extended or adjusted under 35 U.S.C. 154(b) by 637 days.

(21) Appl. No.: 11/793,484

(22) PCT Filed: Dec. 15, 2005

(86) PCT No.: PCT/EP2005/056826
§ 371 (c)(1),
(2), (4) Date: Jun. 11, 2008

(87) PCT Pub. No.: WO2006/064046
PCT Pub. Date: Jun. 22, 2006

(65) Prior Publication Data
US 2009/0022632 A1 Jan. 22, 2009

(30) Foreign Application Priority Data

Dec. 15, 2004 (BE) .................................. 2004/0612
Dec. 15, 2004 (BE) .................................. 2004/0613
Sep. 15, 2005 (BE) .................................. 2005/0443

(51) Int. Cl.
*F27B 15/08* (2006.01)
*F27B 15/00* (2006.01)

(52) U.S. Cl. ........ 422/147; 422/135; 422/140; 422/142; 422/145; 34/594; 34/58; 366/263

(58) Field of Classification Search .................. 422/135, 422/140, 145, 147, 142; 34/594, 58; 366/263
See application file for complete search history.

(56) References Cited

U.S. PATENT DOCUMENTS

| 2,395,236 A | 2/1946 | Schotthoefer |
| 2,585,385 A | 2/1952 | Haller |
| 3,276,627 A | 10/1966 | Birkestrand |

(Continued)

FOREIGN PATENT DOCUMENTS

CA 2246508 3/1999

(Continued)

OTHER PUBLICATIONS

Kochetov, L.M., et al.; "Experimental Determination of the Optimal Ratios of Structural Dimensions in the Whirl Chamber for Drying Granular Materials"; Investigation and Calculation of Thermochemical Processes; Translated from Kimicheskoe i Neftyanoe Mashinostroenie, No. 2; pp. 106-108; Feb. 1969.

(Continued)

*Primary Examiner* — Walter Griffin
*Assistant Examiner* — Lessanework Seifu

(57) ABSTRACT

The present invention relates to a device with a rotating fluidized bed in one or a succession of cylindrical chambers, in which injectors (12), distributed around the fixed circular wall (2) of said cylindrical chamber(s), inject along this wall, in successive layers, one or more fluids (13), which entrain the solid particles (17), passing through this/these chamber(s), in a movement of rapid rotation whereof the centrifugal force concentrates these particles along this wall, thereby forming a fluidized bed rotating around a central duct or a plurality of central ducts (3), through which the fluids are removed. The present invention further relates to a method of catalytic polymerization, drying or other treatments of solid particles in suspension in a rotating fluidized bed or of catalytic conversion of fluids passing through said rotating fluidized bed using a device according to the present invention.

21 Claims, 12 Drawing Sheets

U.S. PATENT DOCUMENTS

| | | | |
|---|---|---|---|
| 3,768,172 A * | 10/1973 | Klein et al. | 34/594 |
| 4,089,119 A | 5/1978 | Heinze | |
| 4,454,661 A | 6/1984 | Klein | |
| 4,548,138 A | 10/1985 | Korenberg | |
| 4,858,144 A | 8/1989 | Marsaly et al. | |
| 6,197,264 B1 | 3/2001 | Korhonen et al. | |
| 6,475,462 B1 | 11/2002 | Dodson et al. | |
| 2007/0238839 A1 | 10/2007 | de Broqueville | |
| 2008/0219903 A1 | 9/2008 | de Broqueville | |
| 2008/0269432 A1 | 10/2008 | de Broqueville | |
| 2009/0098263 A1 | 4/2009 | de Broqueville | |

FOREIGN PATENT DOCUMENTS

| | | |
|---|---|---|
| DE | 533037 | 9/1931 |
| DE | 1064882 B1 | 9/1959 |
| DE | 1542378 B1 | 7/1970 |
| DE | 2226100 A1 | 12/1973 |
| DE | 3621593 C1 | 1/1988 |
| DE | 3814723 | 11/1988 |
| DE | 19850099 A1 | 5/2000 |
| EP | 0213298 A1 | 3/1987 |
| FR | 1253239 A1 | 2/1961 |
| JP | 05332681 A | 12/1993 |
| WO | 8102988 A1 | 10/1981 |
| WO | WO 2005099887 | 10/2005 |

OTHER PUBLICATIONS

Anderson, Loren A., et al.; "Two-Component Vortex Flow Studies of the Colloid Core Nuclear Rocket"; J. Spacecraft; vol. 9, No. 5, May, 1972, pp. 311-317.

Volchkkov, E.P., et al.; "Aerodynamics and Heat and Mass Transfer of Fluidized Particle Beds in Vortex Chambers"; Institute of Thermophysics Siberian Division Russian Academy of Science, Novosibirsk, Siberia; Heat Transfer Engineering, vol. 14, No. 3, 1993; pp. 36-47.

* cited by examiner

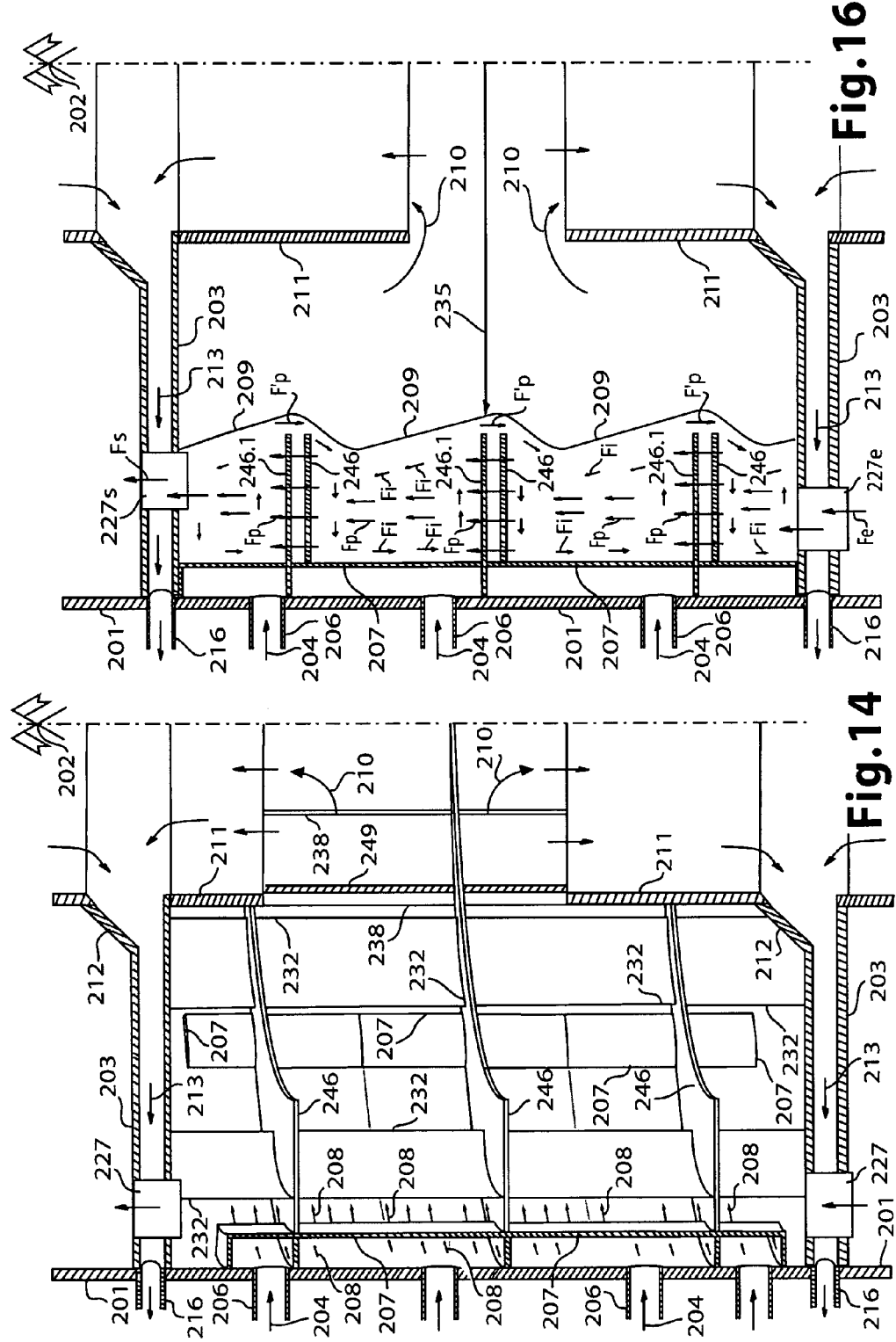

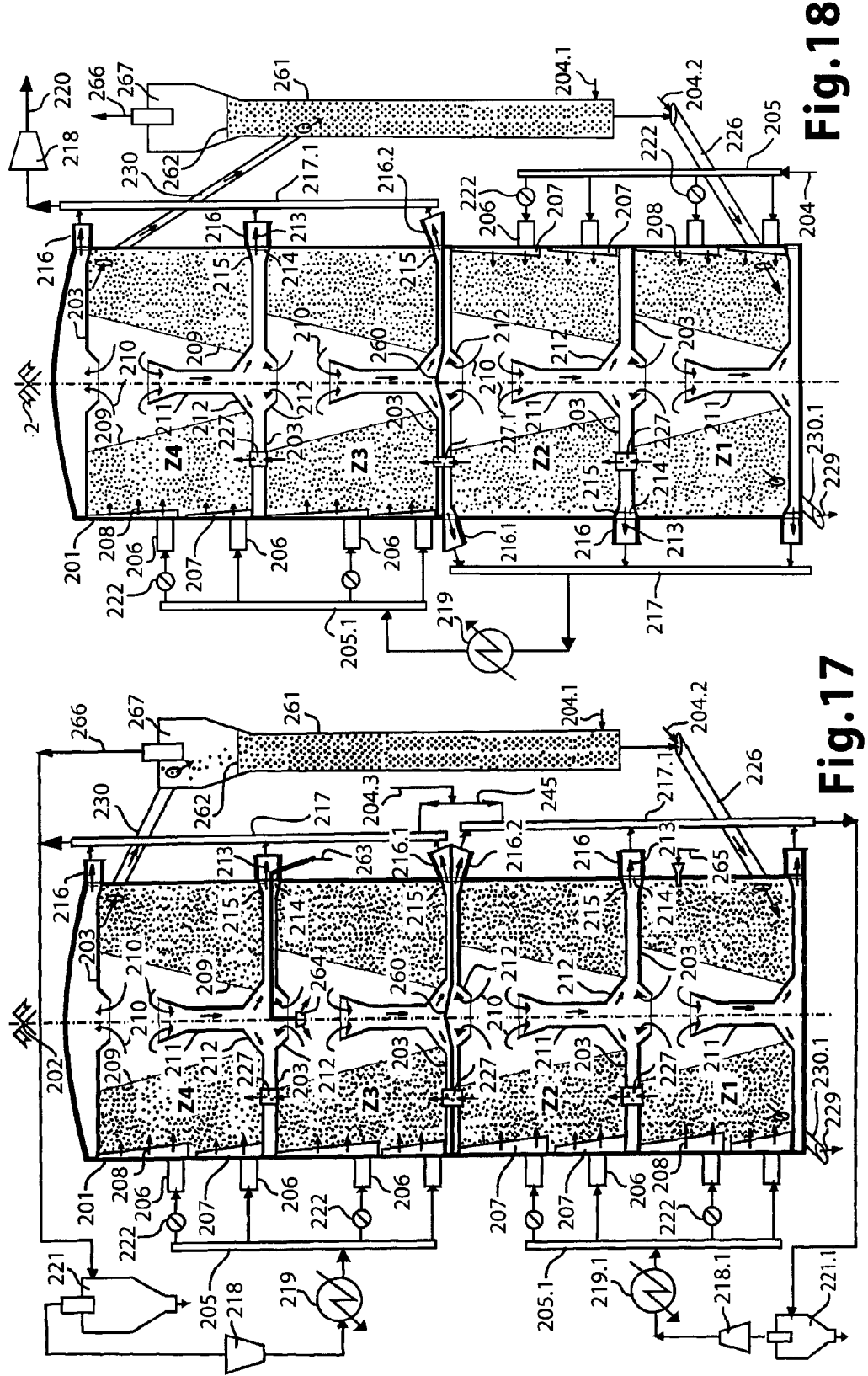

ROTARY FLUIDIZED BED DEVICE AND METHOD FOR USING SAID DEVICE

TECHNICAL FIELD OF THE INVENTION

The present invention relates to a device for a rotating fluidized bed and to a device for injecting fluid into this rotating fluidized bed, inside a fixed circular reaction chamber, and to methods of catalytic polymerization, drying, impregnation, coating or other treatments of solid particles in suspension in the rotating fluidized bed, or of cracking, dehydrogenation, or other catalytic conversions of fluids using this device.

TECHNOLOGICAL BACKGROUND OF THE INVENTION

Methods in which solid particles are in suspension in a fluid and thereby form a fluidized bed through which this fluid passes are well known. When the fluid is injected tangentially to the side wall of a cylindrical reactor, it can transfer part of its kinetic energy to the solid particles in order to make them rotate, and if the energy transfer is sufficient, this rotational movement produces a centrifugal force which can maintain the solid particles along the wall of the reactor, thereby forming a rotating solid particles, whereof the surface is approximately an inverted truncated cone, if the reactor is vertical. Such a method is the subject of Belgian patent application No. 2004/0186, filed on 14 Apr. 2004, in the name of the same inventor.

To obtain a high concentration of solid particles in a conventional fluidized bed, subject to the force of gravity alone, the fluid passing through the fluidized bed must exert on the solid particles an upward pressure lower than the downward pressure of the solid particles due to the force of gravity, and its upward velocity must therefore be low, thereby limiting the fluid flow rate which can pass through the fluidized bed and the difference in velocity of the fluid to that of the solid particles in suspension in this fluid.

In a rotating fluidized bed, in which the centrifugal force may be substantially higher than the force of gravity, the centripetal pressure exerted by the fluid passing radially through the fluidized bed may be substantially higher and therefore its flow rate and its difference in velocity to that of the solid particles may both be substantially higher, thereby improving the contact between the fluid and the solid particles and substantially increasing the volume of fluid that can pass through the fluidized bed and therefore also its capacity to cool, heat and/or dry the solid particles.

If the rotating fluidized bed is supported by a fixed cylindrical wall along which it must slide, the pressure exerted by the solid particles against this fixed cylindrical wall slows these solid particles down to an extent commensurate with the thickness, density and rotational velocity of the fluidized bed. The rotational velocity will decrease rapidly if the angular momentum of rotation is not maintained using rotating mechanical means, with the problems associated with the presence of moving equipment inside the reactor, and/or by the injection of fluid at high velocity, in the direction of rotation of the fluidized bed.

However, when a fluid jet is injected at high velocity into a large reactor, it is rapidly slowed down by its expansion in the reactor, depending on the conditions under which it is injected, thereby limiting its ability to transfer a significant momentum to the solid particles. This is why, unless other mechanical means are used to rotate the fluidized bed, it is necessary to have a very high fluid flow rate to be able to transfer to the solid particles the momentum necessary to maintain a sufficient rotational velocity to maintain them along the cylindrical wall of the reactor, and if the fluid density is much lower than the density of the particles, the devices for centrally removing these fluids may become very bulky, and may limit the height or length of the reactor. The quantity of fluid that must be injected to transfer the necessary angular momentum to the solid particles is very high and it may prevent the formation of a thick and dense fluidized bed and the proper separation of the fluid and the solid particles.

In fact, when a fluid is injected at high velocity, tangentially to the cylindrical wall and perpendicularly to the axis of symmetry of a cylindrical chamber traversed by a central duct comprising discharge openings for removing this fluid, the fluid can make several turns around this central duct before penetrating thereinto if the discharge openings are narrow. However, as soon as solid particles are introduced into this cylindrical chamber, they slow down the fluid to the extent commensurate with the ratio of the specific gravity of the solid particles to that of the fluid. Accordingly, the removal of the fluid becomes more direct, and this may even cause a reversal of the fluid flow along the central duct, downstream of the discharge openings, and generate turbulence which entrains the solid particles toward the outlet, thereby limiting the possibility of forming a thick and dense fluidized bed inside the cylindrical chamber.

In light of the above, it is clear that the formation of a rotating fluidized bed in a reactor faces various problems. It is the object of the present invention to provide an improved rotating fluidized bed device, and more particularly, a rotating fluidized bed device which at least partially solves the above-mentioned problems. In particular, it is the object of the present invention to provide a rotating fluidized bed device in which the injection of one or more fluids is corrected, and in which the formation of the fluidized bed is improved.

SUMMARY OF THE INVENTION

The present invention provides a device for a rotating fluidized bed in which the injection of one or more fluids is improved by providing a fluid injection device suitable for injecting one or more fluids in successive layers into said rotating fluidized bed. In particular, the invention relates to a rotating fluidized bed device comprising:

a cylindrical reactor comprising at least one cylindrical chamber,
a device for feeding one or more fluids, gaseous or liquid, placed around the circular wall of said cylindrical chamber,
a device for removing said fluid or fluid mixture,
a device for feeding solid particles on one side of said cylindrical chamber and
a device for removing said solid particles on the opposite side of said cylindrical chamber, characterized in that:
said device for removing said fluid or fluid mixture comprises a central duct passing longitudinally through or penetrating into said cylindrical chamber, the wall of said central duct comprising at least one discharge opening for centrally removing, via said central duct, the fluid or mixture of fluids from said cylindrical chamber;
said device for feeding said fluid or mixture of fluids comprises fluid injectors distributed around said circular wall for injecting said fluid or mixture of fluids in a succession of layers along said circular wall and rotating around said central duct while entraining said solid particles in a rotational movement whereof the centrifugal force thrusts them toward said circular wall;

said centrifugal force is, on average, at least equal to three times the force of gravity, said solid particles thereby forming a rotating fluidized bed which rotates around and at a certain distance from said central duct while sliding along said circular wall and while being supported by said layers of said fluid(s) which pass through said fluidized bed before being removed centrally via said discharge opening of said central duct and whereof the centripetal force is offset by said centrifugal force exerted on said solid particles.

The present invention provides for the use of injectors, distributed around the circular wall of a cylindrical chamber also called "circular reaction chamber", which inject one or more fluids, along the circular wall, in successive layers, in order to form a succession of fluid layers which are superimposed while rapidly rotating inside the reaction chamber, around a central duct which penetrates thereinto or passes through it along its central axis and which is provided with one or more discharge openings through which the fluid can be removed centrally. The circular reaction chamber is traversed by a stream of solid particles which are fed at one of its sides and removed at the opposite side and which are entrained by the fluid in a rapid rotational movement whereof the centrifugal force serves to concentrate them, before they leave the circular reaction chamber, in a dense rotating fluidized bed, which is at least partially supported by the centripetal pressure of these successive fluid layers which extend along the circular wall and which act as fluid pads, reducing the friction of the solid particles against this wall. The fluid is fed by a feed device which may comprise a fluid feed chamber surrounding the circular reaction chamber, the difference in pressure, preferably higher than the average pressure due to the centrifugal force of the rotating fluidized bed against the circular wall, between the feed device and the central duct and the flow rate of the fluid(s) serving to support and make the fluidized bed rotate at a velocity generating a substantial average centrifugal force, preferably higher than three times the force of gravity.

According to a preferred embodiment, the invention provides a rotating fluidized bed device in which the formation of the fluidized bed is further improved by adjusting the internal dimension of the reactor, without losing capacity. The present invention provides in particular to divide the reactor into a succession of interconnected cylindrical chambers.

More particularly, the invention relates to a rotating fluidized bed device according to the invention, characterized in that it comprises hollow disks, perpendicular to the axis of symmetry of said reactor and fixed against the cylindrical wall of said reactor, dividing said reactor into a succession of cylindrical chambers interconnected by passages arranged through said hollow disks, enabling said solid particles in suspension in said rotating fluidized beds to pass from one said cylindrical chamber to the other, and characterized in that the device for removing said fluid(s) comprises said hollow disks which are each equipped with at least one central opening around said axis of symmetry and at least one side opening connected to at least one collector outside the reactor for removing said fluids through said hollow disks and for regularizing the outlet pressures of said cylindrical chambers.

In this embodiment of the present invention, a cylindrical reactor is divided into a succession of cylindrical chambers by a succession of flat cylinders or hollow disks fixed against its side wall. These hollow disks comprise openings at their center for sucking out the fluid passing through each chamber while rapidly rotating, and openings in their side wall for removing it from the reactor. These hollow disks are traversed by passages appropriately profiled to enable the solid particles in suspension in the fluid, rapidly rotating, to pass from one cylindrical chamber to the other.

According to a particularly preferred embodiment, the invention also provides a rotating fluidized bed device in which the injection of one or more fluids is further improved by providing an injection device designed to improve the efficiency of transfer of energy and momentum from said fluid to the solid particles in suspension in said rotating fluidized bed. The present invention provides at least one deflector capable of bounding, inside said rotating fluidized bed, a space around one or more jets of said fluid sent in the direction of rotation of said rotating fluidized bed.

More particularly, the invention relates to a rotating fluidized bed device according to the invention, characterized in that the device for feeding one or more fluids comprises a device for injecting fluid into said rotating fluidized bed, which fluid injection device comprises at least one deflector bounding inside said rotating fluidized bed a space around one or more jets of said fluid sent in the direction of rotation of said rotating fluidized bed, issuing from one or more injectors of said fluid, said deflector being arranged in order to bound, between said injector(s) and said deflector, an access passage or corridor for a stream of said solid particles in suspension in said rotating fluidized bed, issuing from upstream of said injector, to enter said space in order to mix therein with said fluid jet(s), said space being sufficiently long to enable said fluid jet(s) to yield a substantial part of their kinetic energy to said solid particles before reaching the outlet of said space.

To improve the efficiency of transfer of the momentum and kinetic energy between a fluid jet and solid particles in suspension in a rotating fluidized bed, the present invention comprises deflectors, inside the rotating fluidized bed, appropriately profiled and arranged close to the fluid injectors, to permit the mixing of the injected fluid with a limited quantity of solid particles while channeling it, to prevent or reduce its expansion in the reactor before it has transferred a substantial quantity of its kinetic energy to these solid particles. This device is suitable for using much lighter fluids than the solid particles and for injecting it at high velocity into the reactor without losing a large part of its kinetic energy due to its expansion in the reactor.

A device according to the present invention can be used advantageously in various processes. This is why the present invention also relates to methods of catalytic polymerization, drying, impregnation, coating or other treatments of solid particles in suspension in the rotating fluidized bed, or of cracking, dehydrogenation or other catalytic conversions of fluids using this device.

More particularly, the invention relates to a method of catalytic polymerization, drying or other treatments of solid particles in suspension in a rotating fluidized bed or of catalytic conversion of fluids passing through said rotating fluidized bed, characterized in that it comprises the steps which consist in injecting a fluid or fluids in successive layers into a cylindrical chamber of a reactor, and of removing them centrally via a central duct passing through or penetrating into said cylindrical chamber, according to the present invention, at a flow rate and an injection pressure entraining said solid particles at an average rotational velocity generating a centrifugal force at least three times greater than the force of gravity.

The present invention also relates to a method of catalytic polymerization, drying or other treatments of solid particles in suspension in rotating fluidized beds or of catalytic conversion of fluids passing through rotating fluidized beds, characterized in that it comprises the steps which consist in injecting a fluid or fluid mixture into a horizontal cylindrical reactor according to the present invention, at a velocity and at a flow rate giving to said solid particles an average rotational velocity higher than the square root of the product of the reactor diameter and g which is the gravitational acceleration.

The present invention also relates to a method of catalytic polymerization, drying or other treatments of solid particles in suspension in rotating fluidized beds or of catalytic conversion of fluids passing through rotating fluidized beds, characterized in that it comprises the steps which consists in injecting a fluid or fluid mixture into a vertical cylindrical reactor according to the present invention, at a velocity and at a flow rate generating in said rotating fluidized bed a centrifugal force greater than the force of gravity, said solid particles being transferred from one said cylindrical chamber to the other toward the bottom of said reactor.

Another method according to the present invention relates to a method of catalytic polymerization, drying or other treatments of solid particles in suspension in rotating fluidized beds or of catalytic conversion of fluids passing through rotating fluidized beds, characterized in that it comprises the steps which consist in injecting a fluid or fluid mixture into a vertical cylindrical reactor according to the present invention, at a velocity and at a flow rate giving to said solid particles an average rotational velocity higher than the velocity that they can acquire by falling from the top to the bottom of said cylindrical chambers and enabling them to pass from one said lower cylindrical chamber to said upper cylindrical chamber via at least one passage arranged in said hollow disk separating them and oriented in the direction causing said solid particles to rise.

The present invention also relates to the use of a device described in the present invention in a polymerization process. The present invention also relates to the use of a device described in the present invention in a method of catalytic conversion of a fluid or fluid mixture passing through a rotating fluidized bed whereof the solid particles are catalysts. The present invention also relates to the use of a device described in the present invention in a method for drying or extracting volatile components from said solid particles. A device according to the present invention can also be used in a method for impregnating or coating said solid particles.

The present invention therefore provides an improved rotating fluidized bed device, in which the injection of one or more fluids, and in which the formation of the fluidized bed, have been improved thanks to various technical modifications, applied as such or in combination with one another, comprising inter alia, the use of injectors suitable for injecting one or more fluids in successive layers into the reactor, the division of the reactor into several successive reaction chambers, and/or the use of an injection device provided with one or more deflectors.

The present invention is suitable for making a very large quantity of fluid pass through a dense rotating fluidized bed, with good separation between the solid particles and the fluid, and for making it rotate rapidly to obtain a high centrifugal force, without the use of rotating mechanical means inside the reactor, even if the fluid density is low. It permits easy recycling, after appropriate treatment, of the fluid and/or the solid particles, whereof the residence time can be adjusted as required. It is particularly advantageous for methods requiring very good contact between the fluid and the solid particles, like the rapid drying of solid particles in a compact reactor, and/or a high heat transfer capacity for controlling the temperature of highly exothermic catalytic reactions, like the catalytic polymerization of ethylene, or highly endothermic reactions like the catalytic dehydrogenation of ethylbenzene or the catalytic cracking of light gasolines. It is also suitable for the regeneration of catalyst particles at the desired rate, and the high rotational velocity of these solid particles reduces the probability of them forming aggregates or adhering to the reactor surface. The presence of fluid pads between the solid particles and the reactor surface also reduces the attrition of the solid particles and of the reactor walls.

The division of the reactor into a succession of cylindrical chambers, which can only be interconnected by small passages, for transferring the solid particles accompanied by a small quantity of fluid, is suitable for passing different fluids through them, recycled in a loop. This makes the method particularly advantageous when it is necessary to use fluids with compositions which vary significantly from one cylindrical chamber to the other.

This method provides for short or long particle residence times in the reactor, according to the size of the passages between the cylindrical chambers, and the resistance to the rotation of the fluidized bed may be low, because the injection of the fluid in thin films along the side wall of the reactor reduces the friction of the solid particles on this wall.

This method is particularly advantageous when the volume of fluid flowing is very high, because the devices for centrally removing the fluid via hollow disks allow for a very high fluid flow rate with a minimum of resistance, and since the fluid distributors and collectors are outside the reactor, they can have large diameters without reducing the space available for the fluidized bed inside the reactor.

This method is also particularly advantageous when the pressure in the reactor is lower than the atmospheric pressure, because the hollow disks can support the cylindrical wall of the reactor, thereby allowing for thin walls, longitudinally intersected, to form slits whereby the fluid can be injected and to facilitate the disassembly thereof. Moreover, the distributors, collectors and the reactor can easily form a compact and easily transportable assembly.

This method accordingly permits the construction of lightweight, compact, transportable and efficient units, for example for drying cereal grains. It is also suitable for catalytic modifications of fluids at low pressure, like the cracking of light olefins or the dehydrogenation of ethylbezene which, being highly endothermic, require intermediate heatings and catalyst regeneration. It can also be used for the catalytic, bimodal or multimodal copolymerization of particles in suspension in a succession of active fluids of different compositions.

Other features and examples of devices according to the present invention are described below in a nonlimiting manner.

BRIEF DESCRIPTION OF THE DRAWINGS

FIG. 14 is the projection of a half-cross section of a cylindrical chamber.

FIG. 16 is a diagram of the transverse flow of the solid particles along a half-longitudinal section of a cylindrical chamber similar to the one shown in FIG. 14, without the side and central deflectors.

FIG. 17 shows a simplified diagram, similar to FIG. 11, slightly modified, for bimodal or multimodal copolymerization.

FIG. 18 shows a simplified diagram, similar to that of FIG. 17, slightly modified, for the catalytic conversion of a fluid or fluid mixture, in a rotating fluidized bed containing solid catalyst particles.

DETAILED DESCRIPTION

Figure 1:
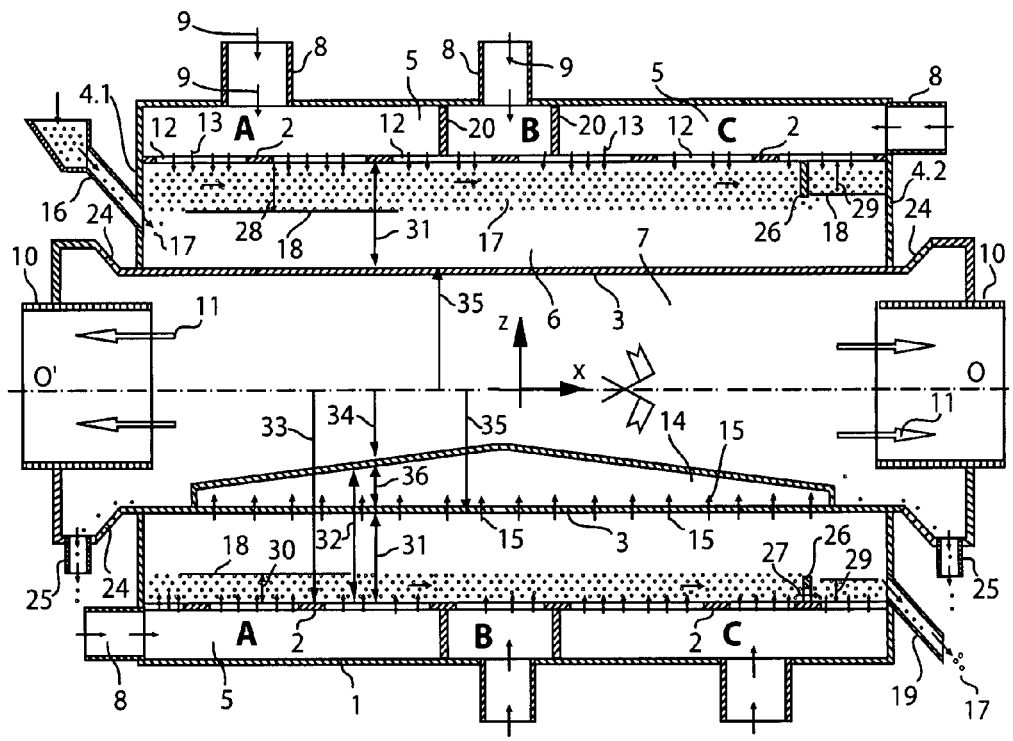
FIG. 1 shows a schematic longitudinal section of a cylindrical reactor according to the invention comprising three concentric walls.

The present invention relates to an improved fluidized bed device. Such a device generally comprises a cylindrical reactor containing one or more circular reaction chambers. The terms "circular reaction chamber" and "cylindrical chamber" are used in certain embodiments of the present invention as synonyms and refer to a chamber inside the cylindrical reactor. Moreover, the terms "circular wall" and "cylindrical wall" indicating the wall of the circular reaction chamber or of the cylindrical chamber, are used in certain embodiments of the present invention as synonyms.

According to a first aspect, the present invention relates to a rotating fluidized bed device comprising a fluid injection device, capable of injecting one or more fluids in successive layers, inside a fixed circular reaction chamber, and to methods of catalytic polymerization, drying, impregnation, coating or other treatments of solid particles in suspension in the rotating fluidized bed, or cracking, dehydrogenation or other catalytic conversion of fluids using this device. More particularly, the present invention relates to a device for injecting fluid in successive layers into a rotating fluidized bed and a method of catalytic polymerization, drying or other treatments of solid particles or of the catalytic conversion of fluids, in which a succession of injectors distributed around the fixed circular wall of a circular reaction chamber, inject along this wall, in successive layers, one or more fluids, which entrain the solid particles, passing through this chamber, in a rapid rotational movement whereof the centrifugal force concentrates these particles along this wall, thereby forming a fluidized bed rotating around a central duct, through which the fluids are removed.

In the present invention, injectors, distributed around the circular wall of a circular reaction chamber, inject one or more fluids, along the circular wall, in successive layers, to form a succession of fluid layers which are superimposed and rotate rapidly inside the reaction chamber, around a central duct which penetrates thereinto or passes through it along its central axis, and which is provided with one or more discharge openings through which the fluid can be removed centrally. The circular reaction chamber is traversed by a stream of solid particles which are fed at one of its sides and removed at the opposite side and which are entrained by the fluid in a rapid rotational movement whereof the centrifugal force is sufficient to concentrate them, before they leave the circular reactor chamber, in a dense rotating fluidized bed, which is at least partially supported by the centripetal pressure of these successive fluid layers moving along the circular wall and which act as fluid pads, reducing the friction of the solid particles against this wall. The fluid is fed by a feed device which may comprise a fluid feed chamber surrounding the circular reaction chamber, the pressure difference, preferably higher than the average pressure due to the centrifugal force of the rotating fluidized bed against the circular wall, between the feed device and the central duct, and the flow rate of the fluid(s) suitable for supporting and rotating the fluidized bed at a velocity generating a substantial average centrifugal force, preferably greater than three times the force of gravity. This is why, in a first embodiment, the present invention relates to a rotating fluidized bed device comprising a circular reaction chamber, a device for feeding one or more fluids, arranged around the circular wall of said circular reaction chamber, a device for removing said fluid(s), a device for feeding solid particles on one side of said circular reaction chamber and a device for removing said solid particles on the opposite side of said circular reaction chamber, characterized in that said device for removing said fluid(s) comprises a central duct longitudinally passing through or penetrating into said reaction chamber, the wall of said central duct comprising at least one discharge opening for centrally removing, via said central duct, said fluid(s) from said circular reaction chamber; said device for feeding said fluid(s) comprises fluid injectors distributed around said circular wall for injecting said fluid(s) in a succession of layers which flow along said circular wall while rotating around said central duct and entraining said solid particles in a rotational movement whereof the centrifugal force thrusts them toward said circular wall; said centrifugal force is, on average, at least equal to three times the force of gravity, said solid particles thereby forming a rotating fluidized bed which rotates around and at a certain distance from said central duct while sliding along said circular wall and being supported by said layers of said fluid(s) which pass through said fluidized bed before being removed centrally via said discharge opening of said central duct and whereof the centripetal force is compensated for by said centrifugal force exerted on said solid particles.

To avoid the entrainment of the solid particles in the central duct, the velocity and/or difference between the fluid injection and removal must be greater, and the losses of angular momentum of rotation of the solid particles must be lower, as the radius of the reaction chamber and the ratio of the densities of the solid particles and the fluid increase.

For this purpose, to limit the pressure and concentration of solid particles against the circular wall of the reaction chamber and hence their slowdown, it is advisable that in each annular section of the reaction chamber, there should be at least one fluid injector at 90° intervals, that is 4, and preferably at least seven, the most preferable being at least 11, and hence that the number of successive fluid layers should be high, or that the distance between these injectors should be short, preferably shorter than the average radius of the circular chamber, to limit the quantity and concentration of the solid particles coming into contact with this circular wall after having passed through the layer of fluid which has been injected by the injector located upstream, before reaching the fluid layer injected by the injector located downstream.

It is also advisable for the profile of the injectors to be designed in order to inject the fluid at a sufficient velocity, preferably at least twice the desired rotational velocity of the solid particles in the fluidized bed, and in thin layers, with a thickness at the time of their injection that is preferably less than one-twentieth of the average radius of the reaction chamber, in a direction making an acute angle, preferably of less than 30°, with the circular wall, and for the planes of the outlet openings of the fluid injectors to form, with the circular wall side located downstream, angles preferably of between 60° and 120°, so that the thrust of the fluid(s) at the time that they exit the injectors is more tangential than radial or centripetal. The circular wall may be cylindrical, but it may also have various radii of curvature or be plane between the fluid injectors. In the latter case, the circular wall is polygonal and its sides located on each side of the injectors make an angle that approaches 180° as the number of injectors increases.

This is why the present device is, in one embodiment, characterized in that the injection directions of the layers of said fluid(s) by said fluid injectors make an angle smaller than 30° with said circular wall on the side located downstream of said fluid injectors. According to another preferred embodiment, the device according to the present invention is characterized in that the outlet planes of said fluid injectors make angles of between 60° and 120° with said circular wall on the side located downstream of said fluid injectors. According to another embodiment, the device according to the present invention is characterized in that each annular section of said circular wall contains at least one said fluid injector at 90° intervals. Moreover, the present device is characterized in that the distance between two said consecutive fluid injectors is preferably less than the average radius of said circular wall. In another preferred embodiment, the device according to the present invention is characterized in that the outlets of said fluid injectors are thin, preferably having a width lower than one-twentieth of the average radius of said reaction chamber. The present invention also relates to a device characterized in that the surface of said circular wall located between two said consecutive injectors is plane, the circular wall being polygonal.

It is also preferable, to facilitate the rotation of the fluid around the central duct and to reduce the possibility of a reversal of the fluid flow which may rise along the wall of the central duct downstream of the discharge openings, that no cross section of the central duct should comprise more than a single fluid discharge opening, and that these openings should be narrow, arranged longitudinally, preferably having an average width lower than half of the average distance between the central duct and the circular wall, and that the sum of the cross sections of the discharge openings should preferably be lower than twice the sum of the cross sections of the outlet openings of the fluid injectors, which is itself preferably lower than half of the average longitudinal cross section of the circular reaction chamber, and that the planes of these discharge openings should make, with the wall of the central duct, an angle preferably of between 60° and 120°, this wall progressively deviating from the circular wall of the reaction chamber, from its side located downstream of the discharge openings to the opposite side, thereby having the appearance of a spiral. This is why, according to one embodiment, the device according to the present invention is characterized in that said discharge opening(s) are arranged longitudinally and in that their average width is lower than half of the average distance between said wall of said central duct and said circular wall. According to a preferred embodiment, the device according to the present invention is characterized in that the sum of the cross sections of said discharge openings is lower than twice the sum of the outlet cross sections of said fluid injectors. According to another preferred embodiment, the device according to the present invention is characterized in that the planes of said discharge openings make angles of between 60° and 120° with the wall of said central duct. According to a further preferred embodiment, the device according to the present invention is characterized in that no cross section of said central duct passes through more than one said discharge opening.

The present invention may comprise at least one deflector, wing-shaped, passing longitudinally through the reaction chamber, close to the wall of the central duct, having its leading edge upstream of the fluid removal opening(s) and its trailing edge downstream of these fluid removal openings, in order to reintroduce, into the reaction chamber, the solid particles, generally the finest, which have entered the space located between the deflector and the wall of the central duct. The inlet cross section of this space is preferably larger than the sum of the cross sections of the discharge openings, and the distance between the trailing edge and the wall of the central duct is preferably less than half of the distance between this edge and the circular wall. This deflector may be hollow and provided with fluid injectors arranged along its trailing edge, in order to inject a thin layer of fluid at high velocity, approximately parallel, and preferably at approximately 30° to the wall of the central duct, downstream of the discharge openings, in order to prevent these solid particles from rising along the wall of the central duct downstream of the discharge opening. This is why, in another embodiment, the device according to the present invention is characterized in that said reaction chamber is longitudinally traversed by at least one deflector, wing-shaped, close to said central duct, upstream of at least one of said discharge openings, and extending beyond said discharge opening(s). According to a preferred embodiment, the device according to the present invention is characterized in that said deflector is hollow and is fed with fluid by said fluid feed device and is provided with at least one fluid injector along its trailing edge for injecting said fluid, in a thin layer, along the wall of said central duct and downstream of said discharge opening. According to a particularly preferred embodiment, the device according to the present invention is characterized in that the distance between said edge located downstream of said hollow deflector and the wall of said central duct located downstream of said discharge opening is less than half of the distance between said edge and said circular wall.

The present invention may comprise at least one transverse control ring, which is placed close to the outlet of the solid particles, whereof the outer edge extends along and is fixed to the circular wall and whereof the inner edge surrounds and is at an average distance from the central duct, preferably greater than one-quarter of the average distance between the central duct and the circular wall, to enable the solid particles to pass from one side of the fluidized bed to the other without coming too close to the discharge openings of the central duct. This control ring serves to prevent or to slow down the transfer of the solid particles from upstream of this ring to downstream thereof, as long as the fluidized bed has not reached the desired thickness upstream. This ring may comprise a passage along the circular wall, to permit a sufficient minimum passage to progressively drain the circular reaction chamber when the solid particle feed is stopped. This is why, in another embodiment, the device according to the present invention is characterized in that said circular reaction chamber contains, close to the side of said device for removing said solid particles, a control ring whereof the outer edge extends along and is fixed to said circular wall, and whereof the inner edge is at an average distance from said central duct that is greater than one-quarter of the average distance between said central duct and said circular wall, said solid particles in suspension in said rotating fluidized bed having to pass through the space located between said inner edge and said central duct to pass from one side of said control ring to the other side. According to a particularly preferred embodiment, the device according to the present invention is characterized in that said control ring comprises at least one passage, located against said circular wall, enabling the transfer of said solid particles located on one side of said separating ring to the other side without having to pass through the space between said inner edge and said central duct.

The present invention may comprise a set of helical turns, whereof the outer edges extend along and are fixed to the circular wall and whereof the inner edges surround and are at an average distance from the central duct, preferably greater than one-quarter of the average distance between the central duct and the circular wall, to enable the solid particles traveling longitudinally in one direction, when they extend along these helical turns, to travel in the other direction in the space between these helical turns and the central duct, without too closely approaching the discharge openings of the central duct. These helical turns, which may form a continuous or diskontinuous helical spiral or may be fragmented into a set of fins, are suitable for making the solid particles pass from one side to the other of the circular reaction chamber numerous times and/or for making them rise longitudinally, if the axis of rotation of the fluidized bed is inclined or vertical. Similar devices are described in Belgian patent applications Nos. 2004/0186 and 2004/0612, filed 14 Apr. and 12 Dec. 2004 in the name of the same inventor. This is why, in another preferred embodiment, the device according to the present invention is characterized in that said circular reaction chamber contains a set of turns or fractions of helical turns whereof the outer edge extends along and is fixed to said circular wall and whereof the inner edge is at an average distance from said central duct that is greater than one-quarter of the average distance between said central duct and said circular wall.

In the present invention, the axis of rotation of the fluidized bed may be horizontal, inclined or vertical. If it is horizontal or inclined by less than 45°, preferably less than 30°, the average velocity of the solid particles, their concentration and the pressure they exert on the thin fluid layers are higher in the bottom of the reaction chamber. It is therefore preferable to divide the outer distribution chamber into several longitudinal segments by longitudinal separating walls in order to differentiate between the fluid injection pressure in the various fluid injectors according to their position in the reaction chamber.

If the axis of rotation of the fluidized bed is approximately vertical or inclined by more than 45°, preferably at least 60°, separating rings, surrounding the central duct at a certain distance therefrom, preferably less than one-third of the average distance between the circular wall and the central duct to enable the solid particles to pass into this space without too closely approaching the discharge opening of the central duct, may be fixed against the circular wall to prevent the excessively rapid drop of the solid particles. The pressure exerted by these solid particles against the upper surface of these separating rings slows down not only their fall, but also their rotational movement. This may be compensated for, if necessary, if these rings are hollow and provided with fluid injectors for injecting a fluid in thin layers along their upper surface in the direction of rotation of the solid particles.

In the present invention, these separating rings can be replaced by helical turns, which may also be hollow and which can form a continuous or diskontinuous helical spiral or may be fragmented into fins, fixed against the circular wall, the orientation of the slope of the turns or the fins entraining the solid particles upward, said solid particles rapidly rotating along the circular wall, and the average distance between the inner edge of the turns and the central duct, preferably greater than one-quarter of the average distance between the circular wall and the central duct, enabling the solid particles, which have risen along the upper surface of these turns, to fall back into this space without too closely approaching the discharge opening in the central duct. This serves to feed the solid particles into the bottom of the circular reaction chamber and to remove them at the top. Similar devices are described in Belgian patent applications Nos. 2004/0186 and 2004/0612, filed 14 Apr. and 12 Dec. 2004 in the name of the same inventor.

In a preferred embodiment, the device according to the present invention is characterized in that the axis of rotation of said fluidized bed makes an angle of less than 45° with the vertical and in that said central duct passes through the upper side of said circular reaction chamber and terminates at a certain distance on the opposite side, the cross section of said central duct progressively decreasing from the top toward the bottom. According to a particularly preferred embodiment, the device according to the present invention is characterized in that the average radius of said circular reaction chamber decreases progressively from the top to the bottom.

In another preferred embodiment, the device according to the present invention is characterized in that the axis of rotation of the fluidized bed makes an angle of less than 45° with the vertical and in that said circular reaction chamber comprises separating rings, dividing said rotating fluidized bed into several annular sections, the outer side of said separating rings extending along and being fixed to said circular wall and their inner edge being at an average distance from said central duct that is greater than one-quarter of the average distance between said central duct and said circular wall, said solid particles in suspension in said rotating fluidized bed having to pass through the space located between said inner edge and said central duct to pass from one side of said separating rings to the other side. According to a preferred embodiment, the device according to the present invention is characterized in that said separating rings are hollow and are fed with fluid by said feed device, said fluid being injected in a succession of layers along the upper surfaces of said rings in the direction of rotation of said rotating fluidized bed. According to another preferred embodiment, the device according to the present invention is characterized in that said separating rings comprise at least one passage, located against said circular wall, enabling the passage of said solid particles, located above said separating rings, to the bottom without having to pass through the space located between said inner edges and said central duct. According to a particularly preferred embodiment, the device according to the present invention is characterized in that said separating rings are turns or fractions of helical turns, whereof the slope is oriented upward.

In another preferred embodiment, the device according to the present invention is characterized in that the axis of rotation of said fluidized bed makes an angle greater than 45° with the vertical and in that said discharge opening(s) is/are located on the side of the lower longitudinal part of said circular reaction chamber. In another preferred embodiment, the device according to the present invention is characterized in that the axis of rotation of said fluidized bed makes an angle greater than 45° with the vertical and in that the leading edge of said deflector is located on the side of the lower longitudinal part of said circular reaction chamber.

In the present invention, the central duct may be traversed only on one side of the circular reaction chamber, preferably the upper side if the axis of rotation of the fluidized bed is vertical or inclined, and may terminate before reaching the opposite side. Its cross section may decrease progressively and its end located in the circular reaction chamber may be open or closed. In another embodiment the device according to the invention is characterized in that the wall of said central duct is flared at least one of its two ends and in that it includes a tube for discharging said fluid, which tube is concentric with and at a certain distance from said flared wall, and discharging tube against said flared wall discharging separately said solid particles that have been entrained into said central duct and have been thrust by the centrifugal force along said flared wall.

In the present invention, the distribution chamber may be divided into successive annular sections by transverse annular separating walls in order to differentiate between the quality and quantity of the fluids which are fed to the different sections and which pass through the corresponding section of the rotating fluidized bed, and these fluids may be recycled to the same sections or to other sections, if the central duct is also divided into successive sections, connected to tubes passing inside the central duct and suitable for removing these fluids separately. This is why, in another embodiment, the device according to the present invention is characterized in that said device for feeding said fluid(s) comprises a fluid feed chamber surrounding said circular wall, the difference in pressure between said fluid feed chamber and said central duct being maintained by said devices for feeding and removing said fluid(s), at more than the average centrifugal pressure exerted by said fluidized bed on said circular wall. According to a preferred embodiment, the device according to the present invention is characterized in that said feed chamber is divided into longitudinal segments by longitudinal walls for feeding said injectors corresponding to said longitudinal segments at different pressures. According to a particularly preferred embodiment, the device according to the present invention is characterized in that said feed chamber is divided into successive annular sections by transverse annular walls suitable for separately feeding said injectors corresponding to each of said successive annular sections and hence making the corresponding annular sections of said rotating fluidized bed be traversed by fluids having different compositions and/or temperatures and/or injection velocities.

In another preferred embodiment, the device according to the present invention is characterized in that said device for feeding one or more fluids comprises at least one ejector penetrating into a line for removing said fluid(s) and through which said feed fluids are injected at very high velocity and mixed with the fluids removed in said discharge line to be recycled to said circular reaction chamber.

In the present invention, several circular reaction chambers may be installed in series, connecting the outlet of the solid particles from one chamber to the inlet of the solid particles of the next chamber, and the solid particles may be recycled, after having been regenerated, if they are catalytic, by an appropriate device after having spent a more or less long period of time, as required, in the circular reaction chamber(s). In another embodiment, the device according to the present invention is characterized in that said circular reaction chamber is connected to another similar chamber, by a transfer line for transferring said solid particles from said circular reaction chamber to said similar chamber and whereof the inlet is located close to said circular wall of said circular reaction chamber, on the side opposite said device for feeding said solid particles, and whereof the outlet is located close to said central duct of said similar chamber on the side opposite said device for removing said solid particles from said similar chamber. A similar device is described in Belgian patent application No. 2004/0612, filed 12 Dec. 2004 in the name of the same inventor. A similar device is also described in greater detail below.

In another preferred embodiment, the device according to the present invention is characterized in that said central duct is divided transversely by transverse walls into sections connected to discharge tubes arranged inside said central duct for separately removing the fluids issuing from said sections of said central duct and recycling them or treating them separately in a corresponding section or another section of said circular reaction chamber. According to a particularly preferred embodiment, the device according to the present invention is characterized in that said circular reaction chamber is divided into annular sections corresponding to said sections of said central duct, by said annular walls fixed between said circular wall and said central duct, these said annular walls comprising at least one passage against said circular wall for the passage of the solid particles from one said annular section to said adjacent annular section and these said annular walls or said transverse walls of said central duct comprise at least one passage located against or in said central duct for the passage of said fluids from one said section to said adjacent section.

In another preferred embodiment, the device according to the present invention is characterized in that it comprises a device for recycling said fluid(s) removed by said device for removing said fluid(s) to the device for feeding said fluid(s), said recycling device comprising a device for treating said recycled fluids for adjusting the temperature and/or composition of said recycled fluids. In another preferred embodiment, the device according to the present invention is characterized in that it comprises a device for recycling said solid particles removed by said device for removing said solid particles for recycling them to said circular reaction chamber by said device for feeding said solid particles. According to a particularly preferred embodiment, the device according to the present invention is characterized in that said solid particles are catalysts and in that said device for recycling said catalyst particles comprises a device for regenerating said catalyst particles.

In another preferred embodiment, the device according to the present invention is characterized in that said fluid(s) is/are gases and in that it comprises a device for injecting a liquid, passing through said central duct, for spraying said liquid in fine droplets onto at least part of the surface of said fluidized bed.

FIGS. 1 to 10 show embodiments of a rotating fluidized bed device according to the comprising a device for injecting fluid in successive layers, inside a fixed circular reaction chamber.

FIG. 1 shows the schematic longitudinal section, in the plane of the (x) and (z) axes, the (x) axis coinciding with the axis of rotation of the fluidized bed (00') and the (z) axis, directed upward, coinciding with the vertical, of a cylindrical reactor comprising three concentric walls, the outer wall (1), the median wall, called the circular wall (2) and the central wall (3), called the wall of the central duct, the space comprised between the outer wall and the central wall being closed by two annular side walls (4.1) and (4.2). The space (5) between the outer wall and the circular wall is the chamber for feeding fluid(s), the space (6) between the circular wall and the central wall is the circular reaction chamber, and the space inside the central wall is the central duct (7).

Tubes (8) are used for introducing the fluid(s), symbolized by the arrows (9) through the outer wall (1) or the annular side walls (4.1) and (4.2), into the feed chamber (5) and tubes (10) for removing the fluid(s), symbolized by the arrows (11), from the central duct (7). Longitudinal slits (12), which may extend continuously from one end of the circular reaction chamber to the other or, as is the case in this figure, may extend along more or less long lengths and be separated from one another by more or less long distances, passing through the circular wall (2), illustrate the fluid injectors for injecting, into the circular reaction chamber (6), the fluid(s), symbolized by the arrows (13), in thin layers, at high velocity, along the circular wall (2), and a discharge opening (14) in the wall of the central duct (3) serves to remove this fluid, symbolized by the arrows (15), from the circular reaction chamber (6) in the central duct (7). Since the fluid(s) rotate rapidly in the circular reaction chamber, the tangential component of their velocity is substantially higher than the radial component, but it is not visible because it is perpendicular to the plane of the figure.

A line (16) is available for introducing solid particles, symbolized by small circles (17), through the side wall (4.1). The solid particles are entrained by the fluid in a rotational movement and the centrifugal force maintains them along the circular wall (2) where they form a fluidized bed with an approximately cylindrical surface (18). A line (19) is use to remove the solid particles (17) through the opposite annular side wall (4.2).

Annular walls (20) can divide the distribution chamber (5) into annular sections (A), (B) and (C) in order to feed the fluid(s) having different properties and/or different pressures.

The tubes (10) for removing the fluid(s) may penetrate into the central duct (3) which is wider at its two ends, thereby forming kinds of cyclones. The solid particles, which have penetrated into the central duct and which rotate rapidly, concentrate along the conical walls (24), and are removed by the tubes (25) and optionally recycled.

The fluidized bed can be divided by a control ring (26) optionally provided with one or more passages (27) against the circular wall to enable the solid particles to pass from one side to the other. If the feed rate of the solid particles (17) via the line (16) is higher than the transfer rate of the solid particles through the passages (27), the thickness (28) of said fluidized bed upstream of the control ring (26) increases until it is sufficient for particles to overflow via the center of this ring to pass to the other side. And if the outlet flow rate of the solid particles via the line (19) is higher than the feed rate, the thickness (29) of the fluidized bed downstream of the control ring (26) decreases until the rarefaction of the solid particles automatically adjusts the outlet flow rate with the inlet flow rate of these particles. This device serves to maintain the volume of the fluidized bed approximately constant upstream of the control ring (26), preferably located close to the outlet (19), if the solid particle feed rate is sufficiently high. The passages (27) also serve to remove all the solid particles from the circular reaction chamber when the solid particle feed is stopped.

Since the reactor is horizontal, the effect of the force of gravity creates a difference in thickness of the fluidized bed and/or the solid particle concentration between the top (28) and the bottom (30) of the circular reaction chamber. The outlet (14) is preferably in the bottom of the reactor because the velocity and concentration of the particles is a maximum there, and hence the thickness of the fluidized bed is a minimum there, thereby reducing their probability of being entrained in the central duct (7).

Since the plane of the discharge opening (14) is perpendicular to the wall of the central duct, the thickness or width (31) of the reaction chamber is a minimum downstream of the discharge opening (14) and it is a maximum (32) upstream. The circular wall (2) is cylindrical in this illustration, and hence its radius (33) is constant, while the radius of curvature of the wall of the central duct (3) is variable. It is a minimum (34) upstream of the outlet (14) and a maximum (35) downstream.

The width (36) of the discharge opening (14) may be a maximum at the middle of the reaction chamber and a minimum close to the annular side walls (4.1) and (4.2) so that the cross section of the central duct is greater at its ends, in order to facilitate the removal of the fluid (11). It should be observed that this width (36) is preferably nil against these walls, to prevent the solid particles slowed down by these walls from being entrained into the central duct.

The reactor may be slightly inclined to increase the particle flow toward their outlet and hence to decrease their residence time in the reaction chamber. In this case, the surface of the fluidized bed is slightly conical, according to the extent of the inclination and the ratio of the force of gravity to the centrifugal force.

Figure 2:
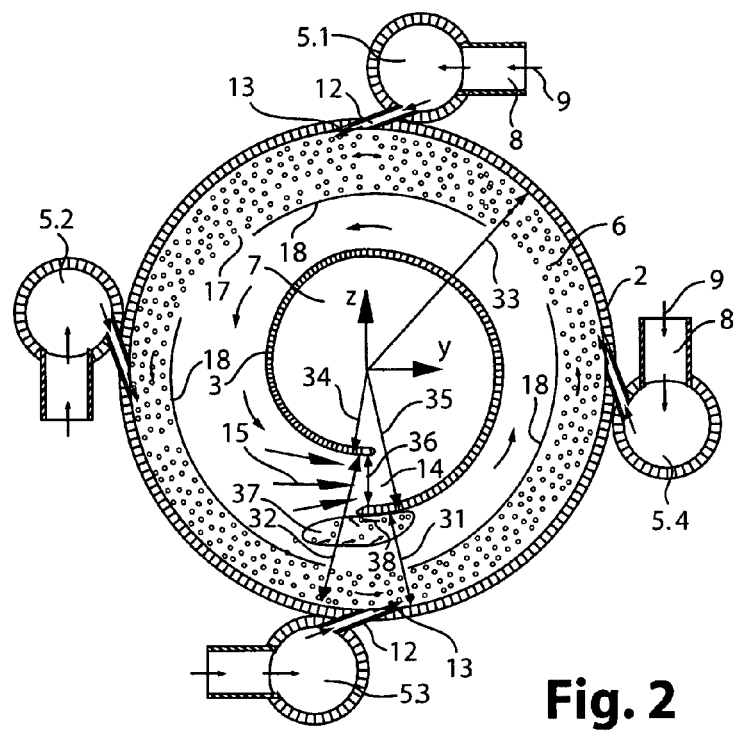
FIG. 2 shows a schematic transverse section, along the plane of the (y) and (z) axes, of a cylindrical reactor according to the invention.

FIG. 2 shows the schematic cross section, along the plane of the (y) and (z) axes, of the reactor in FIG. 1, where the annular distribution chamber (5) is replaced by four tubular distribution chambers, from (5.1) to (5.4), each connected to a fluid injector or set of fluid injectors (12). This arrangement may be preferred when the number of injectors is small.

It should be observed that the radius of curvature (35) of the wall (3) of the central duct is smaller (34) at its part upstream of the discharge opening (14), giving the appearance of a spiral, and that the width (31) of the circular chamber is preferably smaller downstream than upstream (32), because the fluid flow rate rotating around the duct increases as it approaches the discharge opening (14).

The surface (37) illustrates the cross section of a turbulence zone generated by the optional reversal of the fluid flow, illustrated by the arrows (38), downstream of the outlet (14) of the central duct. This turbulence may cause the removal of solid particles, generally the finest, via the discharge opening (14).

It is useful to observe that the force of gravity, which adds to the centrifugal force in the bottom of the reactor and which increases the velocity of the solid particles therein and hence the centrifugal force, generates a higher pressure there against the circular wall, which can justify a higher injection pressure in the tubular distribution chamber (5.3). Moreover, it may be advisable to reduce the injection pressure of the tubular chamber (5.2), upstream of the discharge outlet (14), to decrease therein the centripetal pressure of the fluid on the solid particles and hence the risk of entraining them into the central duct.

The numerical simulation shows that it is possible, in a cylindrical chamber 40 cm in diameter with 4 fluid injectors, injecting air at atmospheric pressure in a direction making an angle of 30° with the cylindrical wall, distributed at 90° intervals around each annular section of the cylindrical chamber, to form a dense rotating fluidized bed. However, it has been found that a large quantity of solid particles passes through the thin fluid layers and is slowed down along the circular surface upstream of the injection slits, where their concentration approaches the theoretical maximum, thereby increasing the resistance to the rotation of the fluidized bed. It has also been found that the interaction between the solid particles, whereof the slowdown generates a high pressure upstream of the injectors and the fluid whereof the injection pressure must be high to offset this high pressure of the solid particles of the opening of the injector outlets, may locally generate a strong centripetal thrust, which may project the solid particles toward the discharge opening if this strong thrust is upstream of the discharge opening, and thereby cause losses of solid particles.

To reduce this braking effect and avoid resonance events which can cause losses of solid particles, it is advisable to increase the number of injectors, preferably a primary number, and/or for the distance between the injectors not to be identical throughout. It is also preferable to give the injectors and the circular wall a shape suitable for minimizing the centripetal thrust of the fluid and favoring its tangential thrust.

Thus in FIG. 2, the planes of the outlet openings of the injectors are virtually merged with the planes parallel to the circular surface which is cylindrical, thereby favoring the centripetal thrust due to the fluid pressure on the solid particles even if the fluid injection angle is small.

Figure 3:
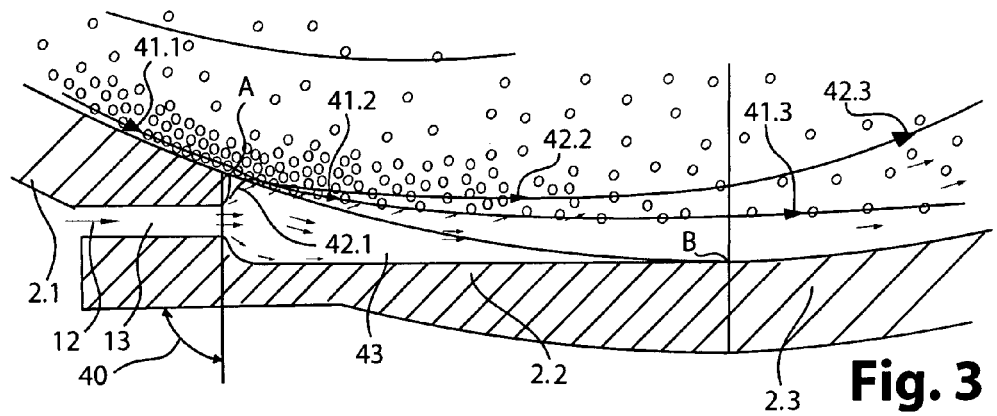
FIG. 3 shows the schematic transverse section of a zone around a fluid injector, showing how a small modification of the circular wall downstream of a fluid injector changes the orientation of its outlet plane.

FIG. 3 shows the schematic cross section of the zone around a fluid injector, showing how a small modification of the circular wall (2.2) downstream of a fluid injector (12), the latter becoming plane and tangential, at (B), at the prolongation of the circular wall (2.3), changes the orientation of its outlet plane, which accordingly makes an angle (40) of about 90° with the plane wall (2.2). The thrust generated by the high pressure of the fluid (13.1) on the upstream side of its outlet, at (A), is thereby directed more tangentially to the circular wall.

The solid particles, highly concentrated, symbolized by small circles (17), form a compact set which slides along the circular wall (2.1) in the direction (41.1) upstream of the injector (12.1). Their meeting with the flow line (42.1) of the fluid (13), at the injector outlet, deviates them progressively and accelerates them along the flow line (41.2) and hence their concentration decreases progressively, enabling an increasingly large fraction of the fluid to penetrate this less and less compact set of solid particles by following the fluid flow line (42.2) which penetrates increasingly (42.3) into the fluidized bed while deviating from the wall (2.3).

The fluid pressure in the space (43), between the wall (2.2) and the flow line (41.2) of the solid particles must be sufficient to prevent the solid particles from clogging the fluid outlet and therefore to deviate them along this flow line (41.2). As the fluid accelerates the solid particles, its energy and hence its pressure decreases, enabling the solid particles which follow the flow line (41.3) to approach the circular wall (2.3) which slows them down and hence increases their concentration until they pass in front of the next injector. And so on and so forth.

If the angle (40) between the plane of the injector outlet (12) and the circular wall was closer to 0° as in FIG. 2, the change in direction (41.2) of the solid particles would be more sudden, generating a higher pressure and hence a higher fluid thrust on the solid particles located against the part upstream of the injector, in a direction perpendicular to this plane and hence centripetal, and the flow line (41.2) would deviate more from the wall (2.2), thereby increasing the slowdown of the solid particles upstream and bringing them closer to the central duct.

This illustration shows how the solid particles slowed down by the curved wall of the reaction chamber and, striking the obstacle presented by the injection of a fluid jet, can form a compact set which substantially slows down the normal sliding of these solid particles, and how the arrangement and orientation of the outlet opening of the injectors and of the fluid injection direction can minimize this braking effect and the centripetal pressure exerted by the fluid on the solid particles upstream of its outlet.

Figure 4:
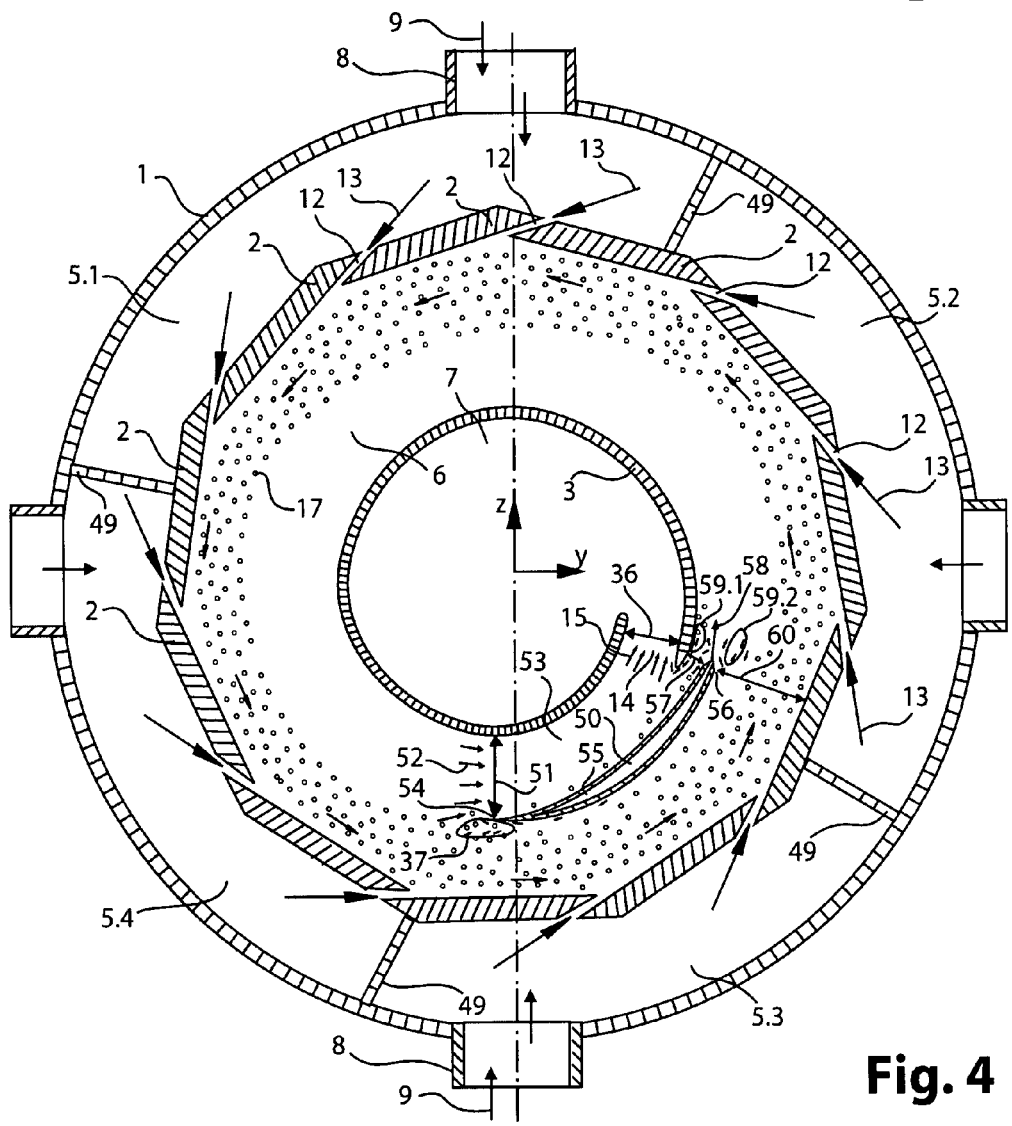
FIG. 4 shows the schematic transverse section, along the plane of the (y) and (z) axes of a reactor whereof the devices for feeding and removing the fluid(s) from the reaction chamber have been modified.

FIG. 4 shows the schematic cross section, along the plane of the (y) and (z) axes of a reactor whereof the devices for feeding and removing the fluid(s) from the reaction chamber have been modified to improve the proportion between the transfer of the tangential and centripetal angular momentum of the fluid to the solid particles and to reduce the quantity of solid particles escaping via the discharge opening (14) of the central duct. The number of fluid injectors having been increased, 11 in this example, the feed chamber is preferably bounded by a cylindrical wall (1) surrounding the circular wall (2) and it is divided into longitudinal segments, from (5.1) to (5.4), by longitudinal walls (49), to feed the various fluid injectors (12) at different pressures.

The circular wall is plane between two injectors (12). It is therefore polygonal. The fluid is injected parallel to this surface, according to the arrangement shown in FIG. 5, to facilitate the sliding of the solid particles along it and to reduce their concentration upstream of the injection slits and hence to decrease their resistance to travel.

A hollow wing-shaped deflector with a cross section (50), passing through longitudinally, that is perpendicular to the plane of the figure, the circular reaction chamber (6) and fixed to the two annular side walls (4.1) and (4.2), not shown in this figure, through which a pressurized fluid can be introduced therein, is placed at a distance (51) from the wall of the central duct (3), upstream of the discharge opening (14). It channels the fluid stream (52) into the space (53) between it and the wall of the central duct.

The turbulence zone (37) which may develop along the leading edge (54) of the deflector (50) can entrain solid particles into this space (53). The distance (51) being preferably greater than the thickness (36) of the discharge opening (14), the velocity of the fluid (52) which accelerates these solid particles, progressively increases and the centrifugal force thrusts them along the curved inner wall (55) of the hollow deflector (50).

The trailing edge (56) of the deflector, located at the distance (57) from the wall of the central duct (3), is equipped with one or more fluid injectors for injecting a thin layer of fluid (58) at high velocity more or less parallel, preferably at less than about 30°, to the wall of the central duct (3) producing a suction effect which returns to the reaction chamber (6) beyond the discharge opening (14), the solid particles flowing along the inner wall (55) of the deflector. However, a turbulence zone (59.1) may be developed between the thin fluid layer (58) and the wall of the central duct (3) and generate a flow reversal which returns part of these particles to the outlet (14). To minimize this influence, it is preferable for the pressure drop in the space (53) to be low and hence for the quantity of solid particles that the fluid stream (52) must accelerate to be low and for the distance (57) to be short, preferably shorter than half of the distance (60) between the leading edge and the circular wall.

Another turbulence zone (59.2) may be developed between the fluid jet (58) and the circular wall and cause a fluid flow reversal which increases the resistance to rotation of the fluidized bed upstream of this zone. To minimize the influence thereof, it is preferable for the injection of the thin fluid layer (58) to be parallel to or directed slightly toward the wall of the central duct (3).

Figure 5:
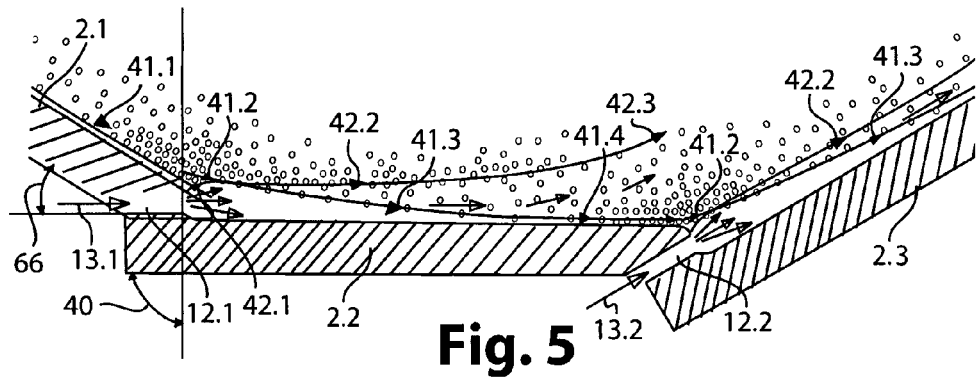
FIG. 5 shows an enlargement of the zone located around two fluid injectors.

FIG. 5 shows an enlargement of the zone around the two injectors (12.1) and (12.2). The solid particles, upstream of the injector (12.1), slide along the plane wall (2.1) along the flow line (41.1). They exert a pressure on the fluid stream (13.1) at its outlet from the injector (12.1), whereof the outlet surface makes an angle (40) of about 90° with the plane surface of the wall (2.2), and they prevent the normal expansion of the fluid entering the reaction chamber, forcing it to follow the flow line (42.1) whereof the pressure compensates for the pressure of the solid particles and diverts them along the flow line (41.2), which progressively penetrates into the layer of this fluid. The solid particles form a barrier, which acts as a more or less permeable deflector according to their concentration, and they confine the fluid between the flow line (42.2) and the polygonal wall (2.2) and the fluid which retains a high average velocity, because it is confined in a narrow space, loses energy and hence pressure as it transfers it to the solid particles flowing along the flow line (41.3), accelerating them, and hence their concentration decreases and their permeability increases, thereby enabling the flow line, (42.3) to deviate from the wall (2.2) and hence enabling the fluid, which has lost some of its energy, to slow down. The flow line (41.4) of the solid particles ultimately runs along the wall (2.2), along which they slide, slow down, and their concentration increases before reaching the next injector (12.2). And so on and so forth.

The concentration of the solid particle stream upstream of the injectors increases as the distance between the fluid injectors (12.1) and (12.2) increases, and hence as their number decreases, and if the surface of the plane wall (2.2) was curved like the walls (2.1) and (2.3) in FIG. 3, they would exert an additional pressure on the solid particle streams (41.1) and (41.4), which would slow them down and increase their concentration and the resistance to the rotation of the fluidized bed.

The angle of deviation (66) between two injectors is smaller if the number of injectors is higher, thereby decreasing the deviation of the solid particle streams (41.2) and (41.3) and hence the pressure exerted on the fluid streams (13.1) and (13.2) and hence also the quantity of solid particles which can concentrate along the polygonal circular wall after having passed through these fluid streams and hence also the resistance to rotation of the fluidized bed. The angle (40) made by the plane of the injector outlet (12.1) and the polygonal circular wall (2.2) is about 90°, enabling the injection of the fluid (13.1) in a direction virtually parallel to this wall (2.2) and thereby increasing the quantity of tangential angular momentum transferred to the solid particles.

This illustration shows that the solid particles are borne by a fluid pad whereof the pressure offsets the centrifugal force and enables these particles to slide along the polygonal circular wall with a very low resistance to rotation, if the number of fluid injectors is high.

The circular reaction chamber can be connected in series with other similar chambers, the outlet (19) of the solid particles from the upstream chamber being connected to the inlet (16) of the next chamber. These circular reaction chambers may be side by side, in the prolongation of one another, or superimposed. They may be inclined or vertical.

Figure 6:
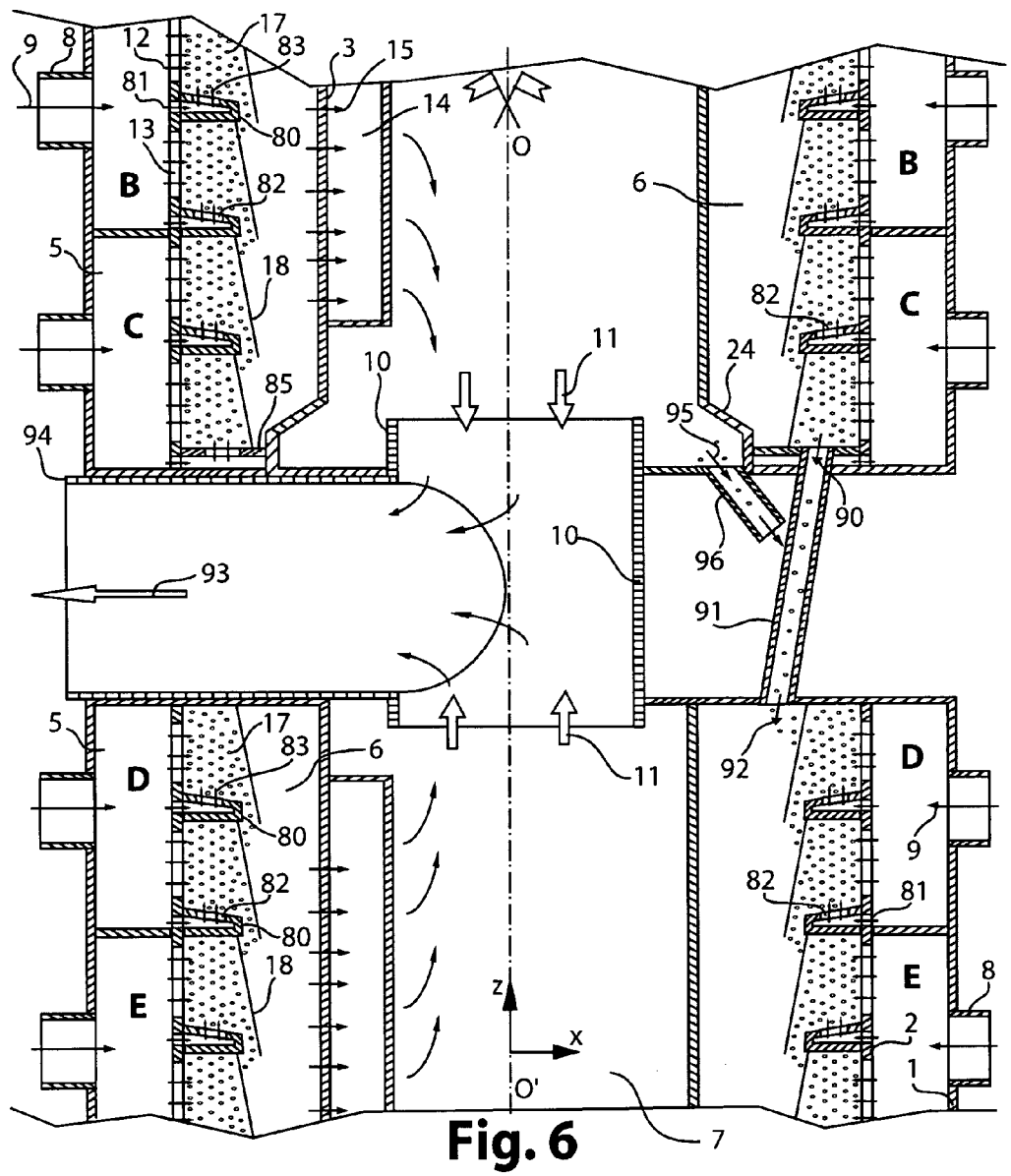
FIG. 6 shows the schematic longitudinal section, in the plane of the (x) and (z) axes, the (z) axis being vertical and coinciding with the axis of rotation (OO') of the fluidized beds, of the connection of two sections of superimposed circular chambers.

FIG. 6 shows the schematic longitudinal section, in the plane of the (x) and (z) axes, the (z) axis being vertical and coinciding with the axis of rotation (OO') of the fluidized beds, of the connection of two sections of superimposed circular chambers. The surfaces (18) of the fluidized beds being conical, the fluidized beds of the reaction chambers (6) are subdivided into annular sections by separating rings (80) which support the part of the fluidized bed directly located above them. These are hollow and connected to the fluid distributing chambers (5) via openings (81) for injecting, via the injectors (82), more or less parallel to the plane of the (x) and (y) axes and perpendicular to the axis of rotation (OO'), fluids, symbolized by the arrows (83) in thin layers, which support and rotate the solid particles which bear against the upper part of the separating rings (80).

The separating ring (85) located at the bottom of the reaction chambers is prolonged to the wall of the central duct (3) while the other separating rings (80) have a wide central opening, preferably greater than one-quarter of the average distance between the circular wall and the central duct, to enable the solid particles to pass therein while remaining at a certain distance from the wall of the central duct (3), to avoid being entrained into the central duct via the discharge opening (14).

A stream of solid particles (80) leaves from the bottom of the upper circular reaction chamber via the transfer line (91) which passes through the separating ring (85) and penetrates (92) into the upper part of the lower chamber. The fluid streams (11) are removed from the central ducts (7) by one or more lines (93).

It should be observed that if the fluid pressure beyond the fluidized bed is more or less the same in each circular reaction chamber, the pressure of the inlet of the transfer line (91), located in the fluidized bed, close to the circular wall, is higher than the pressure at its outlet, located outside the fluidized bed, near the wall of the central duct, thereby facilitating the transfer of the solid particles from one reactor to the other, even when the reactors are horizontal and located at the same height.

Finally, the solid particles (95), which have penetrated into the central duct (7) passing through the discharge opening (14) and which fall while rotating in the bottom of the central duct, are removed therefrom by the tube (96), which is actually not in the same plane as the transfer line (90), in order to make them intersect. Since the pressure at this place is lower than the pressure in the reaction chamber, these solid particles must therefore be collected separately, to be optionally recycled by appropriate means.

The separating rings (85) may be replaced by helical turns. The solid particles rotating along the circular wall and along a helical turn will rise if the slope of the turn is upward. In this case, it is possible to transfer the solid particles from the lower chamber to the upper chamber, if the lower part of the transfer line (91) is located along the circular wall, where the pressure is the highest, and the upper part of this line (91) is located against the central duct, where the pressure is the lowest. The particles which are not transferred or removed from the upper part of the circular reaction chamber can fall back into the central space between the inner edge of the turns and the central duct. The helical turns can also be hollow and fed with fluid which is injected along their upper surface into the circular reaction chamber. They can form a continuous or diskontinuous helical spiral or may be fragmented into fractions of turns, similar to fixed fins, oriented in the upward direction.

Figure 7:
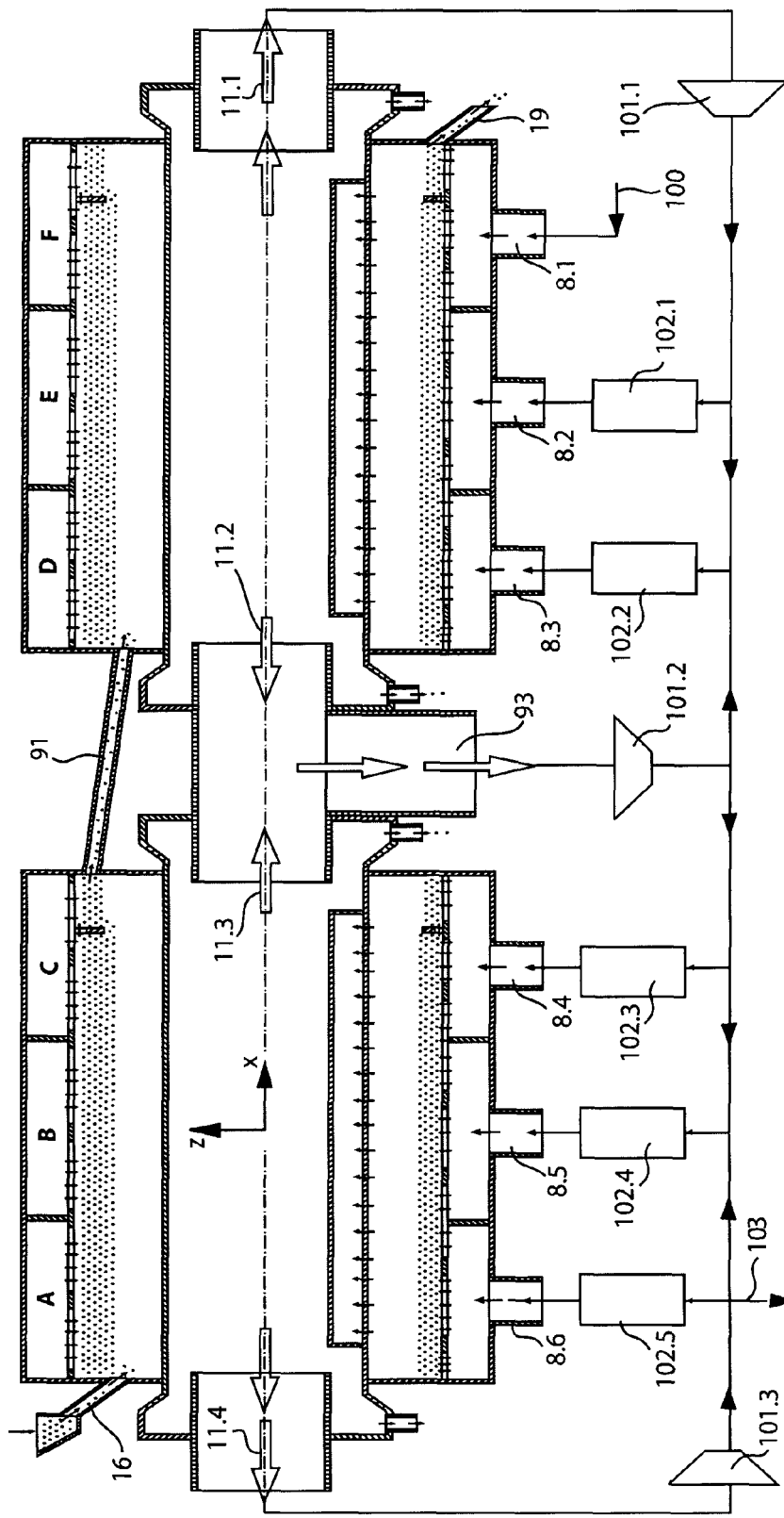
FIG. 7 shows a diagram adapted to the drying of solid particles introduced on one side of two circular reaction chambers placed in series.

The fluid streams can be recycled according to arrangements adapted to the objectives. For example, FIG. 7 shows an arrangement adapted to the drying of solid particles introduced by the tube (16) on one side of one of the two circular reaction chambers placed in series and exiting via the tube (19) placed at the opposite end of the second chamber, the transfer of these particles from one reactor to the other taking placing via the transfer line (91).

The cool and dry gas (100) is introduced by the tube (8.1) feeding the annular section (F) of the feed chamber located on the side of the outlet (19) of the solid particles. It is heated in contact with the hot solid particles which it cools, while completing their drying before they exit via the tube (19) this gas is then sucked out by the compressor (101.1) through the outlet tube (11.1). It is recycled through treatment units (102.1) and (102.2), for example heat exchangers and/or condensers, by tubes (8.2) and (8.3) to the annular sections (E) and (D). It is then recycled successively by the compressors (101.2) and (101.3) in tubes from (8.3) to (8.6) through treatment units from (102.2) to (102.5), to the annular sections from (D) to (A), in order to progressively remove the moisture from the solid particles. The fluid, which is laden with moisture and which has been cooled by the solid particles, which are introduced by the tube (16) on the side of the tube (8.6) and which it has heated, is removed at (103).

The solid particles may be catalysts which catalyze the chemical conversion of the fluid passing through the fluidized bed. In this case, the fluid is progressively converted. It is in contact during its first passage into the reactor with a spent catalyst which can be regenerated and recycled by appropriate devices, and during its second passage with a fresh or regenerated catalyst, and the treatment units from (102.1) to (102.5) can also serve to remove an undesirable component, for example by absorption or condensation.

Figure 8:
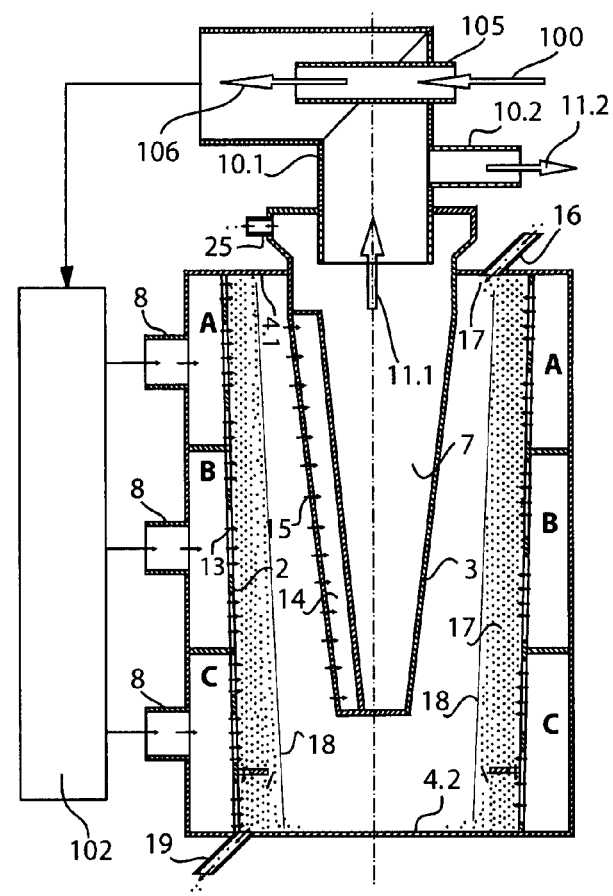
FIG. 8 shows the diagram of a schematic longitudinal section of a reactor similar to that of FIG. 1, but whereof the axis of rotation of the fluidized bed is vertical or steeply inclined, and whereof the central duct terminates at a certain distance above the lower side.

FIG. 8 shows the arrangement of the schematic longitudinal section of a reactor similar to that of FIG. 1, but whereof the axis of rotation of the fluidized bed is vertical or steeply inclined and whereof the central duct (7) terminates at a certain distance above the lower side (4.2). The bottom of the central duct may be closed, as shown in FIG. 8, or open. In this case, the solid particles entering the central duct can be removed therefrom via the bottom during shutdowns, but during operation, swirls may entrain therein the solid particles which accumulate in the bottom of the circular reaction chamber.

This configuration may be advantageous when the quantity of fluid to be removed is not too large. Since the surface (18) of the fluidized bed is conical, very slightly conical in this diagram, implying a very high centrifugal force, the fluid (13) must cross a higher thickness of the fluidized bed in the lower part of the reaction chamber and hence its residence time therein is longer. If this is to be avoided, the circular chamber (2) may also be conical to reduce this difference and/or the quantity of fluid injected into the lower part of the circular reaction chamber can be increased, for example by increasing therein the number and/or cross section of the fluid injectors and/or the pressure in the annular section (C) of the distribution chamber.

FIG. 8 also comprises, for illustration, the arrangement of a system for feeding the fluid by ejector for recycling a fraction of this fluid without using a compressor. This arrangement is useful for when the fluid must be recycled only once or twice and when the use of compressors is difficult, for example due to the corrosiveness of the fluid or very high temperatures, such as, for example, for the dehydrogenation of ethylbenzene or the catalytic cracking of gasoline to light olefins.

The fluid feed (100) optionally preheated, is injected under pressure into an ejector (105), to be injected (106) at very high velocity into the outlet tube (10.1) of the fluid to be recycled (11.1) in order to entrain it into a treatment unit (102), for example a furnace, and to recycle it to the reactor via the tubes (8), before being removed (11.2) via the tube (10.2) toward treatment units.

Figure 9:
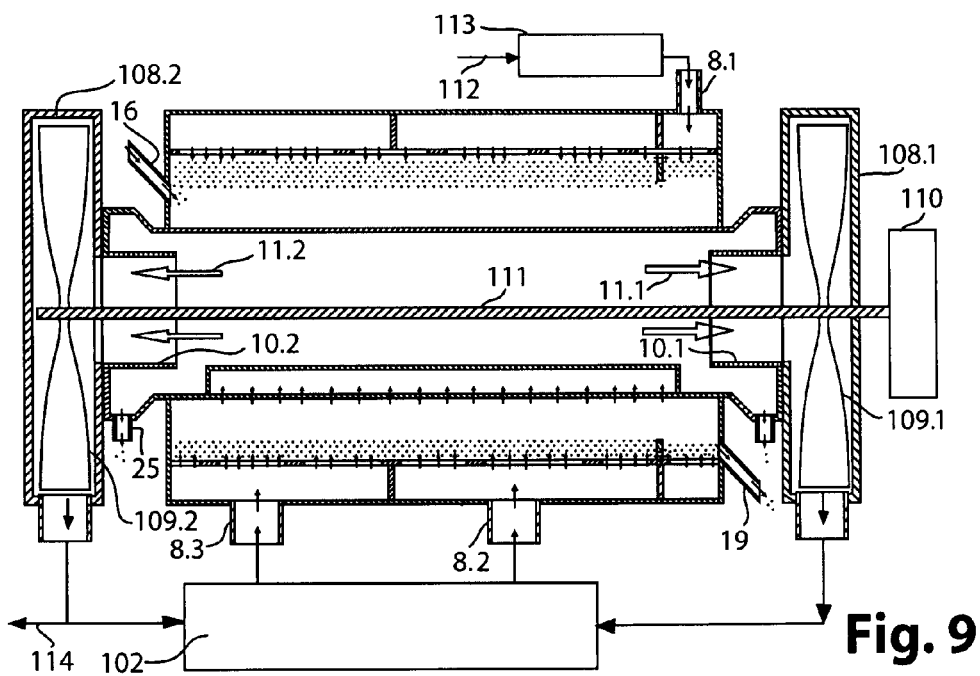
FIG. 9 shows the diagram of a longitudinal section of a reactor similar to that of FIG. 1, comprising a centrifugal compressor at each end of the central duct.

FIG. 9 shows the diagram of a longitudinal section of a reactor similar to the one in FIG. 1, comprising at each end of the central duct a centrifugal compressor, (108.1) and (108.2), symbolized by the impellers (109.1) and (109.2), which are driven by a common motor (110) using the transmission shaft (111) passing through the central duct. The fresh fluid (112) is fed by the tube (8.1) located on the outlet side (19) of the solid particles, optionally passing through a treatment unit (113) such as for example a moisture condenser. It is then recycled a number of times, successively by the compressors (108.1) and (108.2) through tubes (8.2) and (8.3) and the treatment unit (102), such as for example a heater, before being removed. This very compact arrangement can be advantageously used in easily transportable units, for example, for drying agricultural grains.

The fluid streams can be recycled to the same annular sections, for example to polymerize the catalyst particles in suspension in mixtures of active fluids containing the monomer(s) and possibly having different compositions and/or temperatures from one section to the other, to obtain multimodal and/or wide molecular distribution polymers.

Figure 10:
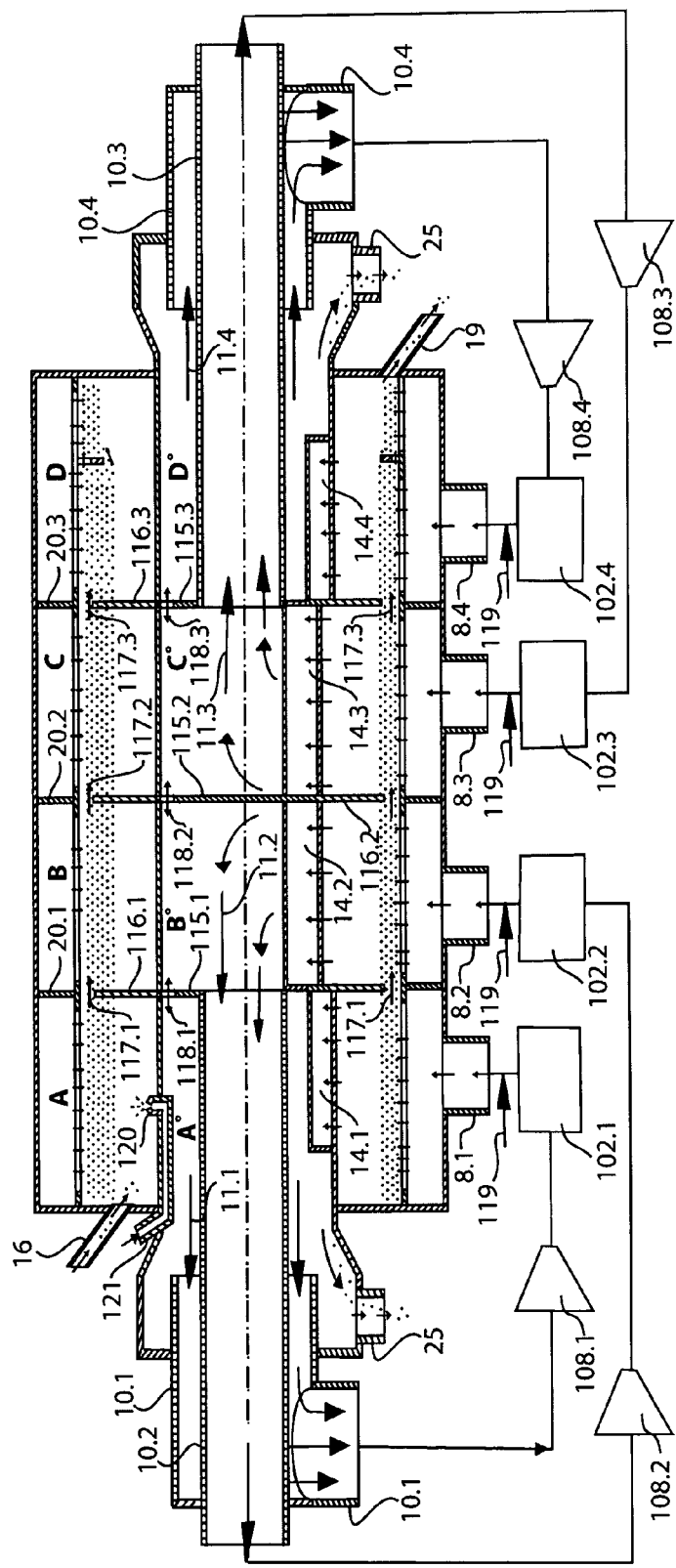
FIG. 10 shows an embodiment of the invention in which the feed chamber and the central duct of a cylindrical reactor according to the invention are divided into four sections.

FIG. 10 shows an arrangement which can serve for this type of application. The feed chamber and the central duct are divided into four sections, respectively (A) to (D) and (A°) to (D°), by transverse walls from (20.1) to (20.3) and from (115.1) to (115.3). These walls may be prolonged by annular transverse walls from (116.1) to (116.3) to also separate the circular reaction chamber into four annular sections corresponding to the four sections of the feed chamber and of the central duct, to better separate the fluids from one section to the other, provided that passages from (117.1) to (117.3) are provided in these annular transverse walls, from to (116.1) to (116.3), along the circular wall for transferring the solid particles from one annular section to the other, and passages from (118.1) to (118.3) against the central duct or inside it for the passage of fluid in order to equalize the pressures between the various sections of the central duct.

Four compressors, from (108.1) to (108.4) suck out the fluids from (11.1) to (11.4), from the sections (A°) to (D°), of the central duct through concentric tubes, from (10.1) to (10.4), to recycle it to the feed chambers from (A) to (D), by tubes from (8.1) to (8.4), passing through the treatment units (92.1) to (92.4), for example heat exchangers with optional withdrawal of undesirable components and/or of fluid to be purified before being recycled. The recycled fluids then pass through the rotating fluidized bed and enter the discharge openings of the central duct, from (14.1) to (14.4), to be recycled again to the same sections. The fresh fluids (119) can be fed directly, as required, by the feed tubes from (8.1) to (8.4).

If the fluids are gases, it is possible to spray fine droplets (120) of a liquid on at least part of the surface of the fluidized bed by one or more tubes (121) passing through the central duct.

These arrangements can only operate if the momentum transmitted by the fluid to the solid particles is sufficient to accelerate them as they are transferred from inside the reaction chamber at an average rotational velocity, $V_p$, which is sufficiently high for the centrifugal force to offset the centripetal pressure exerted by the fluid, and to offset their losses of angular momentum due to the turbulence and the friction along the walls.

It is also necessary for the fluid, after having been slowed down by the solid particles, to retain a sufficient average tangential velocity to avoid a significant reflux. For example, it must make on average at least one half turn before leaving the reaction chamber in the arrangements described above, which contain only one outlet opening (14) per section, and in which the fluid is injected more or less uniformly along the circular wall.

By way of an indicative example, the first condition can be written, for an annular section of the reaction chamber, approximately, ignoring the effect of the pressure variations assumed to be slight on the fluid density:

$$Ke \times m \times (Vi-Vt) \times Vi \times Ei, = Cc \times M \times p \times E \times (2 \times R-E) \times Kf \times Vp \quad (1)$$

where $K_e$, which may be higher than 1 when the fluid that has been injected is confined between a "wall" of solid particles and the circular wall for converting a fraction of its kinetic energy and/or its pressure to angular momentum, is a variable coefficient of the efficiency of transfer of the tangential angular momentum from the fluid to the particles, $m$, $V_i$ and $V_t$ are respectively the mean values of the density, the injection velocity and the tangential velocity of the fluid, $E_i$ is the sum of the thicknesses (widths) of the outlet openings of the injectors passing through the annular section, $C_c$ and $M$ are the average concentration and the density of the solid particles, $E$ and $R$ are the average thickness (width) and the radius of the reaction chamber and, $K_f$ is a variable friction coefficient representing the % of angular momentum which the solid particles must receive per unit of time to reach and to preserve an average rotational velocity $V_p$.

Conservation of fluid mass, assuming m constant, which is approximately correct for slight variations in pressure, gives: $Ei \times Vi \approx (1-Cc) \times E \times Vt/a$, where a is the average number of turns or fraction of turns traveled by the fluid before exiting the reaction chamber.

If $V_p = \beta \times V_t$, where $\beta < 1$ is a slip coefficient of the solid particles in the fluid, equation (1) becomes:

$$(1-Cc)/a \approx Ei/E + X \times (2-E/R), \text{ where } X = p \times R \times \beta \times Cc \times Kf \times M/(Ke \times m \times Vi).$$

The second condition can be written $a > a°$, where $a°$, generally close to ½, is the minimum number of fractions of turns which the fluid must travel on average around the central duct to avoid a reflux permitting the entrainment of an excessive quantity of particles into the duct. Equation (2) then gives:

$$X=p \times R \times \beta \times Cc \times Kf \times M/(Ke \times m \times Vi) < [(1-Cc)/a°-Ei/E]/(2-E/R) \quad (3), \text{ and preferably smaller than 1.}$$

This shows that, when the ratio of densities M/m is very high, which is generally the case when the fluid is a gas at a pressure close to atmospheric pressure, the product of the ratios $(R/V_i) \times (Cc \times Kf/Ke)$ must be very small, requiring a smaller $Cc \times Kf/Ke$ ratio and/or a higher fluid injection velocity $V_i$, the greater the radius R. It is therefore necessary to have a high efficiency of angular momentum transfer from the fluid to the solid particles and low friction between the solid particles and the circular wall to obtain acceptable average solid particle concentrations in industrial-scale reactors using gases at pressures close to atmospheric pressure.

Furthermore, the centrifugal force exerted on the solid particles must also be greater than the centripetal pressure of the fluid, approximately proportional to the square of the average radial velocity, $V_r$, of the fluid close to the circular wall, to prevent an excessive number of particles from approaching the wall of the central duct (3) upstream of the outlet (14) or of the deflector (40). This can be written, to a first approximation as: $V_r < V_c \times V_p/(g \times R)^{1/2}$ (4); where g is the gravitational acceleration and $V_c$ is the critical upward velocity, which is lower the smaller the size of the solid particles, not to be exceeded in order to obtain a dense fluidized bed, if it is balanced only by the force of gravity.

Conservation of fluid mass, with slight pressure variations which make it possible to ignore the variations in fluid density, gives: $2 \times p \times R \times Vr \sim E \times Vt/a$ and the inequality (4) becomes approximately:

$$E < 2 \times p \times a \times \beta \times Vc \times (R/g)^{1/2} < 2 \times a \times Vc \times (R)^{1/2} \quad (5) \text{ if R and Vc}$$

are expressed in m and m/s.

This inequality indicates that the maximum average thickness of the reaction chamber can only increase proportionally to the square root of R, when the critical velocity, $V_c$, and hence the size of the solid particles, are very low, and that it is preferable to use small-diameter reaction chambers, if it is undesirable to have a very low E/R ratio.

If it is desirable to have the fluidized bed traversed by a maximum fluid flow when the maximum fluid injection velocity, $V_i$, is limited, the total cross section, $E_i$, of the fluid injectors must be increased. If the critical velocity, $V_c$, is low, the above conditions serve to determine that the optimum is reached when the average thickness (width) of the reaction chamber is approximately:

$$E=2 \times p \times a° \times \beta \times Vc \times (R/g)^{1/2} \quad (6)$$

and that $$Ei=E \times [(1-Cc)/a°-X \times (2-E/R)] \quad (7).$$

Or, as a first approximation, $a°$ generally being close to 0.5 and $\beta$ close to 1, it is advisable that: $E/R < Vc/(R)^{1/2}$ (8) expressed in m and m/s, and $Ei/E < 2 \times (1-Cc)-X \times (2-E/R)$ (9) which imposes a low X and hence generally a high injection velocity, $V_i$, when $V_c$ and hence E/R are low, because the solid particles are small.

However, to avoid approaching the boundary conditions, in practice, it is advisable for estimating the optimum thicknesses (width) of the reaction chamber and of the gas injectors, to use an average concentration, $C_c$, of the solid particles and/or a theoretical fluid injection velocity, $V_i$, respectively higher than the solid particle concentrations and lower than the fluid injection velocities which are intended to be used.

For example, a numerical simulation shows that an average concentration of Cc=30% of very small solid particles, having a critical velocity of Vc=0.4 m/s, can be obtained with a good separation of the fluid and the solid particles, in a reaction chamber 0.4 m in diameter with a central duct 0.14 m in diameter having only one discharge opening, by injecting air at atmospheric pressure at a velocity of 30 m/sec through 8 injectors each having an outlet thickness (width) of 0.004 m, the fluid on average making only one half-turn around the central duct with a fluid residence time in the reactor of about $1/10$ second. The estimated average tangential velocity of the solid particles and that of the gas vary respectively from about 4.6 to 4 m/s and from 5.5 to 5 m/s, and the coefficient X and the product of Cc×Kf/Ke vary only from 0.9 to 1 and from 7%/s to 8%/s, when the solid particle concentration is progressively increased from 10 to 30%, confirming that the efficiency of angular momentum transfer from the fluid to the solid particles improves when the solid particle concentration, and hence the "walls" of solid particles channeling the fluid, increases. Losses of solid particles via the central duct appear and increase rapidly when the average solid particle concentration approaches 28% and when the coefficient X is close to 1.

If the number of fluid injectors is reduced to 4, the product Cc×Kf/Ke becomes about 2.5 times higher, imposing an increase in the gas injection velocity Vi to 60 m/sec so that the coefficient X remains below 1 and the losses of solid particles via the central duct become large above a concentration of 25%, which confirms the need to have a large number of gas injectors when the ratio M/m is very high. And if the number of discharge openings in the central duct is increased, the losses of solid particles already become significant with even lower concentrations, confirming the advantage of having only one discharge opening per transverse section of the central duct.

If the ratio of the density of the solid particles to the fluid density is 25 times lower, for example by increasing the pressure to 25 bar, the fluid rotates about 5 times faster and makes on average more than 2 revolutions around the central duct before entering therein, and the centrifugal force is about 25 times higher. This makes it possible to increase the concentration of solid particles and/or decrease the fluid injection velocity and/or increase the diameter of the reaction chamber, while maintaining very good separation of the fluid and the solid particles. The performance can also be improved if the friction coefficient, Kf, is lower and if the efficiency of coefficient of angular momentum transfer, Ke, is higher, which can be obtained by increasing the number of fluid-injectors and by improving the profile of the injectors and of the circular chamber.

If a the fluid is a liquid slightly lighter than the solid particles, its number of revolutions, rotational velocity and the centrifugal force further increase, making it possible to preserve acceptable separation of the fluid and the solid particles, even if the critical velocity Vc is much lower due to the slight difference in densities.

These examples show that it is only when the ratio of the density of the solid particles to that of the fluid is several hundreds that the injection velocity of the fluid(s) must be much higher than the desired rotational velocity of the solid particles and/or the reaction chamber must have a small diameter.

According to another embodiment, the present invention relates to a rotating fluidized bed device in a succession of cylindrical chambers for the catalytic polymerization, drying, impregnation, or other treatments of solid particles, in suspension in rotating fluidized beds, passing from one chamber to the other, by a fluid or fluid mixture, or for the cracking, dehydrogenation or other catalytic conversions of a fluid or fluid mixture, passing through the rotating fluidized beds, composed of solid catalyst particles passing from one cylindrical chamber to the other. More particularly, the invention relates to a rotating fluidized bed device and method of catalytic polymerization, drying or other treatments of solid particles or of the catalytic conversion of fluids, in which a cylindrical reactor, into which the fluids are injected tangentially to its cylindrical wall, is divided into a succession of cylindrical chambers by hollow disks, which are fixed to its cylindrical wall, which have central openings through which the fluids flowing while rotating in the cylindrical chambers are sucked out, which have side openings through which these fluids are removed through the cylindrical wall of the reactor and which have passages enabling the transfer of the solid particles in suspension in the rotating fluidized bed from one chamber to the other through these disks. Hence, in the present invention, a cylindrical reactor is divided into a succession of cylindrical chambers by a succession of flat cylinders or hollow disks fixed against its side wall. These hollow disks comprise openings at their center in order to suck therein the fluid passing through each chamber while rotating rapidly, and openings in their side wall to remove it outside the reactor. These hollow disks are traversed by appropriately profiled passages to enable the solid particles in suspension in the fluid, rotating rapidly, to pass from one cylindrical chamber to the other. In this embodiment, the present invention hence relates to a rotating fluidized bed device comprising: a cylindrical reactor; a device for feeding solid particles to said reactor and a device for removing said solid particles from said reactor, for removing said solid particles in suspension in said rotating fluidized beds; a device for feeding fluids, gases or liquid, designed to inject said fluid or fluid mixture into said rotating fluidized beds, in a uniformly distributed manner along the cylindrical wall of said reactor in directions approximately tangential to said cylindrical wall and approximately perpendicular to the axis of symmetry of said reactor, for thereby rotating said rotating fluidized beds at a velocity producing a centrifugal force thrusting said solid particles toward said cylindrical wall; a device for removing said fluid or fluid mixture, centrally, along the axis of symmetry of said reactor; characterized in that it comprises hollow disks, perpendicular to the axis of symmetry of said reactor and fixed against the cylindrical wall of said reactor, dividing said reactor into a succession of cylindrical chambers interconnected by passages arranged through said hollow disks, enabling said solid particles in suspension in said rotating fluidized beds to pass from one said cylindrical chamber to the other, and in that said device for removing said fluid or fluid mixture comprises said hollow disks which are each provided with at least one central opening around said axis of symmetry and with at least one side opening connected to at least one collector outside the reactor, for removing said fluids through said hollow disks and for regularizing the outlet pressures of said cylindrical chambers.

In the present invention, the fluid or fluid mixture is injected tangentially along the cylindrical wall of the reactor, generally in thin films, and, while rotating, passes through the reactor radially, from its side wall to its center, from where it is removed via the central openings of the hollow disks. The fluid injection velocity and its flow rate are sufficient to rotate the solid particles in suspension in a rotating fluidized bed at a rotational velocity producing a centrifugal force separating them from the central openings of the hollow disks through which the fluid is removed and enabling their transfer from one cylindrical chamber to the other, through passages in the hollow disks, despite a possible slight difference in pressure between these cylindrical chambers.

In the present invention, the fluid is fed by one or more distributors, outside the reactor, in order to distribute it appropriately to the injectors located in the various cylindrical chambers. It is then removed, through the hollow disks, by one or more fans or compressors, which suck it out through one or more collectors, outside the reactor and interconnected, in order to regularize the pressures in the various cylindrical chambers. The fluid can then be recycled, after appropriate treatment, for example, cooled or heated, by the same distributors or other distributors, to the same cylindrical chambers or the next ones. It can be recycled several times to the same cylindrical chambers or to successive cylindrical chambers.

The solid particles are generally introduced at one end of the reactor and then transferred from one cylindrical chamber to the other, thanks to their rotational velocity and to the profile of the passages through the hollow disks. They are generally removed at the opposite end of the reactor. A solid particle recycle device can be provided outside the reactor.

The present invention may comprise, to improve the efficiency of transfer of energy between the fluid and the solid particles, appropriately profiled deflectors arranged close to the fluid injectors, in order to mix the fluid with a limited quantity of solid particles and in order to channel the fluid to prevent or to reduce its expansion in the reactor before it has transferred a substantial quantity of its kinetic energy to these solid particles. This device makes it possible to use much lighter fluids than the solid particles and to inject it at high velocity into a large reactor without losing a large part of its kinetic energy on account of its expansion in the reactor. Such a device is described in a Belgian patent application in the name of the same inventor and filed on the same day as the present application.

The present invention may comprise sets of helical turns or transverse fins, inclined or wound in a spiral and fixed along the cylindrical wall of the cylindrical chambers, to use part of the kinetic rotational energy of the solid particles to make them rise along this wall in order to reduce the difference in thickness between the top and the bottom of the fluidized bed. This device serves to increase the height of the cylindrical chambers without having to increase the thickness of the fluidized bed at its base. Such a device is described in Belgian patent application no. 2004/0186, filed 14 Apr. 2004 in the name of the same inventor.

The reactor may be horizontal. In this case, the fluid injection velocity into the reactor and its flow rate must be sufficient to make the fluidized bed rotate at a rotational velocity producing a sufficient centrifugal force for its thickness in the upper part of the reactor to be close to its thickness in the lower part of the reactor and the openings normally provided in the center of the hollow disks may be slightly offset downward to better center them with regard to the approximately cylindrical surface of the fluidized bed.

This method serves to increase the difference in velocity between the solid particles and the fluid without reducing the density of the fluidized bed thanks to the centrifugal force, and therefore to improve the contact and heat transfer between them. It also serves to significantly increase the volume of fluid passing through the fluidized bed and hence to significantly reduce the residence time of the fluid in the fluidized bed.

According to a preferred embodiment, the invention relates to a device, characterized in that said device for feeding said fluid or fluid mixture is equipped with side deflectors, placed close to the fluid injectors for mixing said fluid or fluid mixture with part of said solid particles rotating in said cylindrical chambers and for accelerating them in the spaces bounded by said side deflectors, appropriately profiled to enable said fluid to transfer a large part of its energy to said solid particles before leaving said bounded spaces and enabling said solid particles to transfer the momentum acquired to the other said solid particles rotating in said cylindrical chambers after they exit these said bounded spaces.

According to another preferred embodiment, the invention relates to a device characterized in that said central openings of said hollow disks are equipped with one or more central deflectors, which pass longitudinally through said cylindrical chambers, and which have curvatures bounding one or more central access slits through which said fluid or fluid mixture is sucked out toward said central openings, said curvatures and said access slits being arranged in order to reduce the probability of said solid particles being able to penetrate into said openings of said hollow disks.

The device according to the present invention is characterized in that at least one of said hollow disks contains one or more separating partitions for separating said fluid or fluid mixture which penetrates into said hollow disks and which issues from said cylindrical chambers separated by this said hollow disk.

According to another embodiment, the device according to the present invention is characterized in that at least one of said hollow disks permits the passage of an injector capable of spraying fine droplets of a secondary fluid on the surface of at least one said rotating fluidized bed of at least one of said cylindrical chambers, at least one of said other fluids being gaseous.

According to another preferred embodiment, the device according to the present invention is characterized in that said reactor comprises an outlet in the side wall of each said cylindrical chamber for the complete removal of said solid particles present in each said cylindrical chamber.

According to another preferred embodiment, the device according to the present invention is characterized in that it comprises a device for recycling said fluid or fluid mixture, after appropriate treatment, for recycling to said cylindrical chambers, by said fluid feed device, of said fluid or fluid mixture removed by said device for removing said fluid or fluid mixture.

According to another preferred embodiment, the device according to the present invention is characterized in that said device for feeding said solid particles feeds said cylindrical chamber located at one end of said reactor and in that said device for removing said solid particles removes said solid particles from said cylindrical chambers located at the other end of said reactor.

According to another preferred embodiment, the device according to the present invention is characterized in that said device for feeding said solid particles into one said cylindrical chamber is servocontrolled to a device for detecting the surface of said rotating fluidized bed of said chamber, said servocontrol being suitable for maintaining said surface at the desired distance from the cylindrical wall of said chamber.

According to another preferred embodiment, the device according to the present invention is characterized in that said device for removing said solid particles from one said cylindrical chamber is servocontrolled to a device for detecting the surface of said rotating fluidized bed of said chamber, said servocontrol being suitable for maintaining said surface at the desired distance from the cylindrical wall of said chamber.

According to another preferred embodiment, the device according to the present invention is characterized in that it comprises said passages which are profiled to facilitate the transfer of said solid particles from one said cylindrical chamber to the other toward one end of said reactor and which are located at the desired distance from said central openings of said hollow disks, in order to stabilize therein said surfaces of said rotating fluidized beds, the flow rate of the particles transferred to said end increasing or decreasing according to whether said passages are more or less immersed in said rotating fluidized beds.

According to another preferred embodiment, the device according to the present invention is characterized in that it comprises said passages which are located along said cylindrical wall of said reactor and which are profiled to facilitate the transfer of said solid particles from one said cylindrical chamber to the other, in a direction suitable for progressively filling with or emptying of said solid particles all of said cylindrical chambers of said reactor.

According to another preferred embodiment, the device according to the present invention is characterized in that it comprises said secondary passages, which are located along said cylindrical wall of said reactor and which are profiled to facilitate the transfer of said solid particles from one said cylindrical chamber to the other in the direction opposite to that of the other said passages in order to obtain a preferential reflux of said heaviest solid particles.

According to another preferred embodiment, the device according to the present invention is characterized in that said device for feeding said fluid or fluid mixture into at least one of said cylindrical chambers is servocontrolled to a detector of the surface of said rotating fluidized bed of said cylindrical chamber, said servocontrol suitable for maintaining said surface at the desired distance from said side wall of said chamber.

According to another preferred embodiment, the device according to the present invention is characterized in that said device for feeding said fluid or fluid mixture comprises long longitudinal slits passing through its said side wall, parallel to the axis of symmetry of said reactor, these said long longitudinal slits being connected to at least one fluid distributor outside said reactor and serving to regularize the inlet velocities of said fluid or fluid mixture injected into said reactor via said long slits. According to another particularly preferred embodiment, the present device is characterized in that said long longitudinal slits pass through said side wall from one end to the other of said reactor, making it possible to divide said cylindrical wall of said reactor into at least two fractions of a cylinder.

According to another preferred embodiment, the device according to the present invention is characterized in that said device for removing said fluid or fluid mixture comprises transverse slits, perpendicular to the axis of symmetry of said reactor and passing through its said cylindrical wall along said side openings of said hollow disks, these said transverse slits being connected to at least one fluid collector outside said reactor and serving to regularize the outlet pressure of said fluid or fluid mixture removed from said reactor via said transverse slits.

According to another preferred embodiment, the device according to the present invention is characterized in that it comprises two said distributors and two said collectors which are tubes running along said cylindrical wall of said reactor, these four tubes forming with said reactor a compact assembly which can be inscribed in a rectangular parallelepiped.

According to another preferred embodiment, the device according to the present invention is characterized in that it forms a compact, removable and transportable assembly.

The present device is also characterized in that said reactor is horizontal. According to a preferred embodiment, the present device is characterized in that said reactor is inclinable in order to increase or decrease the transfer of said solid particles through said passages toward said removal device without the volume of said fluidized bed varying significantly. According to another particularly preferred embodiment, the present device is characterized in that said central access slit(s) is/are arranged in the upper half of said reactor to reduce the probability of said solid particles entering said hollow disks during shutdowns.

According to a preferred embodiment, the device according to the present invention is characterized in that said reactor is vertical and in that said hollow disks each comprise only a single central opening located on their lower wall. According to another preferred embodiment, the device according to the present invention is characterized in that said reactor is vertical and in that said central openings of the upper walls of said hollow disks are prolonged by vertical tubes to reduce the probability of said solid particles rotating in said cylindrical chambers falling into said central openings during shutdowns. According to a particularly preferred embodiment, the device according to the present invention is characterized in that the cylindrical walls of said cylindrical chambers are equipped with transverse fins or helical turns enabling said solid particles to use part of their kinetic rotational energy to rise along them, in order to reduce the differences in pressure and thickness of said rotating fluidized beds between the top and the bottom of said cylindrical chambers.

According to another preferred embodiment, the device according to the present invention is characterized in that it comprises a transfer column or tube outside said reactor for recycling said solid particles removed from one said cylindrical chamber at one end of said reactor to said cylindrical chamber located at the other end of said reactor.

According to another preferred embodiment, the device according to the present invention is characterized in that it comprises at least two sets of said successions of said cylindrical chambers and at least one said passage for transferring said solid particles from one said set to the other said set, and in that said devices for feeding and removing said fluid or fluid mixture are suitable for feeding said fluid or fluid mixture removed from one of said sets to the other said set.

According to another preferred embodiment, the device according to the present invention is characterized in that it comprises at least two sets of said successions of said cylindrical chambers and at least one said passage for transferring said solid particles from one said set to the other said set, and in that said devices for feeding and removing said fluid or fluid mixture are suitable for separately removing said fluid or fluid mixture from each of said sets and for recycling it to the same said set.

Furthermore, the present invention, to improve the efficiency of momentum and kinetic energy transfer between a fluid jet and solid particles in suspension in a rotating fluidized bed, also comprises deflectors, inside said rotating fluidized bed, appropriately profiled and arranged close to the fluid injectors, for the mixing of the fluid injected with a limited quantity of solid particles, while channeling it, to prevent or reduce its expansion in the reactor before it has transferred a large quantity of its kinetic energy to these solid particles. More particularly, the device according to the invention is provided with a device for feeding one or more fluids, which comprises a device for injecting fluid into said rotating fluidized bed, said fluid injection device comprising at least one deflector bounding, inside said rotating fluidized bed, a space around one or more jets of said fluid directed in the direction of rotation of said rotating fluidized bed, issuing from one or more injectors of said fluid, said deflector being placed so as to bound, between said injector(s) and said deflector, an access passage or corridor for a stream of said solid particles in suspension in said rotating fluidized bed, issuing from upstream of said injector, to enter into said space in order to mix therein with said fluid jet(s), this said space being sufficiently long for said fluid jet(s) to yield a substantial part of their kinetic energy to said solid particles before reaching the outlet of said space. The present invention hence also relates to a device for injecting a fluid or fluid mixture, liquid or gaseous, into a rotating fluidized bed and for increasing the momentum and energy which the fluid can transfer to the solid particles rotating in a rotating fluidized bed in order to increase the rotational velocity thereof. This device is suitable for using much lighter fluids than the solid particles and for injecting it at high velocity into the reactor without losing a large part of its kinetic energy owing to its expansion in the reactor.

More particularly, the invention relates to a device for injecting fluids into a rotating fluidized bed where the fluid jets are oriented in the direction of rotation of the fluidized bed and surrounded by at least one deflector bounding, around these jets, a generally convergent then divergent space, and upstream of these jets, passages through which the particles in suspension in the rotating fluidized bed can penetrate in order to mix with the fluid jets which transfer to them part of their kinetic energy before leaving this space.

Even more particularly, the present invention provides a device for injecting fluid into a rotating fluidized bed for improving the efficiency of the transfer of energy and momentum from said fluid to the solid particles in suspension in said rotating fluidized bed, characterized in that it comprises at least one deflector bounding, inside said rotating fluidized bed, a space around one or more jets of said fluid sent in the direction of rotation of said rotating fluidized bed, issuing from one or more injectors of said fluid, this said deflector being arranged in order to bound, between said injector(s) and said deflector, an access passage or corridor for a stream of said solid particles in suspension in said rotating fluidized bed, issuing from upstream of said injector, to enter into said space in order to mix therein with said fluid jet(s), said space being sufficiently long for said fluid jet(s) to yield a substantial part of their kinetic energy to said solid particles before reaching the outlet of this said space.

In a preferred embodiment, the present device for injecting fluid into a rotating fluidized bed is characterized in that said space bounded by said deflector and surrounding the fluid jet(s) is first convergent then divergent. In another preferred embodiment, the present device for injecting fluid into a rotating fluidized bed is characterized in that said space bounded by said deflector and surrounding said fluid jet(s) has a constant cross section.

According to another embodiment, the fluid injection device according to the present invention is characterized in that the cross section of said fluid injector is elongated in order to inject said fluid in the form of one or more thin films along the cylindrical wall of the reactor containing said rotating fluidized bed and in that said deflector has the shape of a fin bounding, with said cylindrical wall of said reactor, said space through which said thin film(s) of said fluid pass. According to a particularly preferred embodiment, the fluid injection device is characterized in that said space is at least twice as narrow as the average thickness of said rotating fluidized bed.

According to another embodiment, the fluid injection device according to the present invention is characterized in that it comprises rings or fractions of transverse rings fixed along the cylindrical wall of the reactor containing said fluidized bed and bounding, with said deflector and said cylindrical wall of said reactor, said space through which said fluid jet(s) pass. According to a preferred embodiment, the fluid injection device is characterized in that said ring fractions are transverse fins inclined to the central axis of said reactor in order to make said solid particles in suspension in said rotating fluidized bed rise along said cylindrical wall of said reactor. According to a particularly preferred embodiment, the fluid injection device is characterized in that said rings or fractions of rings are helical turns oriented in order to make said solid particles in suspension in said rotating fluidized bed rise along said cylindrical wall of said reactor.

According to another embodiment, the fluid injection device according to the present invention is characterized in that the cross section of said access passage or corridor is larger than the cross section of said injector(s).

According to another embodiment, the fluid injection device according to the present invention is characterized in that the cross section of said outlet of said convergent then divergent space is equal to or greater than the sum of the cross sections of said injector(s) and of said access passage or corridor.

According to another embodiment, the fluid injection device according to the present invention is characterized in that said fluid is a gas with a much higher density than the density of said solid particles and in that it is injected at velocities at least three times higher than the average rotational velocity of said solid particles in suspension in said rotating fluidized bed.

According to another embodiment, the fluid injection device according to the present invention is characterized in that the length of said space is sufficiently short for said fluid to still have a velocity substantially higher than the velocity of said solid particles when leaving said space.

The present invention can also apply to a horizontal reactor. In this case, the fluid injection velocity into the reactor, its flow rate and efficiency of transfer of its kinetic energy, must be sufficient to impart a rotational velocity to the fluidized bed producing a sufficient centrifugal force to keep it against the cylindrical wall of the upper part of the reactor.

Figure 11:
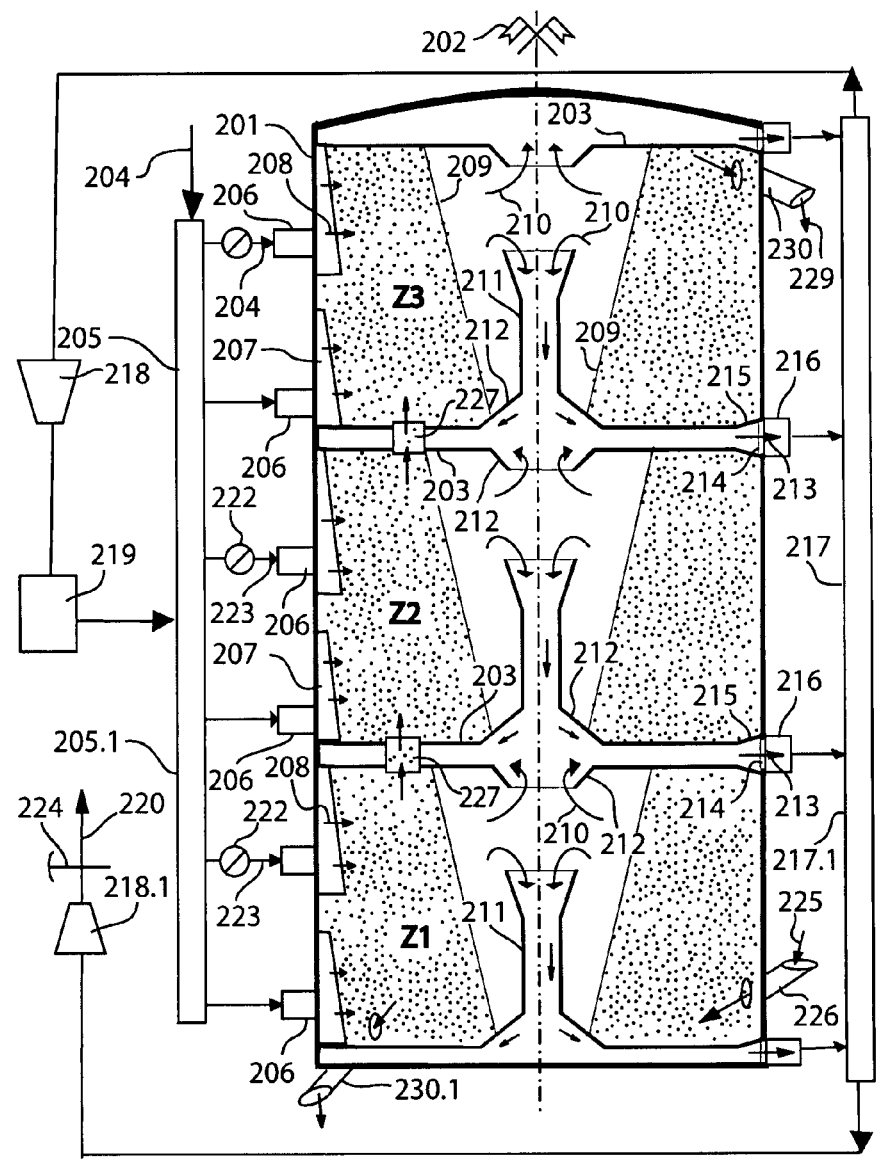
FIG. 11 shows a schematic view of a section of a vertical cylindrical reactor whereof the cross section of its cylindrical side wall is shown on each side of its cylindrical axis of symmetry.
Figure 22:
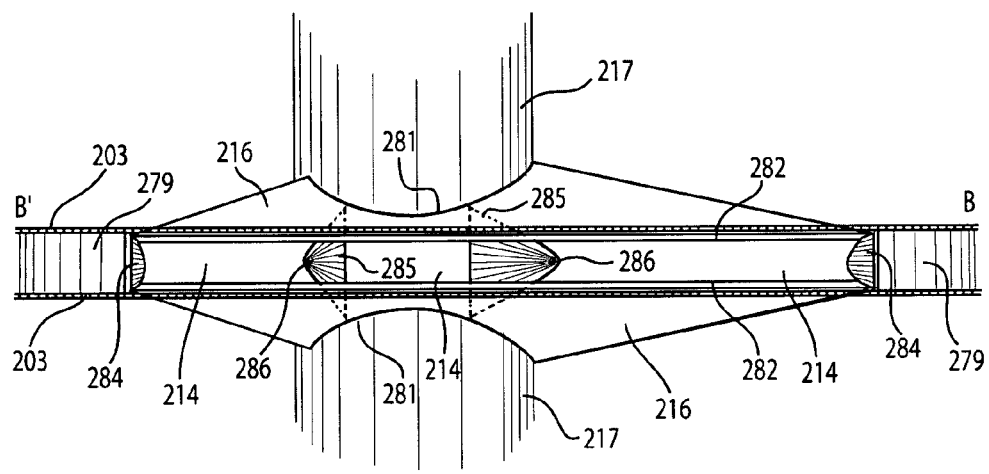
FIG. 22 shows the view of a section, along plane BB' perpendicular to FIG. 20, of the nozzle connecting a hollow disk to a collector.

FIGS. 11 and 22 show embodiments of a rotating fluidized bed device according to the invention in which the circular reaction chamber is divided into a succession of cylindrical chambers.

FIG. 11 shows a schematic view of a cross section of a vertical cylindrical reactor whereof the cross section of its cylindrical side wall (201) on each side of its cylindrical axis of symmetry (202) is shown. A succession of hollow disks, whereof the hollow sections (203) are shown, divides the reactor into a succession of cylindrical chambers or zones, from Z1 to Z3. The fluid (204) is fed by the distributor (205) to sets of tubes (206), distributed around the reactor and connected to sets of injectors (207) distributed inside the reactor and designed to inject the fluid, generally in thin films, horizontally and tangentially to the reactor wall, that is, perpendicular to the plane of the figure. While rotating, the fluid passes through the fluidized bed which contains the solid particles in suspension, symbolized by the black dots. It approaches the center of the reactor at a radial velocity, symbolized by the arrows (208), which is one order of magnitude lower than its rotational velocity. After having crossed the approximately conical surface of the fluidized bed, whereof the cross section (209) is shown, the fluid (210) enters the central openings of the hollow disks (203), which may be surmounted by tubes (211) to prevent the solid particles from penetrating thereinto during shutdowns and which may be widened (212) around their central openings to facilitate the entry of the fluid. The fluid (213) is then removed, via openings (214) of the side edges of the hollow disks which may be widened (215) around these openings (214) to facilitate the exit of the fluid, via sets of tubes (216) distributed around the reactor toward a collector (217) connected to a fan or compressor (218), which sucks out the fluid to recycle it, after appropriate treatment in (219), through the lower part (205.1) of the distributor, via a set of tubes (206) and injectors (207), distributed around the reactor and feeding the lower zones of the reactor. The fluid can be recycled several times before being removed at (220), through the lower part (217.1) of the collector, by the fan or compressor (218.1). The average number of fluid recyclings is about equal to the ratio of the flow rates of the fans (218) and (218.1).

It should be observed that the fluid injection velocity is influenced by the hydrostatic pressure generated by the weight of the fluidized bed in each zone. To avoid an excessive difference in injection velocity and fluid flow rate between the base and the top of each zone, the slits (207) through which the fluid is injected can be profiled appropriately, as symbolized by their trapezoidal shape, and they can be equipped with obstacles appropriately distributed to reduce the injection velocity in their upper part. Control valves (222) can also be used to adjust the velocity and proportion of fluid (223) injected at the different levels of the cylindrical chambers. A control valve (224) can also adjust the outlet flow rate of the fluid (220).

The solid particles (225) can be introduced into the bottom of the reactor by the tube (226) using appropriate means, such as gravity, a helical screw or a fluid jet. The reactor being divided by the hollow disks into several cylindrical chambers, from Z1 to Z3, they rise from one chamber to the next, via passages (227) which are arranged through the hollow disks. They are removed from the last cylindrical chamber, Z3, at the top of the reactor, at (229), by the tube (230) using appropriate means. Other outlets, (230.1), can be provided, for example in the bottom of each chamber, in order to drain the reactor rapidly.

The quantity of particles transferred depends on the rotational velocity of these particles, which must be sufficient to overcome the hydrostatic pressure of the fluidized bed located above the passage. Thus by increasing the proportion and velocity of fluid injected at the top of a cylindrical chamber using a control valve (222), the energy injected into the top of this chamber is increased and also the rotational velocity of the solid particles and hence their transfer to the upper zone. By servocontrolling these valves to level detectors of the surface of the fluidized beds of each chamber, these surfaces can be stabilized between the passages and the central inlet of the hollow disks. This serves to localize these passages against the side wall of the reactor, where the particle concentration is the highest, and thereby to reduce the quantity of fluid entrained with these solid particles.

The quantity of solid particles transferred from one zone to the other may also vary according to whether the passages are more or less immersed in the fluidized bed of the lower cylindrical chamber, thereby serving to stabilize the surface of the fluidized bed at the top of each cylindrical chamber along these passages. Thus, at equilibrium, the fluidized bed may be more or less thick according to the distance of these passages from the side of the reactor.

The reactor can be drained via side outlets at the bottom of each zone and it can be initially filled via the bottom, by closing the fluid feed via the tubes (206) of the upper cylindrical chambers not filled during the filling of a lower cylindrical chamber, to prevent most of the fluid from passing through the empty chambers. This can also be done through recycled fluid feed tubes, if the dimension and type of the solid particles permit, or via the top if the orientation of at least one passage per hollow disk permits.

The thin fluid film leaving the injectors tends to widen very rapidly and hence to slow down before having transferred sufficient kinetic rotational energy to the solid particles. To avoid this, appropriately profiled side deflectors can be fixed more or less parallel to the side wall of the reactor, close to the injector outlets, in order to mix a limited volume of solid particles with the fluid injected in the spaces or corridors located between these side deflectors and the reactor wall. These side deflectors prevent the expansion of the fluid, and hence its slowdown before it has transferred a sufficient part of its kinetic energy to the solid particles, inside these spaces or corridors, which must have a profile and length adapted to the objectives.

Figure 12:
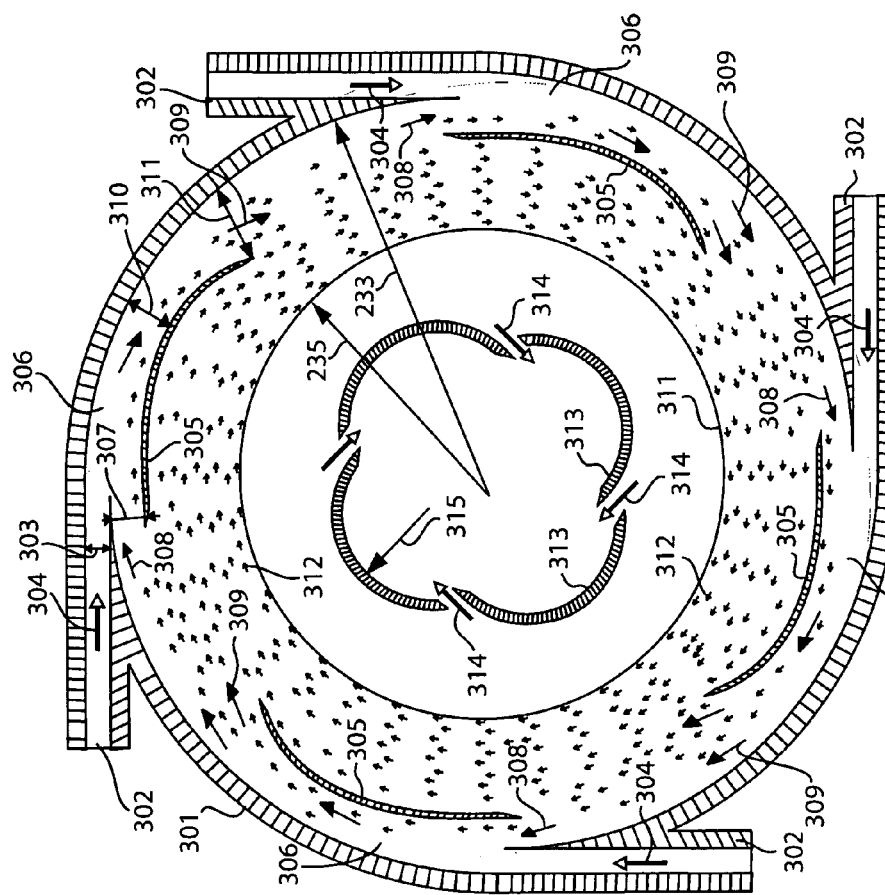
FIG. 12 shows a cross section of a cylindrical reactor to illustrate a preferred embodiment of a fluid injection device according to the invention.

FIG. 12 is a cross section of a reactor for illustrating a fluid injection device. It shows the cross section (301) of the cylindrical wall of a cylindrical reactor having a radius (233), the cross sections (302) of the width (303) of fluid injectors (304), penetrating into the reactor tangentially, and the cross section (305) of side deflectors, arranged longitudinally (perpendicular to the plane of the figure) at a short distance from the cylindrical wall of the reactor, opposite the injectors, in order to channel the fluid jets into the spaces or corridors (306), generally convergent then divergent, located between the deflectors and the cylindrical wall of the reactor. The figure also shows the circular cross section of the surface of the fluidized bed having radius (235). The solid particles are illustrated by the small arrows (312), indicating their travel direction.

These side deflectors bound, with the injectors, access passages or corridors having width (307), through which the streams (308) of solid particles in suspension in the rotating fluidized bed can enter these spaces (306) and mix with the fluid jets (304). Concentrated streams of solid particles, symbolized by the arrows (308), penetrate into these spaces or corridors, generally convergent then divergent, via access passages or corridors, having width (307), located between the wall of the injectors (302) and the side deflectors (305), at a velocity, which is about the average rotational velocity of the solid particles in the reactor. These concentrated streams of solid particles are diluted by mixing with the injected fluid, which yields to them a substantial part of its kinetic energy, and thereby increases their momentum, in these spaces or corridors between the reactor walls (301) and the side deflectors (305). The solid particles then mix with the other solid particles of the fluidized bed and yield to them the acquired momentum.

The convergence or divergence limited by the deflectors in the first part of these spaces (306) prevents or limits the expansion of the fluid jets, whereof the pressure may decrease to preserve a fair portion of their velocity while they accelerate the streams (308) of solid particles. The fluid streams (309) then slow down in the divergent part of these spaces or corridors (306) and their pressure may rise to reach the reactor pressure. Thanks to their inertia, the solid particles are slowed down less and may have a tangential outlet velocity close to or even higher than that of the fluids which have accordingly yielded to them a large part of their kinetic energy.

If the length of the space (306) and its minimum cross section (310) are such that the injected fluids can yield such a large part of their energy to the solid particles that their velocity at the outlet of said space may decrease excessively, the injection pressure and hence their energy must increase to enable the fluids to escape via the outlet (311), despite the sharp slowdown caused by the solid particles. This increase in pressure is passed on to the access passages or corridors (307)

and decreases therein the inlet velocity of the solid particles, whereof the concentration increases and whereof the flow rate decreases, thereby decreasing the quantity of energy that they can absorb, in order to find an energy transfer equilibrium, depending on the dimensions of these spaces (306), of the velocities and densities of the solid particles and the fluids. To avoid this slowdown of the solid particles in the access passages or corridors (307), the length of these spaces (306) must be commensurately shorter as the ratios between the width (303) or cross section of the injectors and the width (307) or cross section of the access passages decrease, so that the fluids still have a velocity substantially higher than that of the particles at the outlet (311). In contrast, the quantity of energy transferred to the solid particles is greater as these ratios of cross sections are smaller and as the length of these spaces (306) is greater, the optimum depending on the operating conditions and the objectives.

Simplified calculations show that these dimensions allow for wide variations in the operating conditions, enabling the fluids to yield at least three-quarters of their kinetic energy, so as to obtain a sufficient momentum transfer to the solid particles by the very light fluids, without excessively increasing their flow rate, by injecting these fluids at high velocity.

The figure shows the cross section (311) of the surface of the rotating fluidized bed, the solid particles symbolized by small arrows (312) indicating their travel direction, the cross section of the central deflectors (313), bounding longitudinal slits for sucking the fluids (314) out centrally, to remove them from the reactor, the curvature (315) of these central deflectors ensuring the separation between the solid particles and the fluid before this suction. In one example, in this figure, the access tubes to the hollow disks, not shown, are connected by central deflectors, perpendicular to the plane of the figure, with cross section (313), curvature (315), bounding slits through which the fluid (314) is sucked out to the central openings of the hollow disks, for better separation of the fluid from the particles.

In FIG. 12, these spaces or corridors are first convergent, to reach a minimum width (310), and then divergent, to reach the outlet width (311). They may also have a constant width. In this case the fluid slows down as the solid particles and the fluid accompanying them accelerate. In general, the dimensions of these spaces or corridors must be determined according to the operating conditions and kinetic energy transfer objectives.

It is also important to consider the decrease in the hydrostatic pressure of the fluidized bed, along the cylindrical surface of the reactor, as a function of the height in the cylindrical chambers of the reactor. The fluid leaving the injectors may tend to rise along the reactor walls before mixing with the solid particles due to this difference in hydrostatic pressure along this wall. To avoid this, transverse deflectors, perpendicular to the cylindrical wall of the reactor, such as rings, for example, can divide the space bounded by the fins and the side wall of the reactor, to guide the fluid and the particles in the desired direction, generally horizontal or upwardly inclined, until the fluid is mixed with the particles, as shown in FIG. 13.

Figure 13:
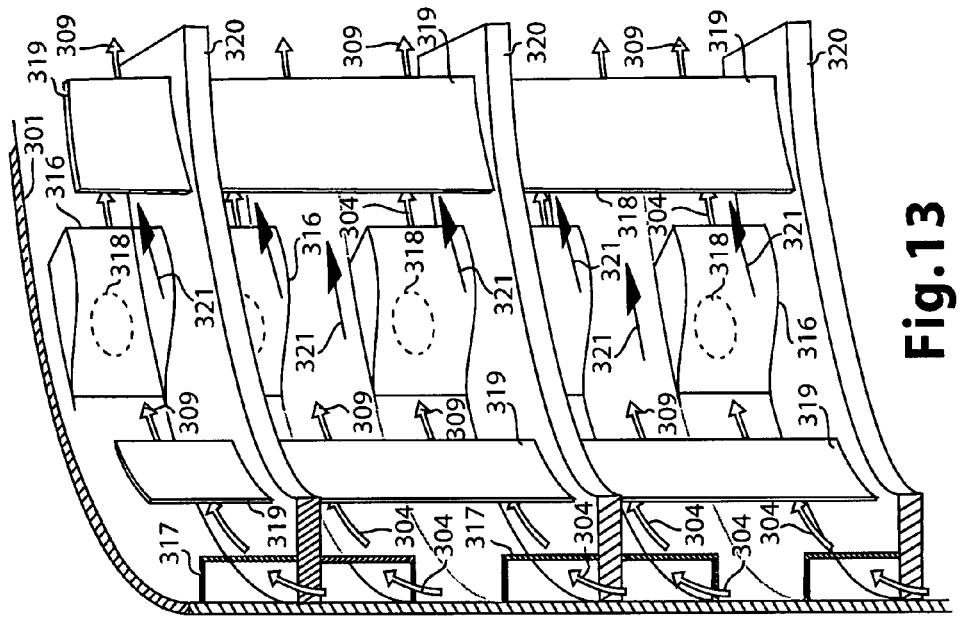
FIG. 13 is an axonometric projection of part of the side wall of a reactor for a better view of the fluid injection devices according to the invention.

FIG. 13 is an axonometric projection of part of the side wall (301) of a reactor for a better illustration of the fluid injection devices. It shows injectors, indicated at (316), or their longitudinal cross section (317) with their side deflectors (319) and rings (320), serving as transverse deflectors to prevent the fluid from rising along the reactor wall. It also shows, in a dotted line, the inlets of the fluid feed tubes (318), located behind the side wall of the injectors, and, cross-hatched, the cross sections of the injector outlets (317), in the foreground. The arrows (304) and (321) respectively indicate the directions of the fluid and solid particle flows entering or leaving the convergent and divergent spaces between the side deflectors (319) and the side wall (301) of the reactor.

The injectors are separated by rings or fractions of transverse rings (320) running along the side wall (301) of the reactor, and the side deflectors (319) are inserted between these rings, leaving an access corridor for the stream of solid particles, symbolized by the black arrows (321).

The transverse deflectors, illustrated by broad rings (320), may be hollow, forming sorts of circular nozzles, and may be connected to the exterior of the reactor by one or more feed tubes in order to distribute the fluid to a succession of injectors arranged along them, to reduce the number of tubes passing through the reactor wall, necessary to feed the injectors, which may be advisable when the pressure in the reactor is high. These rings or fractions of rings (transverse deflectors) may be transverse fins or helical turns oriented to make the solid particles rise along the side wall of the reactor. They may also be hollow and serve as a fluid distributor to the injectors connected thereto. These rings or fractions of rings (transverse deflectors) may also be successions of helical turns, forming an upward spiral, continuous or diskontinuous, inside each cylindrical chamber, or may be a succession of fractions of helical turns or transverse fins, grouped at the same or several levels of the chambers, the upper edge of one fraction of a turn or fin overhanging the lower edge of the next, in order to make the solid particles rise along the reactor wall and thereby reduce the difference in thickness of the fluidized bed and the differences in pressure along this wall between the top and the bottom of the various cylindrical chambers of the reactor.

FIG. 14 is the projection of a half cross section of a cylindrical chamber, in which the successions of quarters of helical turns (246) form either a continuous spiral making three turns inside the chamber, or three sets of four helical turns located at the same levels of the chamber and succeeding each other at 90° intervals, the upper edge of one quarter of a turn overhanging the lower edge of the next. The figure shows: the cross sections of the hollow disks (203), of the feed tubes (206) of the fluid (204), of the inlet tubes (211) of the hollow disks, widened at (212) and connected by central deflectors (238), whereof a cross section (249) can be seen; the arrows (208), (210) and (213) respectively symbolize the fluid streams leaving (208) the injectors (207), entering (210) the central tubes (211) via slits bounded by the central deflectors (238), and radially (213) passing through the hollow disks (203) toward the outlet tubes (216) of the reactor; the passages (227) for transferring particles from one zone to the other, the side deflectors (232), the fluid injectors (207) and their cross sections in the foreground, form continuous assemblies from the bottom to the top, separated by the quarters of helical turns (246).

Figure 15:
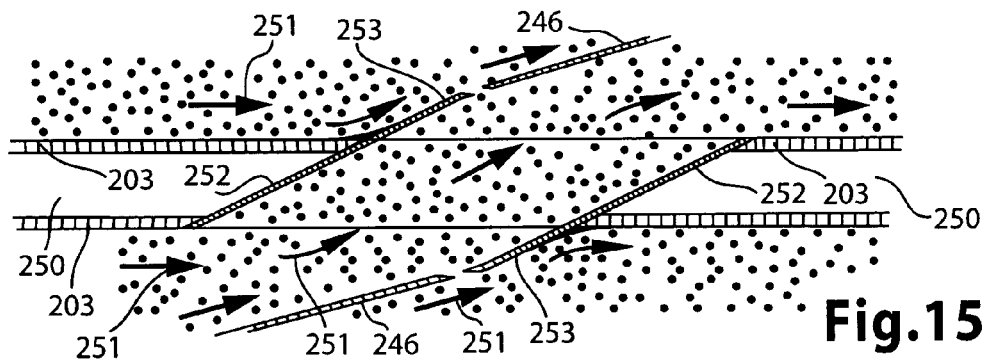
FIG. 15 shows the section of a particle transfer passage from one zone of the reactor to another zone.

FIG. 15 shows the cross section of a passage (227). It shows the cross section (203) of the two parallel plates forming the hollow disk and its internal space (250) through which the fluid passes radially, that is perpendicular to the plane of the figure, to leave the reactor. The solid particles are shown by black dots which move in the direction of the arrows (251). They pass through the hollow disk along the inclined walls (252) of the passage. They are prolonged by deflectors (253) on each side of the hollow disk to facilitate the transfer of the particles from the bottom upward, in the direction of their rotational velocity. These deflectors (253) may be prolonged by spirals whereof the cross section (246) is shown, in order to facilitate the upward movement of the solid particles.

FIG. 16 is a transverse flow diagram of the solid particles along a half longitudinal section of a cylindrical chamber similar to the one shown in FIG. 4, without the side and central deflectors. It shows the cross section (201) of the reactor wall, its cylindrical axis of symmetry (202), the tubes for feeding (206) the fluid (204) to the injectors with cross section (207), the cross section (246) of the beginning of the quarters of helical turns running along the side wall of the cylindrical chamber, located below the cross sections (246.1) of the end of the quarters of helical turns located in the quarter of the cylindrical chamber in the foreground of the figure.

The fluid (204), injected into the cylindrical chamber, perpendicular to the plane of the figure, passes through the surface of the fluidized bed having cross section (209) and penetrates (210) into the inlet tubes (211) of the hollow disks (203), from where it is sucked out by the outlet tubes (216). The solid particles, of which the rotational velocity perpendicular to the plane of the figure is one order of magnitude higher than the transverse velocities, enter the cylindrical chamber via the lower passage, (227e), at a flow rate Fe, and they exit therefrom via the upper passage (227s) at the flow rate Fs. If the latter is higher than the inlet flow rate, Fe, the chamber is progressively drained of its solid particles and the surface of the fluidized bed approaches its side wall, thereby automatically decreasing the outlet flow rate Fs. Another way to adjust the level of the fluidized bed is to servocontrol the fluid injection flow rate in the upper part of the chamber to a particle detector, which may be placed along the lower wall of the hollow disk and which, according to the position of the surface of the fluidized bed, increases or decreases this flow rate and therefore the rotational velocity of the solid particles and hence the quantity of solid particles transferred via the passage (227s).

The solid particles, rotating in the fluidized bed inside the cylindrical chamber, are thrust upward by the sets of quarters of helical turns, at a flow rate Fp, symbolized by the upward arrows. If this flow rate is higher than the outlet flow rate, Fs, they must fall back into the space between the helical turns and the tubes (211), at a flow rate F'p=Fp−Fs, and the centrifugal force keeps them in the fluidized bed, whereof the surface undulates around the helical turns. The latter, by supporting the weight of the fluidized bed located above them, undergo a pressure difference between their lower and upper surface, thereby decreasing the pressure difference between the bottom and the top of the cylindrical chamber. They also serve to reduce the difference in thickness of the fluidized bed between the top and the bottom of the cylindrical chamber, and thereby increase its height.

The difference in pressure between the top and bottom of the cylindrical chamber can cause differences in fluid injection velocity according to the height of their injection. These differences generate differences in velocities of rotation of the solid particles. Moreover, the pressure difference between the two sides of the hollow disks and more particularly between the inlet and outlet of the passages through these hollow disks, and the friction, slow down the solid particles transferred from one chamber to the other and hence reduce the rotational velocity of the solid particles in the bottom of the next cylindrical chamber.

The lowest rotational velocity of the solid particles and hence of the centrifugal force in the bottom of the cylindrical chambers cause both a slight decrease in the pressure along the side wall and a slight increase in the thickness of the fluidized bed, thereby decreasing the slope of its surface which depends on the ratio of the centrifugal force to the force of gravity. These differences in pressure and slope generate an internal flow, which tends to reduce these differences and which is directed downward along the side wall, symbolized by the downward arrows, Fi, and upward close to the surface of the fluidized bed, symbolized by the upward arrows, Fi.

Similarly, the solid particles are slowed down by friction and the increase in their potential energy while rising along the upper surface of the helical turns, causing the same type of internal circulation between the sets of helical turns. These successive reductions of the rotational velocity of the solid particles and their internal flow increase the quantity of energy which the fluid must transfer to the particles, requiring an efficient transfer of momentum and a very high fluid flow rate, which is ideal for this method.

The internal circulation can be estimated approximately by dividing the fluidized bed into rings of which the average rotational velocities are assumed, and the differences in pressure and thickness between these rings can be determined to deduce the scale of this circulation, and then apply the conservation of momentum, using successive approximations to determine the average equilibrium rotational velocity these rings.

These velocities depend, inter alia, on the momentum transferred by the fluid to the solid particles. In an open space, this momentum depends on the rotational velocity of the fluid, which is more related to the proportions of the cylindrical chamber and to the fluid flow rate, than to its injection velocity. In contrast, the variation in pressure inside a convergent space serves to transfer to the solid particles a momentum related to its kinetic energy and hence its injection velocity, thereby favoring this type of feed when the ratio of the fluid injection velocity to the desired rotational velocity of the solid particles must be very high due to the high ratio between the density of the particles and the fluid.

If the dimensions of the confined space are appropriate, and depending, inter alia, on the ratios of the velocities and densities of the fluid and the solid particles, the fluid can yield to the solid particles nearly all of its available kinetic energy. In general, the higher the velocity ratio vf/vp and/or the lower the ratio of the solid particle and fluid densities, the higher the ratio of the cross sections Sp/Si may be in order to transfer the maximum of kinetic energy from the fluid to the solid particles under optimal conditions.

To provide an idea of scale, if the density of the solid particles is 700 times greater than that of the fluid and their concentration in the fluidized bed is about 35%, if the ratio of the inlet cross sections, Sp/Si, is 2 and if the ratio of the outlet cross section to the inlet cross sections, Ss/(Sp+Si), is about 2.2, and if the confined space has a sufficient length, depending on the shape and size of the solid particles, for the fluid to have the time to yield its energy to the solid particles, a simplified calculation, assuming that the outlet velocities from the confined space of the fluid and the particles are equal and only taking account of the variations in volume of the fluid, shows that, when a fluid injection velocity, vf, is 8 to 12 times the rotational velocity of the solid particles, vp, the outlet velocity of the fluid and the particles is about ⅙ of the injection velocity of the fluid, which has yielded about 90% of its kinetic energy to the solid particles.

If the length of the confined space is reduced, to obtain a higher fluid outlet velocity than the particle outlet velocity, and if the ratio of the cross sections Ss/(Sp+Si) is reduced to 1.3, the fluid can still yield more than 80% of its kinetic energy to the particles with much lower velocity ratios vf/vp.

If the density ratio is ten times smaller, thereby considerably reducing the quantity of fluid necessary for a sufficient energy transfer between the fluid and the solid particles, the velocity ratio vf/vp may decrease to 3 while remaining close to the optimum with a cross section ratio Ss/(Sp+Si)=1.2.

More precise optimal dimensions, according to the objectives, can be determined taking account of all the parameters, by numerical simulation and by experiments in pilot units.

Horizontal Reactor

For a horizontal reactor, since the fluid is injected along an injection slit at the same height, from a distributor which standardizes the injection pressure, its injection velocity is approximately uniform. On the contrary, it may vary from one slit to the other, if these slits are not arranged at the same height in the reactor. It is lower for slits located in the bottom of the reactor. If the difference is too wide, and it is necessary to place injection slits in the bottom of the reactor, it may be necessary to have separate distributors, to inject the fluid at difference pressures.

The average rotational velocity of the particles is a minimum at the top of the reactor and a maximum in the bottom, the difference between the two being due to their potential energy. This is why the thickness of the fluidized bed must be greater in the upper part of the reactor.

Let us consider, for a zone having width L of a horizontal reactor having radius R, Df, the average fluid density; Dp, the bulk density of the particles, equal to their real density times their concentration, Cct; X=Dp/Df, the density ratio; RI, the radius of the surface of the fluidized bed; E=R−RI, the average thickness of the fluidized bed; SI=2p·L·RI, the surface area of the fluidized bed; VI=π·L·E·(2R−E) the volume of the fluidized bed; Es=E+dE and Ei=E−dE, respectively the average thickness of the upper part and of the lower part of the fluidized bed, where dE is the distance between the axis of symmetry of the reactor and the surface of the fluidized bed; v, vs and vi, the average rotational velocity of the particles respectively in the middle, upper and lower part of the fluidized bed; Fp, the particle flow in the passages through a hollow disk; Nf, the number of fluid injection slits in the zone; Ef, the thickness or width of the injection slits; Sf=Nf·Ef·L, the total cross section of the injection slits of the zone; vf, the fluid injection velocity; Ff=Sf·vf, the fluid flow or flow rate; vrf=Ff/(SI·(1−Cct)), the radial velocity of the fluid close to its outlet from the fluidized bed; vsl=k·v, the average velocity of the fluid at its outlet from the fluidized bed, where k, generally close to 1, is an experimentally determinable variable; Rd, the radius of the inlet opening of a hollow disk and ved=Ff/(2p·Rd$^2$), the inlet velocity of the fluid in a hollow disk, if there are two central inlets of the hollow disks per zone.

The conservation of mass and energy can be written: Es·vs=(E+dE)·vs=E·v=(E−dE)·vi, and vi$^2$−vs$^2$≅2 g·(2R−E); which gives 2E$^3$·dE·v$^2$≅g·(2R−E)·(E$^2$−dE$^2$)$^2$ or x/(1−x$^2$)$^2$=g·(R−E/2)v$^2$, if x=dE/E, and, as a first approximation, if x<<1 or if g·(R<E/2)<<v$^2$, dE≅g·(R−E/2)/v$^2$(10), where g is the force of gravity.

The equilibrium of the centrifugal force with the pressure along the reactor wall gives the pressure difference between the lower part and the upper part of the reactor, dP=Pi−Ps=2·Dp(E·g+dE·v$^2$/R·(1−x$^2$), where Pi and Ps is respectively the pressure at the top and at the base of the reactor. This is the pressure which must be offset to inject the fluid at the same velocity in the bottom of the reactor as in the top.

At equilibrium, the energy yielded to the particles by the fluid passing through the fluidized bed is equal to the energy lost by the fluidized bed, due to friction and turbulence, and to the energy lost by the particles during their transfer through the passages in the hollow disks due to friction and the change in direction of the velocity of the particles during these transfers or, for the first zone, the energy to be acquired by the particles injected into this zone, depending on their injection velocity.

If 1/Cx is the resistance to rotation of the fluidized bed due to friction and Kp·v·cosa is the rotational velocity of the particles leaving the passages through the hollow disks, slowed down by a factor Kp due to friction and deviated by an angle a depending on the inclination of the passages, the following approximate equilibrium equation is obtained:

$$Ff\cdot(vf^2-k^2\cdot v^2)/2 = X\cdot VI\cdot g\cdot v/Cx + X\cdot Fp\cdot(v^2-Kp^2\cdot\cos\alpha^2\cdot v^2)/2 \quad (11);$$

which gives:

$$v=(-b+\sqrt{b^2+a\times c})/a \text{ or } a=Ff\cdot k^2+Fp\cdot X\cdot(1-Kp^2\cdot\cos\alpha^2);$$
$$b=X\cdot VI\cdot g/Cx \text{ and } c=Ff\cdot vf^2=Ff^2/Sf^2.$$

It should nevertheless be pointed out that if the turbulence is low, the rotational velocity of the particles is lower close to the hollow disks due to their slowdown caused by the friction of the hollow disks and by the particle transfers. In this case, the thickness of the fluidized bed and the fluid flow rate therein are slightly higher to compensate for the lower pressure generated by the weaker centrifugal force and these differences in pressure generate an internal particle flow, directed toward the hollow disks along the side wall of the reactor and in the opposite direction along the surface of the fluidized bed. This internal circulation, Fi, reduces the differences in velocity. It is also possible, by injecting the fluid at higher velocity close to the hollow disks, to increase the rotational velocity of the solid particles therein and hence the centrifugal force, thereby reducing the thickness of the fluidized bed close to the hollow disks and hence also the risk of entrainment of solid particles in their central openings.

Vertical Reactor

Figure 20:
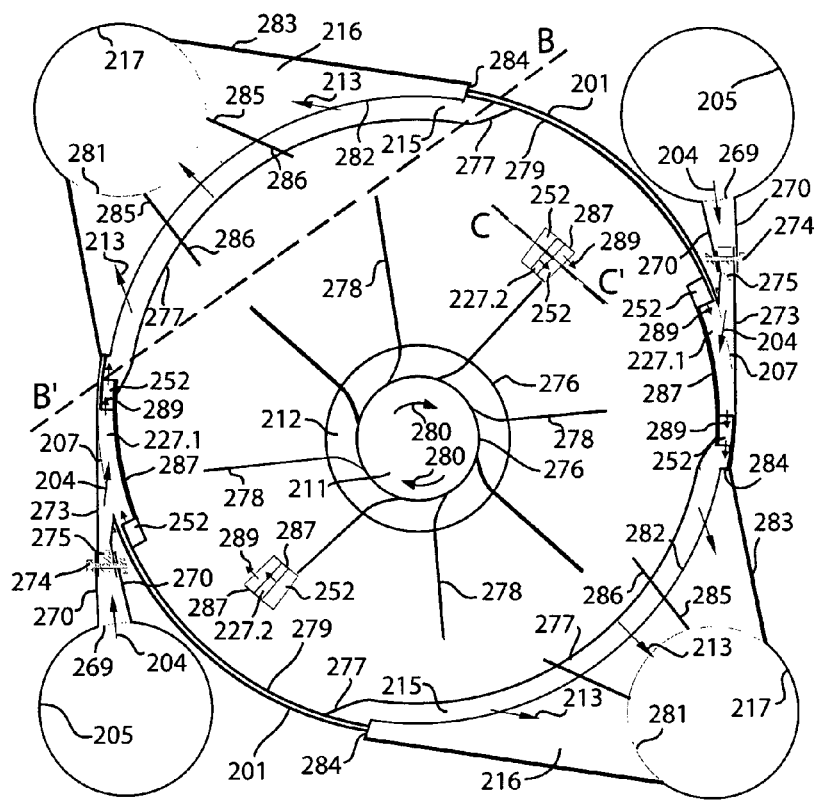
FIG. 20 shows the view of a section across a hollow disk, along the plane AA' in FIG. 19, for a reactor having two distributors and two collectors and forming therewith a compact and easily transportable assembly and designed to be easily disassembled.

FIG. 20 illustrates the half cross section of a zone of a vertical reactor, to illustrate the internal circulation and its influence on the surface of the fluidized bed. It shows the cross section (201) of the side wall of the reactor, the cylindrical axis of symmetry (202), the cross sections (203) of the hollow disks, the fluid (206) entering via the tubes (204) in the injection slits (207), the cross section of the surface of the fluidized bed (209), and the passages (227) through the hollow disks (203).

The zone considered is divided into a succession of superimposed cylindrical sections, from n=I, at the bottom, to n=N, at the top of the zone, and having height h, the height of the zone being H=N×h. For 3 consecutive sections, we can define RI', RI and RI"; v', v and v", as being respectively the radius of the surface of the fluidized bed and the average rotational velocity of the particles, perpendicular to the plane of the figure, in the sections n−1, n and n+1.

Let R be the radius of the reactor; E=R−RI, the thickness of the fluidized bed of a section n; dE'=E'−E=RI−RI' and dE"=E−E"=RI"−RI, the increase in thickness of the fluidized bed between these successive sections; VI≅p·h·(R$^2$−RI$^2$), the volume of the fluidized bed of the sections n; Ff=h·Ef·Nf·vf, the fluid flow injected into the section n where Ef and Nf are the thickness and number of fluid injection slits of the sections n and vf its injection velocity, perpendicular to the plane of the figure.

If the average velocities of rotation of the solid particles are equal from one section to the other, then v"=v=v', the pressure, Pb, along the edge of the sections vary according to the hydrostatic pressure of the fluidized bed, and hence the difference in pressure between the section n and n−1 is dPb'=Pb'−Pb=Dp·h, and the increase in pressure required for the centrifugal force to offset the increase in hydrostatic pressure is about: dE'≅h·R·g/v$^2$, where g is the force of gravity. In this case, the cross section of the surface of the fluidized bed is that shown by the thin lines (209').

When $v''>v>v'$, the differences in centrifugal force cause additional differences in pressure between the successive sections, and these pressure differences are distributed between their side edge, which is the reactor wall, and their inner edge, which is the surface of the fluidized bed. The additional pressure differences along the edge of the reactor, called dynamic pressure differences, are approximately $dPb''=Pb-Pb''\cong-Dp\cdot E\cdot(v''^2-v^2)/2\cdot R\cdot g$ and $dPb'=Pb'-Pb\cong-Dp\cdot E\cdot(v^2-v'^2)/2\cdot R\cdot g$ respectively between the sections n+1 and n and between the sections n and n−1, and the additional pressure differences along the surface of the fluidized bed cause additional variations in its thickness, called differences in dynamic thickness, $e''=E\cdot(v''^2-v^2)/2\cdot v^2$, and $e'\cong E\cdot(v^2-v'^2)/2\cdot v'^2$. These thickness differences decrease the slope of the surface of the fluidized bed, whereof the cross section becomes (209), and, combined with the differences in dynamic pressure, they cause an internal flow, Fi'', between the section n+1 and the section n, and Fi', between the section n and the section n−1, directed downward along the reactor wall and upward along the surface of the fluidized bed.

If $Fi''>Fi'$, the conservation of mass requires, in section n, a radial internal circulation, dFi, from the side edge to the center, such that $Fi'=Fi''+dFi$. This centripetal flow increases the pressure and thickness of the section n by a quantity dPx and dEx, and hence increases the slope between the sections n−1 and n and decreases it between the sections n and n+1. The differences in dynamic thicknesses and pressures respectively become $e''=dEx+E\cdot(v''^2-v^2)/2\cdot v^2$; $e'\cong-dEx+E\cdot(v^2-v'^2)/2\cdot v'^2$; $dPb''\cong dPx-Dp\cdot E\cdot(v''^2-v^2)/2\cdot R\cdot g$ and $dPb'\cong-dPx-Dp\cdot E\cdot(v^2-v'^2)/2\cdot R\cdot g$.

The dynamic differences in pressure and slope maintain, accelerate or slow down the internal circulation which strongly depends on the turbulence which it contributes to create. In the example illustrated in FIG. 20, the quantity and velocity of injection of the fluid per section is provided to rapidly accelerate the rotational velocity of the particles at the bottom of the zone, or $v'<v<v''$. The internal flow, Fi, rapidly increases therein and is directed downward along the side wall of the reactor and upward along the surface of the fluidized bed, and the hydrodynamic slope, (209), of the surface of the fluidized bed is lower there than the theoretical slope (209').

The fluid is then injected at reduced velocity in the median part of the zone. The rotational velocity of the solid particles therein slows down progressively, or $v'>v>v''$, and the internal flow, Fi, slows down and may even be reversed if this part is sufficiently high. The hydrodynamic slope, (209), of the surface of the fluidized bed there is higher than the theoretical slope (209'), if $v=v'$. The surface of the fluidized bed can therefore be given a higher slope in the middle sections without having to increase the average rotational velocity of the particles. At the top of the zone, the energy transferred by the fluid is again increased to accelerate therein the average rotational velocity of the particles to give them sufficient energy to ensure their transfer to the upper zone, despite the difference in pressure across the passage (227), thereby again increasing the internal flow in the same direction as in the lower part of the zone.

The increase or decrease of the internal flow energy from one section to the other is equal to the energy received by the dynamic difference in slope and pressure, less the energy loss due to turbulence and friction. The latter is The conservation of energy implies that the kinetic energy of Fi'' is equal to the kinetic energy of Fi' less the energy losses due to turbulence and friction, plus the energy gained through the difference in dynamic slope along the surface of the fluidized bed or lost through the difference in dynamic pressure along the side edge. At equilibrium, the energy losses must be offset by a transfer of rotational energy of the solid particles, which itself originates from the transfer of rotational energy of the fluid passing through the fluidized bed.

If Eci' and Eci'' represent the kinetic energy of flow at the surface or along the edges, and Ki is an efficiency factor representing the fraction of energy lost in the section n, we obtain the following conservation of energy equation: $Eci''=(1-Ki)\cdot Eci'+Dp\cdot(Fi'+dFi)\cdot E\cdot(v''^2-v^2)/R\cdot g$; with $Eci'=Dp\cdot Fi'^3/S^2$ where $S\cong p\cdot E\cdot(R-E)/4=VI/4\cdot h$ is the average cross section crossed by Fi along the reactor wall and the surface of the fluidized bed such that the average internal flow velocity, $vi=Fi/S$.

If the thickness of the fluidized bed is relatively low, the internal flow, Fi, increases rapidly near the walls and then stabilizes. When $dFi=0$, the conservation of energy equation becomes: $Fi^2/S^2=vi^2\cong(v''^2-v^2)\cdot E/R\cdot Ki$.

The internal flow, Fi, whereof the sum is nil, is added to the flow, Fp, of the particles passing from one zone to the other via the passages (227) through the hollow disks (203). They cause transfers of rotational energy from the particles between the various sections, Et' and Et'', thereby reducing the differences between their velocities of rotation.

At equilibrium, the energy, Ef, yielded by the fluid to rotate the particles of the section that it crosses, and the energy transferred, Et' and Et'', issuing from the particles from the adjacent sections, is equal to the rotational energy lost by friction and turbulence, Ex, and the losses of flow energy, $2\cdot Ki\cdot Eci$, hence: $Ef+Et'+Et''=Ex+Ki\cdot Eci'$. At first approximation, we can write:

$$Ff\cdot(vf^2-k^2\cdot v^2)/X\cong 2\cdot VI\cdot g\cdot v/Cx+Ki\cdot Fi'\cdot v'^2+(Fp+F'i)\cdot(v^2-v'^2)+Fi''\cdot(v^2-v''^2) \qquad (10')$$

where $k\cdot v$ is the rotational velocity of the fluid, close to the average rotational velocity of the particles, at its outlet from the fluidized bed; $X=Dp/Df$, is the ratio of the bulk density of the particles in the fluidized bed to the density of the fluid, $1/Cx$ is a friction coefficient representing the loss of rotational energy due to turbulence and friction in the section considered, and where Fi' and Fi'' are taken in absolute value.

The fluid injection velocities vf'', vf and vf' respectively in the sections n+1, n and n−1, depend on the pressure difference between the distributor and the inner edge of the reactor, which varies from one section to the other. Let us consider, as a first approximation, for low variations in pressure, the square of the fluid injection velocity in the section n is: $vf^2\cong vf'^2+2\ g\cdot X\cdot dh-2X\cdot E\cdot(v^2-v'^2)/R$, if the feed pressure is the same for the sections n and n−1. It increases rapidly with the height of the section, unless the pressure is reduced in the upper feed tubes (6) using control valves and/or if appropriate obstacles inserted in the upper part of the injection slits to reduce the fluid velocity therein.

The transfer of the particles through the passages of the lower disk necessitates, for the lower section, the calculation of the rotational velocity of the particles at the outlet of the passage through the disk, $vps=Kp\cdot vpe$, where Kp is the coefficient of slowdown of vpe due to friction in the passage and vpe is the inlet velocity in the passage, approximately equal to the average rotational velocity of the particles of the section at the top of the preceding zone, V'.

If Lp is the distance between a passage and the side wall of the reactor and Ed is the thickness or height of the hollow disk, the pressure difference, dPp, across this passage is approximately: $dPp\cong Dp\cdot[(H+Ed)+Lp\cdot(v^2-v'^2)/R\cdot g]$, where v is the average rotational velocity of the particles at the base of the zone considered. The energy equilibrium equation across the passages is: $Dp \cdot (Kp^2 \cdot vpe^2 - vps^2)/2 \cong dPp \cdot g$, making it possible to estimate vps if the lower zone is similar to the zone considered.

These various equations serve to estimate approximately, section by section, by successive iterations, the orders of magnitude of the variables Fi, vp and El as a function of Ff, for a predefined configuration and predefined coefficients, insofar as the flow of the particles in each section is relatively uniform. More complex numerical calculations and simulation in pilot units is nevertheless necessary to obtain more accurate results.

The device of the present invention can be applied to industrial processes of catalytic polymerization, drying, impregnation, coating, roasting or other treatments of solid particles in suspension in a fluidized bed, or of cracking, dehydrogenation or other catalytic conversions of fluids or fluid mixtures passing through a fluidized bed. This is why, in one embodiment, the present invention relates to a method of catalytic polymerization, drying or other treatments of solid particles in suspension in a rotating fluidized bed or of catalytic conversion of fluids passing through said rotating fluidized bed, characterized in that it comprises the steps which consist in injecting one or more fluids, in successive layers, into a circular reaction chamber, and removing them centrally via a central duct passing through or penetrating into said circular chamber, according to the present invention, at a flow rate and injection pressure entraining said solid particles at an average rotational velocity generating a centrifugal force at least three times higher than the force of gravity. In a preferred embodiment, the present invention relates to a method of catalytic polymerization, drying or other treatments of solid particles in suspension in a rotating fluidized bed or of the catalytic conversion of fluids passing through said rotating fluidized bed, characterized in that it comprises the steps which consist in recycling said fluid(s). In another preferred embodiment, the present invention relates to a method of catalytic polymerization, drying, or other treatments of solid particles in suspension in a rotating fluidized bed or of the catalytic conversion of fluids passing through said rotating fluidized bed, characterized in that it comprises the step which consists in recycling said solid particles. In another further preferred embodiment, the present invention also relates to a method of catalytic polymerization, impregnation, coating or other treatments of solid particles in suspension in a rotating fluidized bed characterized in that it comprises the steps which consist in spraying a liquid in fine droplets on said solid particles and making said liquid impregnating or surrounding said particles react chemically with said gaseous fluid(s) passing through said rotating fluidized bed.

More particularly, the present invention relates to a method of catalytic polymerization, drying or other treatments of solid particles in suspension in rotating fluidized beds or of catalytic conversion of fluids passing through rotating fluidized beds, characterized in that it comprises the steps which consist in injecting into a horizontal cylindrical reactor, preferably comprising a succession of cylindrical chambers connected according to the present invention, a fluid or fluid mixture at a velocity and at a flow rate imparting to said solid particles an average rotational velocity higher than the square root of the product of the reactor diameter and g, which is the gravitational acceleration.

In another embodiment, the present invention also relates to a method of catalytic polymerization, drying or other treatments of solid particles in suspension in rotating fluidized beds or of catalytic conversion of fluids passing through rotating fluidized beds, characterized in that it comprises the steps which consist in injecting into a vertical cylindrical reactor, preferably comprising a succession of cylindrical chambers connected according to the present invention, a fluid or fluid mixture at a velocity and at a flow rate generating in said rotating fluidized bed a centrifugal force higher than the force of gravity, said solid particles being transferred from one said cylindrical chamber to the other toward the bottom of said reactor. In another embodiment, the method of catalytic polymerization, drying or other treatments of solid particles in suspension in rotating fluidized beds or of the catalytic conversion of fluids passing through rotating fluidized beds, is characterized in that it comprises the steps which consist in injecting into a vertical cylindrical reactor, preferably comprising a succession of cylindrical chambers connected according to the present invention, a fluid or fluid mixture at a velocity and at a flow rate imparting to said solid particles an average rotational velocity higher than the velocity that they would acquire by falling from the top to the base of said cylindrical chambers and enabling them to pass from one said lower cylindrical chamber to said upper cylindrical chamber via at least one passage arranged in said hollow disk separating them and oriented in the direction causing said solid particles to rise.

The present invention also relates to a method of catalytic polymerization of solid particles in suspension in rotating fluidized beds or of catalytic conversion of fluids passing through rotating fluidized beds, characterized in that it comprises the steps which consist in injecting into a tube or a transfer column, according to the invention, a fluid regenerating the catalysts present in said solid particles recycled to said reactor. Preferably, said method of catalytic polymerization of solid particles in suspension in rotating fluidized beds or of catalytic conversion of fluids passing through rotating fluidized beds, is characterized in that it comprises the steps which consist in injecting into a tube or a transfer column according to the invention, a fluid purging said solid particles recycled to said reactor of the undesirable fluids which are entrained by said solid particles.

In another embodiment, the invention provides a method of catalytic polymerization of solid particles in suspension in rotating fluidized beds, characterized in that it comprises the steps which consist in recycling to at least two sets of successions of cylindrical chambers according to the invention, said fluids or fluid mixtures, removed separately from said sets, containing active fluids of different compositions from one set to another, to produce bimodal- or multimodal polymers.

According to another embodiment, the invention provides a method of catalytic polymerization of solid particles in suspension in rotating fluidized beds, characterized in that it comprises the steps which consist in spraying fine droplets of a comonomer onto the surface of said rotating fluidized bed of at least one said cylindrical chamber by an injector according to the invention.

In another preferred embodiment, the injection relates to a method of catalytic polymerization of solid particles in suspension in rotating fluidized beds, characterized in that it comprises the steps which consist in spraying on the surface of said fluidized bed of at least one cylindrical chamber by an injector according to the invention, a liquid serving to cool said solid particles.

A device according to the present invention can be used advantageously in various processes. This is why the present invention also comprises the use of a device described in the present invention in a polymerization process. For example, the present invention relates to the use of a device described in the present invention in a method of polymerization of solid particles in suspension in a rotating fluidized bed. In a preferred embodiment, the present invention relates to the use of a device described in the present invention in a polymerization process, characterized in that at least one of said fluids contains alpha-olefins.

The present invention may also comprise the use of a device described in the present invention in a method of catalytic conversion of a fluid or fluid mixture passing through a rotating fluidized bed whereof the solid particles are catalysts. In a preferred embodiment, the present invention relates to the use of a device described in the present invention in a method of catalytic conversion, characterized in that said fluid or fluid mixture contains olefins, for example light olefins and in that said catalytic conversion implies the change of the molecular weight distribution of said olefins, for example of said light olefins. In a particularly preferred embodiment, the present invention relates to the use of a device described in the present invention in a method of catalytic conversion, characterized in that said fluid or fluid mixture contains ethylbenzene and in that said catalytic conversion implies its dehydrogenation to convert it to styrene. In another particularly preferred embodiment, the present invention relates to the use of a device described in the present invention in a method of catalytic conversion, characterized in that said solid particles contain components which can react with the hydrogen produced by said dehydrogenation, in order to reduce its concentration in said fluid or fluid mixture, these said components being regenerable outside said circular reaction chamber.

Furthermore, the present invention also relates to the use of a device described in the present invention in a method for drying or extracting volatile components from said solid particles. In a preferred embodiment, the invention relates to the use of the device described in the present invention, particularly characterized in that at least one of said hollow disks permits the passage of an injector capable of spraying fine droplets of a secondary fluid onto the surface of at least one said rotating fluidized bed of at least one of said cylindrical chambers, at least one of the other said fluids being gaseous in a method for impregnating said solid particles with said secondary fluid. The present invention also provides for the use of a device described in the present invention in a method for impregnating or coating said solid particles. In a particularly preferred embodiment, the present invention relates to the use of a device described in the present invention in a method of drying, extraction, impregnation or coating, characterized in that said solid particles are grains, powder or other fragments of agricultural origin.

A device according to the present invention can therefore be adapted to various systems, according to various methods. A number of examples of methods are given below, in which a device according to the present invention can be applied. To provide some idea of scale, these various methods can be illustrated by examples with figures. The mathematical formulae mentioned in these examples relate to the abovementioned equations. However, the velocities of rotation of the particles depend on a set of factors such as the turbulence and viscosity of the fluidized bed, which depend on the types of solid particles and the aerodynamics in the cylindrical chambers, so that the examples below are only provided for information.

EXAMPLES

Example 1

Conversion of Cracking Gasolines to Light Olefins Using a Device According to the Invention The cylindrical reaction chamber shown in FIG. 8 may, for information, have a diameter of 1 m, a length of 4.5 m and an average thickness (width) of 0.23 m, giving it a volume of about 2.5 $m^2$. The fluid (100), consisting of cracking gasolines preheated to high temperature, having a density of about 5 $kg/m^3$, at the injection temperature and pressure, is injected at high velocity (for example 200 to 300 m/s, giving a potential pressure of 100 to 200 000 Pa) into the ejector (105) to be superheated to the desired temperature (over 600° C.), at the same time as the recycled fluid it entrains into the furnace (102) and then into the reaction chamber, where they are injected, for example, at a velocity of 60 m/s through 17 injection slits 0.005 m thick, giving a flow rate of about 23 $m^3/s$, or 400 tonnes per hour. (This high flow rate requires a central duct passing through the reaction chamber to remove the fluid on both sides, and the reactor may be horizontal or vertical). If the quantity of fluid recycled is about 50%, the cracking gasoline feed flow rate is about 200 tonnes per hour and its average residence time in the reaction chamber is about twice one tenth of a second.

If $Cc \times Kf \times M/m \times Ke\tilde{\ }30$, which gives $X\tilde{\ }0.7$, the catalyst powder, which is fed via the tube (16) is entrained by the fluid at an average rotational velocity, $V_p$, of about 13 m/s, producing a centrifugal force 35 times the force of gravity, generating a pressure on the cylindrical wall of about 30 000 Pa and enabling the fluid to pass through the fluidized bed at a velocity of more than 2 m/s. The catalyst powder is removed via the tube (19) and can be recycled easily after regeneration, with a cycle time which may be between a few minutes and several hours.

Example 2

Drying of Agricultural Grains Using a Device According to the Invention

Grains of agricultural origin can be dried according to the diagram in FIG. 9. The reaction chamber or drying chamber may have the same dimensions as those of the above example. In this case, the fresh air (112) is introduced via the tube (8.1), optionally through a moisture condenser (113), to pass through the end of the reaction chamber on the side of the grain outlet (19) in order to heat them while cooling them and completing their drying. This air (11.1) is then sucked out by the centrifugal compressor or fan (108.1) through the line (10.1) and recycled to the reactor via the line (8.2) after having been heated additionally in the heater (102). After having been recycled several times, this air (11.2) is sucked out by the centrifugal compressor or fan (108.2) through the line (10.2) and recycled to the reactor via the line (8.3) after having been heated by the heater (102). After having again been recycled several times, this moisture laden air cooled by the grains, which are fed via the line (16) and which it has heated, is removed at (114).

The air being sucked out by the compressors or fans, the pressure in the reactor is lower than the atmospheric pressure, which is favorable to drying, and mechanical means can easily transfer the dried grains for storage at atmospheric pressure. The air can be injected into the drying chamber at the same rate of 23 $m^3/s$ in the above example, or about 100 tonnes per hour. If it is recycled 5 to 10 times, this gives a fresh air quantity of 10 to 20 tonnes per hour and a contact time with the grains of about 5 to 10 times 0.1 second.

The quantity of grains in the drying chamber may be about 500 kg, giving an average residence time of 90 seconds for drying 20 tonnes per hour, which may be sufficient given the high velocity and low pressure of the air and the possibility of working at higher temperatures thanks to the short residence time and the cooling of the grains before they leave the reactor.

This assembly can be built to be compact and easily transportable, which demonstrates the advantage of having a dense fluidized bed traversed by a very large quantity of fluid at high velocity thanks to the centrifugal force.

Example 3

Gas Phase Copolymerization of Ethylene and Octene Using a Device According to the Invention The gas phase copolymerization of ethylene and octene is only possible if the pressure in the reactor is low, at a maximum no more than a few times the atmospheric pressure, because the octene partial pressure is limited to about 0.2 bar at 70° C. At these pressures, the quantity of heat produced by these highly exothermic reactions can only be removed by using relatively inactive catalysts or by diluting the mixture of active gases with an inactive gas to slow down the reaction rate, thereby increasing, the cost of the installation, or by passing such a large quantity of gas through the fluidized bed as to require a rotating fluidized bed, for example according to the diagram shown in FIG. 10.

The octene can be sprayed in fine droplets (120) into the reaction chamber by the tube (121) passing through the central duct and/or can be fed in gaseous form at the same time as the fresh ethylene (119) and the fluid recycled via one or more of the tubes (8.1) to (8.4).

For information, the cylindrical reaction chamber, may, for example, have a diameter of 1.6 m, length 10 m and thickness 0.32 comprising 29 injection slits of thickness 0.005 m, for injecting about 50 m$^3$/s of active fluids, if the fluid injection velocity is 35 m/s. If the pressure is about 3 times the atmospheric pressure, permitting an octene concentration of about 20% by weight, the recycled active fluid flow is about 700 tonnes per hour, suitable for removing the heat of polymerization of about 10 to 20 tonnes per hour of polymer. The quantity of polymer in the reaction chamber of which the volume is about 12 m$^3$ is about 3 tonnes, giving a polymer particle residence time in the reaction chamber of 10 to 15 minutes, making it possible to use highly active catalysts. The rotational velocity of the polymer particles may be about 11 m/s, giving a centrifugal force about 16 times the force of gravity, so that the fluidized bed can be crossed with a radial velocity of more than 1.5 m/s in about 0.2 second.

This reactor can be installed in series, for example after another reactor which may operate at much higher pressures without comonomer or with lighter comonomers, to obtain multimodal polymers. It is also suitable for progressively varying the composition and/or temperature of the fluid passing through the rotating fluidized bed.

Example 4

Impregnation or Coating of Solid Particles Using a Device According to the Invention The diagram in FIG. 10 can also be used for impregnating or coating solid particles. The fluid serving for impregnation or coating can be sprayed in the form of fine droplets (120) into the part of the reaction chamber located on the feed side of the solid particles by the tube (16). These particles are then dried in the successive annular sections of the circular reaction chamber and the components serving for impregnating or coating the solid particles may even be baked, if the temperature of the recycled fluid is sufficiently high and the solid particles can be recycled by an appropriate device, if it is necessary to apply several layers of coating.

Example 5

Method of Catalytic Polymerization of Solid Particles Using a Device According to the Invention FIG. 17 illustrates a simplified diagram, similar to FIG. 11, slightly modified to permit the bimodal or multimodal copolymerization of solid particles, serving as catalysts, in suspension in fluids or mixtures of active fluids, containing the monomer and comonomer(s), such as, for example, the bimodal catalytic copolymerization of ethylene with hexene.

The reactor (201), can be recognized, its cylindrical axis of symmetry (202), the hollow sections of the hollow disks (203) dividing the reactor into two sets of two successive cylindrical chambers, from Z1 to Z2 and from Z3 to Z4, the feed tubes (206), with their control valves (222), the cross section of the injectors (207), the cross sections (209) of the surfaces of the fluidized beds, the inlet tubes (211) of the hollow disks and the outlet tubes (216).

There are two sets of independent distributors, (205) and (205.1), two sets of collectors (217) and (217.1), interconnected by a tube (245) to balance the pressures in the two sets of cylindrical chambers, two compressors (218) and (218.1), with their fluid treatment units, symbolized by the heat exchangers (219) and (219.1), and the cyclones (221) and (221.1) and the hollow disk, separating the chamber Z2 from the chamber Z3, is divided by a separating partition (260) preventing the mixing of the fluids issuing from these two chambers in order to recycle separately the fluids flowing in each of the sets of cylindrical chambers, from Z1 to Z2 and from Z3 to Z4. The number of sets of cylindrical chambers and the number of cylindrical chambers per set may vary. It depends on the size of the reactor and the polymerization objectives.

The polymer particles, symbolized by the black dots, leaving the top of the reactor via the tube (230) are introduced into a recycling tube which may be a purification column, (261), traversed by the fluid injected at (204.1), fluidizing the polymer particles which form a fluidized bed having surface (262), the fluid escaping at (266) and passing through the particle separator (267) to be recycled by the compressor (218). The polymer particles are then recycled by the tube (226) to the bottom of the reactor. After having completed a number of cycles, they (229) are removed via the tubes (230.1) which can be placed along the side walls of the various cylindrical chambers.

The feed of fresh monomer, such as ethylene, can be introduced: partly at (204.1), at the bottom of the purification column to be recycled to the upper part of the reactor after having purged the polymer particles of excess comonomer, such as hexene, which they contain; partly at (204.2) to facilitate the recycling of the polymer particles, although the hydrostatic pressure of the fluidized bed of the column (261), determined by the equilibrium level of its surface (262), may suffice; and partly in the pressure balancing tube (245), to prevent the pressure balancing between the upper and lower sets of cylindrical chambers from causing undesirable fluid transfers between these sets.

The comonomer (263), such as hexene, can be sprayed in fine droplets on the surface of the fluidized beds of one or more upper cylindrical chambers by injectors (264), which pass through the hollow disks, and the catalyst can be introduced by an appropriate device (265) into one of the cylindrical chambers. Other active components, such as hydrogen, and other monomers, can be introduced into one more recycling circuits, and their excess can be removed in the other recycling circuit, for example by absorption in regenerable absorbers. If necessary, additional inactive cooling fluids, such as propane or isobutane, can be sprayed in fine droplets on the fluidized beds in the same way as the comonomer.

This arrangement serves to limit the undesirable fluid transfers from one set to the other, to the fluids not removed by the purification column (241) and to the fluids accompanying the polymer particles in the passage(s) (227) connecting the cylindrical chambers Z2 and Z3, and whereof the size may be limited according to the polymerization objectives.

The control, purification etc. accessories, including the possibility of cooling the hollow disks, the purification column and other surfaces placed inside the chambers, are not described. They can be defined according to the polymerization objectives by experts in fluidized bed polymerization processes.

Example 6

Method of Catalytic Conversion of Fluids Using a Device According to the Invention FIG. 18 shows a simplified diagram, similar to that in FIG. 17, slightly modified for the catalytic conversion of a fluid or fluid mixture, in a rotating fluidized bed containing solid catalyst particles, such as, for example, the catalytic cracking of light olefins.

In this arrangement, the fluid to be converted, (204), is injected, preheated if necessary, into the distributor(s) (205) feeding the set of lower cylindrical chambers, Z1 and Z2. It is removed from these chambers by the collector(s) (217), to be heated in the heater (219), and recycled by the distributor(s) (205.1) to the set of upper cylindrical chambers, Z3 and Z4, from where it is sucked out, through the collector(s) (217.1) by a single compressor (218), to be transferred at (220) to the appropriate treatment units.

The fresh or recycled catalyst powder is fed to the cylindrical chamber Z1 from the bottom of the reactor by the tube (226) and rises slowly from one chamber to the other, up to the top of the reactor from which it is removed by the tubes (230), to a regeneration column (261). A regeneration fluid (204.1), for example a mixture of air and steam, fluidizes the catalyst powder in the regenerator, while regenerating it. It is removed, at (266), through a particle separator (267). The equilibrium level of the surface (262) of the fluidized bed of the column (261) is the one giving a sufficient hydrostatic pressure for recycling the regenerated catalyst powder at the desired flow rate. This recycling can be facilitated by injecting a drive fluid, (204.2), such as steam.

The feed in series of the two sets of cylindrical chambers generates a significant pressure difference between the chamber Z2 and the chamber Z3, which accelerates the catalyst particles and the fluid accompanying them in the passage (227) connecting them. This requires reducing the dimensions of this passage, which may be located at the distance from the side wall corresponding to the desired thickness of the fluidized bed, or which may be controlled by a control valve with a flow rate servocontrolled to the level detectors of the fluidized bed of the cylindrical chamber Z2.

If the ratio of the density of the fluidized bed to that of the fluid is very high, not only must a very high fluid flow rate be provided, but also a high injection velocity, and an appropriate device must be used to transfer energy and momentum from the fluid to the catalyst particles, before the fluid has lost a substantial part of its velocity owing to its expansion in the open space of the cylindrical chambers.

The number of chambers and sets may vary. The control, purification etc. accessories, are not described. They can be defined according to the objectives, by experts in fluidized bed catalytic conversion processes.

In this arrangement, the outgoing fluid, issuing from the upper set of cylindrical chambers, is at lower pressure, which is generally favorable to the conversion of the fluid, but it is in contact with the catalyst which must be regenerated, which is unfavorable and requires shorter cycle times between two regenerations. This can be avoided by adding a second compressor before the heater (219) to equalize the pressures in the two sets of cylindrical chambers, thereby serving to reverse the fluid flow, that is, to feed the fluid to be converted to the upper set and to remove the converted fluid from the lower set.

Example 7

Method of Drying or Other Treatments of Solid Particles Using a Device According to the Invention The drying of solid particles, like cereal grains, can be carried out with air at a pressure close to atmospheric pressure, and with this method, it is possible to do this in lightweight, compact and easily transportable units, as described in FIGS. 19 to 22.

Figure 19:
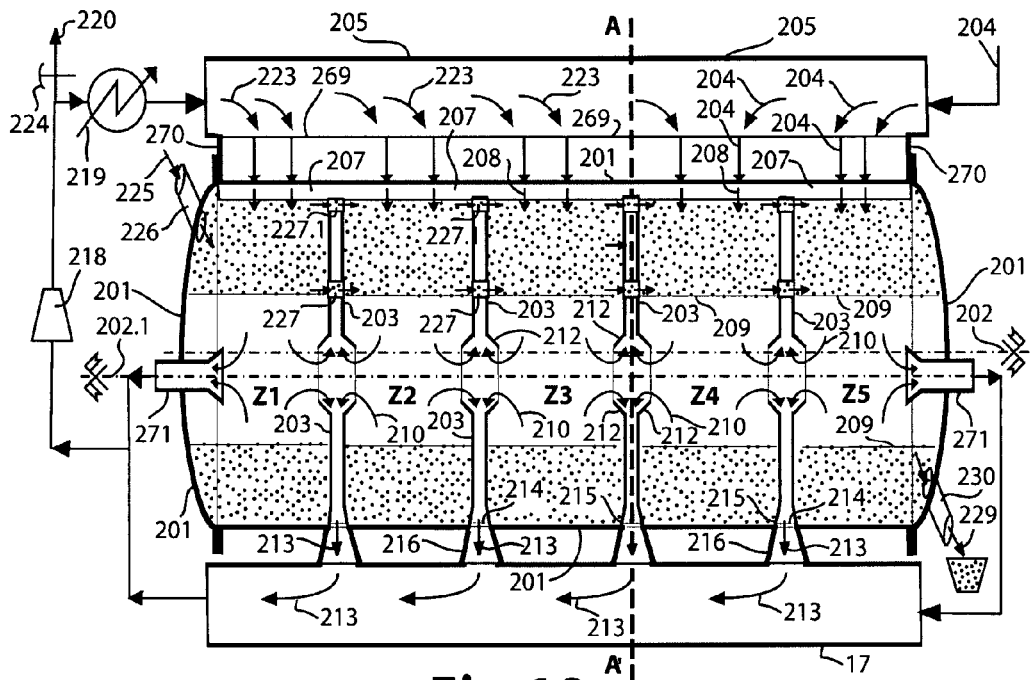
FIG. 19 shows the longitudinal section of a horizontal reactor, suitable for operating at a pressure slightly below atmospheric pressure.

FIG. 19 shows the longitudinal section of a horizontal reactor, capable of operating at a pressure slightly lower than atmospheric pressure. It shows the cross section (201) of its wall, its cylindrical axis of symmetry (202) and the hollow sections (203) of the hollow disks which divide the reactor into five successive cylindrical chambers, from Z1 to Z5. The distributor (205) is traversed by a longitudinal slit, symbolized by the thin line (269) and is connected by plates, replacing the tubes (206) and illustrated by the rectangle (270), with long longitudinal slits along the entire length of the reactor, symbolized by the rectangle (207), dividing the cylindrical wall of the reactor into two half-cylinders and designed to inject the fluid (204) perpendicular to the plane of the figure, that is, tangentially into the reactor.

While rotating, the fluid, at a radial velocity (208), passes through the fluidized bed, whereof the surface (209) is approximately cylindrical. However, the rotational velocity of the particles, symbolized by the black dots, being higher in the lower part of the reactor due to the force of gravity, the thickness of the fluidized bed is lower there and hence the axis of symmetry (202.1) of the surface of the fluidized bed is slightly lower than the axis of symmetry (202) of the reactor. The distance between these two axes, d, which is about equal to half of the difference in thickness between the top and bottom of the fluidized bed, is approximately $d \approx E \cdot (2R-E) \cdot g / 2v^2$, where E, R, g and v are respectively the average thickness of the fluidized bed, the radius of the cylindrical chambers, the gravitational acceleration and the average rotational velocity of the solid particles, if $R-E/2 \ll v^2/g$.

The fluid (210) then enters via the central openings of the hollow disks (203), widened (212) around them. The fluid (213) leaves the reactor via the openings (214), in thin lines, which are long transverse slits cut in the side wall of the hollow disks which are widened (215) around them and it penetrates via the nozzles (216) into the collector having cross section (217) and is sucked out by a fan (218). Tubes (271), passing through the ends or covers of the reactor, can also remove the fluid centrally. Part of the fluid is then removed at (220) passing through a control valve (224). Its flow rate is approximately equal to the flow rate of fluid fed at (204). The rest of the fluid is treated, for example dried using a condenser and/or heated, at (219), and then recycled (223) via the opposite end of the distributor (205). It should be observed that, in the arrangement described above, the fluid can be recycled on average several times before being removed, if the recycling fluid flow rate (223) is several times greater than the feed rate (204) and hence also the discharge rate (220), but, due to its mixing in the fan (218) a small fraction of the fluid is removed upon its first passage in the reactor. This can be avoided by using a second fan, (218.1) as shown in the arrangement in FIG. 11.

The solid particles (225) are introduced into the reactor by the tube (226) by appropriate means and are transferred from one chamber to the other via the passages (227). The particles first fill the first cylindrical chamber, Z1, until the level of the surface (209) of the fluidized bed reaches the level of the first passage (227). The particles can then begin to fill the second cylindrical chamber and so on and so forth, until the time when the level of the last cylindrical chamber, Z5, reaches the level of the outlet opening of the particles (229) via the tube (230) allowing them to leave the reactor.

However, since the fluid passes preferentially through the zones containing little or no solid particles, secondary passages (227.1), must be provided, localized against the side wall of the reactor to a progressive and more or less uniform filling of all the cylindrical chambers to avoid excessive differences in fluid flow rates in the injection slits, preventing the transfer of energy necessary to rotate the solid particles in the zones being filled.

The transfer rate depends on the rotational velocity of the solid particles, the dimensions of the passages and their profile, and the differences in level of the surface of the fluidized bed from one chamber to the other. The latter can be accentuated or decreased by inclining the reactor.

The particles are rotated by the transfer of momentum from the fluid to the particles, in order to offset the energy losses due to turbulence, friction and their transfers in the reactor and from one chamber to the other. This momentum can be increased by placing side deflectors, (not shown in the figure) appropriately profiled facing the injectors. The energy losses can be minimized by carefully arranging the internal aerodynamics of the cylindrical chambers.

In case of malfunction, the reactor can be drained via openings arranged in the bottom of each zone and a filter or particle separator can be installed upstream of the fan (218) or of the outlet (220) to avoid sending solid particles downstream of the installation.

The central openings of the hollow disks can be connected by central deflectors, like those (313) shown in FIG. 12, and their inlets can be located in the upper part of the reactor to minimize the risk of suction of particles, especially during unscheduled shutdowns.

FIG. 20 shows a cross section of a hollow disk, along plane AA' in FIG. 19, for a reactor having two distributors and two collectors and forming with them a compact and easily transportable assembly designed to be easily disassembled. The figure shows the cross section (201) of the side wall of the reactor, the cross section (205) of two distributors, of their longitudinal slits (269), perpendicular to the plane of the figure, and the plates (270) for injecting the fluid (204) via the slits (207) passing longitudinally (perpendicular to the plane of the figure) through the reactor wall, dividing it into two half-cylinders. These are preferably arranged at approximately the same height on each side of the reactor, so that the fluid flow rate passing through them is unaffected by the differences in hydrostatic pressure in the fluidized bed. They are framed by plates (273), which are welded or prolong the side wall (201) of the reactor and which are connected, in a removable manner, to the plates (270) of the distributors (205) by fastenings (274). Their spacing is maintained by inserts (275) placed regularly along these longitudinal slits and appropriately profiled to minimize their resistance to the fluid flow which is injected into the reactor. This device serves to open the reactor by lifting its upper part.

The widening (212) of the hollow disk around its central opening is bounded by two circles (276), in thin lines, and the two enlargements (215) at the periphery of the disk, around its side openings, are bounded by curves (277), in thin lines. The interior of the hollow disk being visible, the figure shows the cross section (278) of beams connecting its two parallel walls to maintain the spacing thereof, to increase the overall stiffness and to guide, to the openings arranged in its side wall (279) the fluid (280) which rotates rapidly when it enters the hollow disk.

The fluid (213) then leaves the hollow disk and penetrates into the two collectors having cross section (217) passing through the nozzles, whereof one face (216) is shown, and whereof one end (281), in thin line, is welded to the collector (217) and whereof the other end, which penetrates into the transverse slit of the reactor, is welded to the side wall of the reactor and penetrates into the hollow disk through slits in its side wall (279). The circular end (282) of the nozzle (216) bears against the lower wall of the hollow disk and the sides of the nozzles, whereof the cross sections (283), can be seen, are bent at their end (284) to facilitate their insertion into the openings of the side wall of the hollow disk, during the assembly of the reactor. Triangular beams (285) connect the opposite walls of the nozzles to increase their stiffness, and their appropriately profiled ends (286) penetrate into the hollow disk in order to guide these nozzles into the disk when the two parts of the reactor are assembled. The ends (282) and (284) of the nozzles (216) have dimensions enabling them to fit easily and sufficiently tightly into the side openings of the hollow disks.

The passages for transferring the particles from one zone of the reactor to the other through the hollow disk, are arranged, for example, along the edges of the hollow disk, (227.1), and closer to its center, (227.2). They are bounded by the walls (287) perpendicular to the plane of the figure and the inclined walls (252) which guide the solid particles traveling in the direction (289), from the zone on one side of the disk to the zone on the other side. If it is advisable to transfer the solid particles in both directions to obtain a reflux, for example of the heaviest particles, certain passages, for example close to the reactor wall, may be inclined in the opposite direction.

Figure 21:
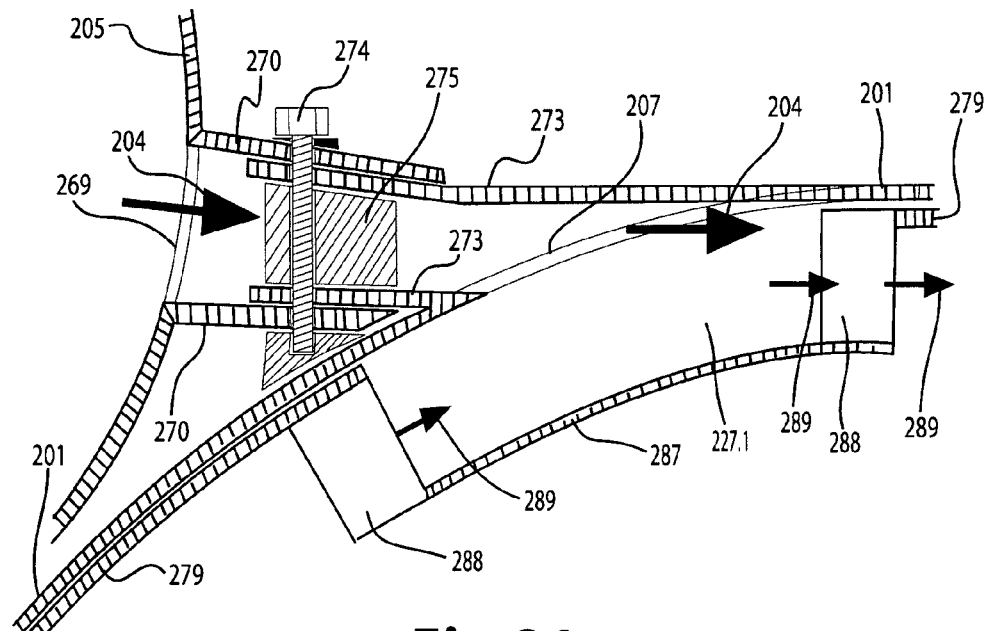
FIG. 21 is an enlargement of the fluid injection device shown in FIGS. 19 and 20.

FIG. 21 is an enlargement of the fluid injection device shown in FIGS. 19 and 20. It shows, cross-hatched, part of the cross section (201) of the side wall of the reactor, of the distributor (205), of the plates (270) and (273) connecting the longitudinal slit (207), perpendicular to the plane of the figure, in the reactor wall, to the longitudinal slit (269) of the distributor (205) of the fluid (204), and in thin lines, the attachment (274) used to assemble the lower part of the reactor, to the left of the figure, with its upper part, to the right, and the cross section of the insert (275) which ensures the spacing of the plates (273) whereof one is the prolongation of the wall (201) of the upper part of the reactor, to the right, and the other is welded to the lower part of the rector, to the left. The side wall (279) of the hollow disk and a passage (227.1), along the side edge of the hollow disk, bounded by a side wall (287) and the inclined walls (288) which guide the streams of particles (289) from the zone below the hollow disk to the zone above the hollow disk, are also visible in this figure.

The cross sections of side deflectors (305), like those described in FIG. 12, are not shown. They could coincide with or be set back from the cross section (287) of the side wall of a passage and be prolonged beyond the passage, as required.

FIG. 22 shows the view of a cross section, along the plane BB' perpendicular to FIG. 20, of the nozzle connecting a hollow disk to a collector. It shows the outer surface of the collector (217), the inner surface of the side (279) of a hollow disk and the cross section (203) of its two parallel walls, the two circular ends (282) and the ends (284) of the triangular side edges of the nozzle, bent and profiled for insertion into the opening (214), arranged in the side wall (279) of the hollow disk between its walls (203), the triangular beams (285) with their ends (286) appropriately profiled to facilitate the embedment of the nozzle into the opening of the hollow disk and, finally, the upper and lower wall (216) of the nozzle which intersects the collector (217) along the weld lines (281).

Example 8

Bimodal Catalytic Copolymerization of Ethylene and Hexene Using a Device According to the Invention For information, an industrial scale unit, according to the arrangement in FIG. 17, can, for example, have cylindrical chambers 3 m in diameter and 1.8 m high. If the ethylene pressure is about 25 bar and if the particle concentration in the fluidized bed is about 35%, the ratio of the density of the fluidized bed to that of the fluid is about 11.

Central openings in the hollow disks 0.8 m in diameter serve to easily remove a recycled ethylene flow rate of 5 ml/sec per cylindrical chamber, or about 500 tonnes per hour. If the polymer particles are transferred from one chamber to the other at a flow rate of 125 liters per second, or about 150 tonnes per hour and slightly more if the profile of the passages is designed to increase the particles concentration therein in order to reduce the transfers of undesirable fluids from one chamber to the other, an average fluid injection velocity of about 20 m/sec and an efficient transfer of the momentum from the fluid to the polymer particles may serve to rotate them at an average velocity of more than 6 m/s, sufficient to obtain a vertical rotating fluidized bed.

If the thickness of the fluidized bed at the tops of the cylindrical chambers is about 30 cm, the thickness at their bases may be about 0.9 m, giving a fluidized bed volume of nearly 7 $m^3$ per cylindrical chamber, or about 2.3 tonnes of polyethylene. The use of helical turns or other appropriate means serves to increase the thickness at the tops of the chambers while decreasing it at their bases, allowing for a fluidized bed volume of 7.5 $m^3$ or 2.5 tonnes of polyethylene, while reducing the differences in pressures, velocities and residence times of the fluid in the fluidized bed between their bases and their tops.

The average residence time of the polymer particles in each cylindrical chamber is about 1 minute and that of the fluid in the fluidized bed is 1.5 seconds. If the reactor comprises 10 cylindrical chambers, which can be grouped in pairs or several sets having separate recycling circuits, to obtain a bimodal or multimodal polymer particle composition, the total volume of recycled fluid is 50 $m^3$/sec, or about 5400 tonnes per hour, making it possible, without the help of coolants, to cool a production of at least 50 tonnes of polymer per hour with an average particle residence time of 30 minutes, permitting about 3 complete cycles on average, thereby ensuring a reasonable uniformity of the polymer particles, while limiting the transfers of undesirable fluids between the various parts of the reactor. If priority must be assigned to the uniformity of the polymer particles, the quantity of polymer particles transferred from one chamber to the other can be increased by increasing the dimensions of the passages, thereby also increasing the quantity of undesirable fluids transferred from one set of chambers to the other, and may hence decrease their differentiation.

The volume of ethylene fed to the reactor being about 0.5 $m^3$/sec, or about 6 times the volume of fluid transferred with the particles from one chamber to the other and hence also into the purification column (61), it is easy to purge the particles of this fluid containing hexene by using part of this ethylene in the column, due to the possibility of having a lower hexene concentration in the upper cylindrical chamber, if the hexene is only sprayed into the lower cylindrical chambers of the upper set.

If the lower set of cylindrical chambers contains a high hydrogen concentration to the decrease therein the molecular weight of high density polyethylene produced therein, a small quantity of this hydrogen is transferred to the upper set(s) of the reactor at the same time as the polymer particles. To prevent its concentration therein from being too high, it can be controlled using a hydrogen absorber which can be inserted into the fluid recycling circuit(s) of the upper set(s).

It is the surface area of the fluidized bed of about 12 $m^2$ per chamber, or a total of 120 $m^2$, for an average fluidized bed thickness of about 0.6 m and the centrifugal force, which permit such a high fluid flow rate and such a short fluid residence time in the fluidized bed. Since the cylindrical chambers are fed in parallel, the difference in pressure between the inlet and outlet of the reactor is relatively low, so that the energy expenditure needed to recycle the fluid can be limited. The centrifugal force and the fluid travel direction, essentially tangential to the surface of the fluidized bed, allow a large difference in velocities between the fluid and the particles, to guarantee better heat transfer, without excessively decreasing the density of the fluidized bed.

Example 9

Catalytic Cracking of Light Olefins Using a Device According to the Invention

The catalytic cracking of gasoline olefins produced by catalytic crackers is carried out at high temperature and low pressure, close to atmospheric pressure. It is highly endothermic, justifying operation with two successive passes with intermediate heating, requiring the flow of a considerable volume of fluid. The catalyst is progressively covered with carbon, even faster if the fluid to be cracked is heavier, justifying catalytic circulation with continuous regeneration. The average cycle time between two regenerations depends on the operating conditions. It may be shorter than one hour or as long as several hours.

For example, for information and to provide an idea of scale, an industrial reactor may have cylindrical chambers 1.6 m in diameter and 1.5 m high. If the ratio of the density of the fluidized bed to that of the fluid is 150, a recycled fluid flow rate of 2.4 $m^3$/sec, injected at an average velocity of 50 m/sec, can rotate the catalyst particles at a rotational velocity above 4 m/sec, sufficient to obtain a vertical rotating fluidized bed. The differences in velocities of rotation of the particles, pressures and thicknesses of the fluidized bed between the top and bottom of the chambers may be fairly high so that it is advisable to provide them with upward helical turns or other devices for reducing them. This may serve to obtain a fluidized bed having a thickness of between 20 and 40 cm, a volume of about 1.7 m³ and a surface area of about 5 m² per chamber, with an average fluid residence time in the fluidized bed of 0.7 seconds.

If the reactor comprises two sets in series of four cylindrical chambers each, giving a height of over 12 meters, considering the thickness of the hollow disks necessary to remove the fluids, it can crack about 200 tonnes per hour, if the density of the heated fluid is 6 g/liter.

The difference in pressure between the inlet and outlet of each set of cylindrical chambers, necessary to offset the hydrodynamic pressure of the fluidized bed and to inject the fluid at the desired velocities, may be less than one quarter of the atmospheric pressure. If the pressure drop in the heater is sufficiently low, since the feed of the two parts of the reactor is in series, the difference in pressure between these two parts may be lower than 50% of the atmospheric pressure, to be compared with the hydrostatic pressure of the fluidized bed in the recycling column (61), which may be close to atmospheric pressure for a height of 11 m, which is sufficient to recycle the regenerated catalyst particles.

One of the advantages of this series configuration is the lower pressure of the fluid in the outgoing reactor, which favors its conversion. This configuration also serves to use more than two parts of the reactor in series, thereby improving the conversion, without very high extra cost, given the short distances possible between the furnaces and the reactor and the lack of any need of an additional compressor.

Example 10

Horizontal Grain Dryer Using a Device According to the Invention

To provide an idea of scale, a horizontal reactor, as described in FIGS. 19 to 22, forming with these accessories an assembly of the size of an easily transportable container, may have a diameter of 1.8 m and be divided into 6 cylindrical chambers 0.5 m wide. The wet grains (225) are introduced via the tube (226) into the zone Z1. They are heated and dried by the recycled air, which is heated by the heat exchanger (219) and optionally dried, if necessary, by a condenser, not shown. The grains are transferred from one cylindrical chamber to the other up to the final chamber, Z6, where they are cooled by the fresh air (206) which they preheat while completing their drying before exiting (229) via the tube (230). The air is heated, dried and recycled to the other zones, a number of times equal to the ratio of the total capacity of the fan to the air flow rate removed at (220).

Since the fluid travels inside the fluidized bed essentially parallel to the surface of the fluidized bed, and since the centrifugal force provides for a relatively high radial velocity perpendicular to this surface, the difference in velocity between the air and the grains and the air flow rate may be relatively high, thereby reducing the time needed for drying. Moreover, since the grains are cooled by fresh air before leaving the reactor and their residence time in the reactor is relatively short, they can be heated to slightly higher temperatures than in a conventional dryer. Furthermore, since the wet air is slightly cooled by the grains which it preheats before leaving the reactor, the heat is used very efficiently. This efficiency can be improved by using a second, smaller fan, which directly removes the air leaving the first cylindrical chamber, which has served to preheat the grains and which can be isolated by a separation in the first hollow disk, without it being mixed with the air issuing from the other cylindrical chambers. Moreover, small secondary passages, (227.1), along the side wall of the reactor, can ensure a preferential transfer of the heaviest grains, and thus the most difficult to dry, in the opposite direction, to increase their residence time in the reactor.

If, for example, the fluidized bed containing the grains in suspension has a bulk density of 300 grams per liter, the ratio of this density to that of the ambient air is about 230, requiring a very high air flow rate and injection velocity. For example, an air flow rate of 2 m³/sec per chamber, or more than 9 tonnes per hour per chamber, injected at about 40 m/sec and an efficient transfer of momentum from the air to the grains can impart to the grains velocities of rotation of over 6 m/sec, giving a difference in thickness of less than 12 cm between the top and bottom of a fluidized bed having an average thickness of 30 cm.

The total air flow rate of 12 m³/sec can be fed by a fan to two distributors 0.65 m in diameter and removed by two collectors 0.7 m in diameter, the central openings of the hollow disks being less than 0.6 m in diameter. This serves to contain the assembly formed by the reactor, its distributors and collectors in a 2.5 m sided square, corresponding to the size of a standard container.

The volume of the fluidized bed is about 700 liters per chamber or a total of 4.2 m³ for a surface area of more than 11 m². If the grains are transferred from one chamber to the other at the rate of 20 liters per second, or about 20 tonnes per hour, their average residence time in the dryer is about 3.5 minutes. Their degree of drying depends on the moisture content and temperature of the air which may be heated, inter alia, by cooling the fan motor, and can pass through a condenser, but in general, it is more rapid than in an ordinary dryer, due to the wide difference in velocities between the air and the grains, obtained thanks to their tangential direction and the centrifugal force.

In case of unscheduled shutdown, it is necessary to provide a cyclone and/or a filter to prevent part of the grains from being entrained by the fan and discharged into the atmosphere, and openings in the bottom of each zone in order to drain the reactor before restart.

The capacity can be doubled by doubling the length of the reactor and by using an additional fan on the grain outlet side to avoid having to increase the diameter of the distributors and collectors.

Example 11

Use of a Fluid Injection Device According to the Invention

The transfers of energy and momentum between the fluids and the solid particles strongly depend on the type and size of the particles. However, by referring to FIGS. 12 and 13, simplified calculations can show, for information, that, for solid particles having a density 700 times higher than the fluid density, with a ratio of 3 to 4 between the cross section of the access corridors (307) and the injectors, and an outlet cross section (311) equal to or greater than the sum of the sections of the access corridors and injectors, the fluids can be injected at a velocity 5 to 15 times higher than the average rotational velocity of the solid particles, and can transfer to them at least 75% of their kinetic energy if the space is sufficiently long with regard to the size of the particles.

I claim:
1. A rotating fluidized bed device comprising:
   a reactor adapted to contact at least one fluid and a catalyst within the reactor comprising at least one cylindrical or circular chamber;

a fluid removal device, wherein said fluid removing device comprises a central duct passing longitudinally through or penetrating into said cylindrical or circular chamber, the wall of said central duct comprising at least one discharge opening for centrally removing at least one fluid from the cylindrical or circular chamber via said central duct;

a fluid feeding device adapted for feeding said at least one fluid that is gaseous or liquid, wherein said fluid feed device is placed around a cylindrical or circular wall of said cylindrical or circular chamber, wherein said fluid feeding device comprises fluid injectors distributed around said cylindrical or circular wall adapted to inject said at least one fluid in a succession of layers along said cylindrical or circular wall and further adapted to rotating said fluid around said central duct while entraining solid particles in a rotational movement whereby a centrifugal force thrusts said solid particles toward said cylindrical or circular wall through said layers, wherein said centrifugal force is on average at least equal to three times the force of garvity, said solid particles thereby forming said rotating fluidized bed which rotates around and at a certain distance from said central duct while sliding along said cylindrical or circular wall and while being at least partially supported by said layers of said at least one fluid which passes through said rotating fluidized bed before being removed centrally via said discharge opening of said central duct;

a solid particle feeding device, said particle feeding device located on one side of said cylindrical or circular chamber;

a solid particle removal device, said solid particle removal device located on an opposite side of said cylindrical or circular chamber.

2. The rotating fluidized bed device of claim 1, wherein said cylindrical or circular wall contains one said fluid injector at each 90° intervals.

3. The rotating fluidized bed device of claim 1, wherein the distance between two said consecutive fluid injectors is less than an average radius of said cylindrical or circular wall.

4. The rotating fluidized bed device of claim 1, wherein the outlets of said fluid injectors have a width of less than one-twentieth of an average radius of said cylindrical or circular chamber.

5. The rotating fluidized bed device of claim 1, wherein the surface of said cylindrical or circular wall located between two said consecutive fluid injectors is planar, the cylindrical or circular wall being polygonal.

6. The rotating fluidized bed device of claim 1, wherein said fluid injectors have a profile, the profile of said fluid injectors adapted to form an injection directions of the layers with an angle of less than 30° with said cylindrical or circular wall on a side located downstream of said fluid injectors.

7. The rotating fluidized bed device of claim 1, wherein an outlet plane of said fluid injector has an angle of between 60° and 120° with said cylindrical or circular wall on a side located downstream of said fluid injectors.

8. The rotating fluidized bed device of claim 1, wherein said fluid feeding device comprises a fluid feed chamber surrounding said cylindrical or circular wall adapted to maintain a pressure difference between said fluid feed chamber and said central duct by said at fluid feeding device and fluid removal device at more than an average centrifugal pressure exerted by said fluidized bed on said cylindrical or circular wall.

9. The rotating fluidized bed device of claim 1, wherein said fluid feeding device is adapted for separately feeding said fluid injectors corresponding to successive annular sections of said fluidized bed, thereby making said annular section traversed by fluids having different compositions and/or temperatures and/or injection velocities.

10. The rotating fluidized bed device of claim 9, wherein said cylindrical or circular wall is divided into longitudinal segments and wherein said fluid feeding device is adapted for feeding said fluid injectors corresponding to said longitudinal segments at different pressures.

11. The rotating fluidized bed device of claim 1, further comprising a device for recycling said fluid removed by said fluid removal device toward said fluid feeding device, said device for recycling fluid comprising a device for treating said recycled fluids in order to adjust a temperature and/or composition thereof.

12. The rotating fluidized bed device of claim 1, wherein said central duct is transversely divided by transverse walls in sections connected to discharge tubes placed inside said central duct adapted for separately removing the fluids issuing from said sections of said central duct and for treating and recycling said fluids separately into a corresponding section or another section of said cylindrical or circular chamber.

13. The rotating fluidized bed device of claim 1, wherein said cylindrical or circular chamber is divided into annular sections corresponding to sections of said central duct by annular walls fixed between said cylindrical or circular wall and said central duct, said annular walls comprising at least one passage against said cylindrical or circular wall adapted for passage of the solid particles from one said annular section toward said adjacent annular section and said annular walls or transverse walls of said central duct comprising at least one passage located against or in said central duct for the passage of said fluids from one said section to said adjacent section.

14. The rotating fluidized bed device of claim 1, further comprised of hollow disks perpendicular to the axis of rotation of said rotating fluidized bed and fixed against said cylindrical or circular wall, said disks dividing said reactor into a succession of cylindrical or circular chambers interconnected by passages arranged through said hollow disks, said passages adapted to enable said solid particles in suspension in said rotating fluidized bed of one said cylindrical or circular chamber to pass to said rotating fluidized bed of an adjacent cylindrical or circular chamber, and wherein said device for fluid removal device comprises said hollow disks which are each equipped with at least one central opening around said axis of rotation connected to one said central duct, and with at least one side opening connected to at least one collector outside the reactor for removing said fluids through said hollow disks and for regularizing the outlet pressures of said cylindrical or circular chambers.

15. The rotating fluidized bed device of claim 14, wherein at least one of said hollow disks contains one or more separating partitions adapted for separating said fluid which enters said hollow disk and which issues from said cylindrical chambers separated by said hollow disk.

16. The rotating fluidized bed device of claim 1, wherein the average width of said opening is less than half of an average distance between said wall of said central duct and said cylindrical or circular wall.

17. The rotating fluidized bed device of claim 1, wherein a sum of a cross section of said discharge openings is smaller than twice a sum of an outlet cross section of said fluid injectors.

18. The rotating fluidized bed device of claim 17, wherein a plane of said discharge openings has an angle of between 60° and 120° with the wall of said central duct.

19. The rotating fluidized bed device of claim 18, wherein no transverse cross section of said central duct passes through more than one said discharge opening.

20. The rotating fluidized bed device of claim 19, wherein at least one said cylindrical or circular chamber is longitudinally traversed by at least one deflector, wing-shaped, upstream of at least one of said discharge openings and extending beyond said discharge opening.

21. The rotating fluidized bed device of claim 20 further, wherein said deflector is hollow and is adapted to be fed with fluid by said fluid feed device passing through one said side of said cylindrical or circular chamber or through one said hollow disk and is equipped with at least one fluid injector along its trailing edge for injecting said fluid, in a thin layer, along the wall of said central duct downstream of said discharge opening.

* * * * *